(12) United States Patent
Rogers et al.

(10) Patent No.: US 11,759,801 B2
(45) Date of Patent: Sep. 19, 2023

(54) PAUSE ASSEMBLY FOR SHOWERHEADS

(71) Applicant: WATER PIK, INC., Fort Collins, CO (US)

(72) Inventors: Craig P. Rogers, Fort Collins, CO (US); Michael J. Quinn, Windsor, CO (US)

(73) Assignee: Water Pik, Inc., Fort Collins, CO (US)

( * ) Notice: Subject to any disclaimer, the term of this patent is extended or adjusted under 35 U.S.C. 154(b) by 0 days.

(21) Appl. No.: 17/901,552

(22) Filed: Sep. 1, 2022

(65) Prior Publication Data
US 2022/0410187 A1 Dec. 29, 2022

Related U.S. Application Data

(60) Continuation of application No. 16/540,905, filed on Aug. 14, 2019, now Pat. No. 11,458,488, which is a
(Continued)

(51) Int. Cl.
B05B 1/18 (2006.01)
B05B 1/30 (2006.01)
(Continued)

(52) U.S. Cl.
CPC ............ B05B 1/185 (2013.01); B05B 1/1627 (2013.01); B05B 1/18 (2013.01); B05B 1/3026 (2013.01);
(Continued)

(58) Field of Classification Search
CPC ......... B05B 1/1627; B05B 1/18; B05B 1/185; B05B 1/3026; B05B 12/002;
(Continued)

(56) References Cited

U.S. PATENT DOCUMENTS 163,263 A 5/1875 Schofield ................. F16K 1/00
251/340
203,094 A 4/1878 Wakeman
(Continued)

FOREIGN PATENT DOCUMENTS

CA 659510 3/1963
CA 2341041 8/1999
(Continued)

OTHER PUBLICATIONS

Author Unknown, "Flipside: The Bold Look of Kohler," 1 page, at least as early as Jun. 2011.
(Continued)

Primary Examiner — Darren W Gorman
(74) Attorney, Agent, or Firm — Dorsey & Whitney LLP

(57) ABSTRACT

A showerhead including a head portion including a plurality of nozzles, a handle extending from the head portion and including an inlet, and a pause assembly positioned within the handle to control water flow from the inlet to the plurality of nozzles is disclosed. The pause assembly includes a control extending outwardly from the handle for manipulation by a user to change a state of the pause assembly and an actuator that translates motion of the control to change the state of the pause assembly.

20 Claims, 34 Drawing Sheets

Related U.S. Application Data division of application No. 15/699,153, filed on Sep. 8, 2017, now Pat. No. 10,441,960.

(60) Provisional application No. 62/384,870, filed on Sep. 8, 2016.

(51) Int. Cl.
    *B05B 12/00*     (2018.01)
    *E03C 1/04*      (2006.01)
    *F16K 31/60*     (2006.01)
    *F16K 31/53*     (2006.01)
    *B05B 1/16*      (2006.01)
    *F16K 5/06*      (2006.01)

(52) U.S. Cl.
    CPC ........ *F16K 31/535* (2013.01); *B05B 12/0022* (2018.08); *E03C 1/0409* (2013.01); *F16K 5/0605* (2013.01); *F16K 31/602* (2013.01)

(58) Field of Classification Search
    CPC . B05B 12/0022; F16K 5/0605; F16K 31/535; F16K 31/602; E03C 1/0409
    See application file for complete search history.

(56) References Cited

U.S. PATENT DOCUMENTS

| | | |
|---|---|---|
| 204,333 A | 5/1878 | Josias |
| 309,349 A | 12/1884 | Hart |
| 428,023 A | 5/1890 | Schott |
| 432,712 A | 7/1890 | Taylor |
| 445,250 A | 1/1891 | Lawless |
| 453,109 A | 5/1891 | Dreisorner |
| 486,986 A | 11/1892 | Schinke |
| 566,384 A | 8/1896 | Engelhart |
| 566,410 A | 8/1896 | Schinke |
| 570,405 A | 10/1896 | Jerguson et al. |
| 605,018 A | 5/1898 | Schleidt et al. .......... F16K 3/08 137/625.31 |
| 674,971 A | 5/1901 | Kimman ................. F16K 27/02 251/223 |
| 694,365 A | 3/1902 | Garrison ................. B05B 1/308 239/448 |
| 694,888 A | 3/1902 | Pfluger |
| 800,802 A | 10/1905 | Franqulst |
| 832,523 A | 10/1906 | Andersson |
| 835,678 A | 11/1906 | Hammond |
| 845,540 A | 2/1907 | Ferguson |
| 854,094 A | 5/1907 | Klein |
| 926,929 A | 7/1909 | Dusseau |
| 977,614 A | 12/1910 | Glenn ...................... F16K 1/00 251/119 |
| 980,698 A | 1/1911 | Stilwell .................... F16K 1/00 251/253 |
| 988,943 A | 4/1911 | Lentz ....................... F16K 1/00 137/901 |
| 1,001,842 A | 8/1911 | Greenfield |
| 1,003,037 A | 9/1911 | Crowe |
| 1,018,143 A | 2/1912 | Vissering |
| 1,036,446 A | 8/1912 | Burt ......................... F16K 1/00 137/434 |
| 1,046,573 A | 12/1912 | Ellis |
| 1,085,839 A | 2/1914 | Acton ................ A46B 11/0013 251/340 |
| 1,130,520 A | 3/1915 | Kenney |
| 1,203,466 A | 10/1916 | Benson |
| 1,217,254 A | 2/1917 | Winslow |
| 1,218,895 A | 3/1917 | Porter |
| 1,255,577 A | 2/1918 | Berry |
| 1,260,181 A | 3/1918 | Garnero |
| 1,276,117 A | 8/1918 | Riebe |
| 1,284,099 A | 11/1918 | Harris |
| 1,327,428 A | 1/1920 | Gregory |
| 1,451,800 A | 4/1923 | Agner |
| 1,459,582 A | 6/1923 | Dubee |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,633,531 A | 6/1927 | Keller |
| 1,669,949 A | 5/1928 | Reynolds |
| 1,692,394 A | 11/1928 | Sundh |
| 1,695,263 A | 12/1928 | Jacques |
| 1,724,147 A | 8/1929 | Russell |
| 1,724,161 A | 8/1929 | Wuesthoff |
| 1,736,160 A | 11/1929 | Jonsson |
| 1,754,127 A | 4/1930 | Srulowltz |
| 1,758,115 A | 5/1930 | Kelly |
| 1,778,658 A | 10/1930 | Baker |
| 1,821,274 A | 9/1931 | Plummer |
| 1,849,517 A | 3/1932 | Fraser |
| 1,890,156 A | 12/1932 | Konig |
| 1,906,575 A | 5/1933 | Goeriz |
| 1,934,553 A | 11/1933 | Mueller et al. |
| 1,946,207 A | 2/1934 | Haire |
| 2,011,446 A | 8/1935 | Judell |
| 2,024,930 A | 12/1935 | Judell |
| 2,033,467 A | 3/1936 | Groeniger |
| 2,044,445 A | 6/1936 | Price et al. |
| 2,085,854 A | 7/1937 | Hathaway et al. |
| 2,096,912 A | 10/1937 | Morris |
| 2,117,152 A | 5/1938 | Crosti |
| D113,439 S | 2/1939 | Reinecke |
| 2,196,783 A | 4/1940 | Shook |
| 2,197,667 A | 4/1940 | Shook |
| 2,216,149 A | 10/1940 | Weiss |
| D126,433 S | 4/1941 | Enthof |
| 2,251,192 A | 7/1941 | Krumslek et al. |
| 2,268,263 A | 12/1941 | Newell et al. |
| 2,285,831 A | 6/1942 | Pennypacker |
| 2,342,757 A | 2/1944 | Roser |
| 2,402,741 A | 6/1946 | Draviner |
| D147,258 S | 8/1947 | Becker |
| D152,584 S | 2/1949 | Becker |
| 2,467,954 A | 4/1949 | Becker |
| 2,502,301 A | 3/1950 | Alderfer .................. B63C 9/24 137/223 |
| 2,518,709 A | 8/1950 | Mosby, Jr. |
| 2,546,348 A | 3/1951 | Schuman |
| 2,567,642 A | 9/1951 | Penshaw |
| 2,581,129 A | 1/1952 | Muldoon |
| D166,073 S | 3/1952 | Dunkelberger |
| 2,637,572 A | 5/1953 | Bruce .................. F16L 37/0848 137/614.02 |
| 2,648,762 A | 8/1953 | Dunkelberger |
| 2,657,004 A | 10/1953 | Lovington ................ F16K 7/08 222/507 |
| 2,664,271 A | 12/1953 | Arutunoff |
| 2,665,873 A | 1/1954 | Backman ................ F16K 1/221 251/250 |
| 2,671,693 A | 3/1954 | Hyser et al. |
| 2,676,806 A | 4/1954 | Bachman |
| 2,678,847 A | 5/1954 | Caird .................... A62C 31/005 137/509 |
| 2,679,575 A | 5/1954 | Haberstump |
| 2,680,358 A | 6/1954 | Zublin |
| 2,715,512 A | 8/1955 | Miller ....................... F16K 1/14 251/148 |
| 2,726,120 A | 12/1955 | Bletcher et al. |
| 2,759,765 A | 8/1956 | Pawley |
| 2,776,168 A | 1/1957 | Schweda |
| 2,792,847 A | 5/1957 | Spencer |
| 2,813,545 A | 11/1957 | Garnik .................. F16K 15/063 137/599.18 |
| 2,873,999 A | 2/1959 | Webb |
| 2,906,283 A | 9/1959 | Church .................... E21B 33/03 137/315.02 |
| 2,930,505 A | 3/1960 | Meyer |
| 2,931,672 A | 4/1960 | Merritt et al. |
| 2,935,265 A | 5/1960 | Richter |
| 2,949,242 A | 8/1960 | Blumberg et al. |

(56) References Cited

U.S. PATENT DOCUMENTS

| | | |
|---|---|---|
| 2,957,587 A | 10/1960 | Tobin |
| 2,966,311 A | 12/1960 | Davis |
| D190,295 S | 5/1961 | Becker |
| 2,991,090 A | 7/1961 | De Cenzo ............... F16L 37/23 |
| | | 137/614.02 |
| 2,992,437 A | 7/1961 | Nelson et al. |
| 3,007,648 A | 11/1961 | Fraser |
| D192,935 S | 5/1962 | Becker |
| 3,032,357 A | 5/1962 | Shames et al. |
| 3,034,809 A | 5/1962 | Greenberg |
| 3,037,799 A | 6/1962 | Mulac |
| 3,081,339 A | 3/1963 | Green et al. |
| 3,092,333 A | 6/1963 | Gaiotto |
| 3,098,508 A | 7/1963 | Gerdes |
| 3,103,723 A | 9/1963 | Becker |
| 3,104,815 A | 9/1963 | Schultz |
| 3,104,827 A | 9/1963 | Aghnides |
| 3,111,277 A | 11/1963 | Grimsley |
| 3,112,073 A | 11/1963 | Larson et al. |
| 3,143,857 A | 8/1964 | Eaton |
| 3,196,463 A | 7/1965 | Farneth |
| 3,231,200 A | 1/1966 | Heald |
| 3,236,545 A | 2/1966 | Parkes et al. |
| 3,239,152 A | 3/1966 | Bachli et al. |
| 3,254,673 A | 6/1966 | MacKenzie ........... F16L 37/113 |
| | | 137/614.02 |
| 3,266,059 A | 8/1966 | Stelle |
| 3,272,437 A | 9/1966 | Coson |
| 3,273,359 A | 9/1966 | Fregeolle |
| 3,291,440 A | 12/1966 | Archer ............... G05D 16/0622 |
| | | 251/340 |
| 3,306,634 A | 2/1967 | Groves et al. |
| 3,323,148 A | 6/1967 | Burnon |
| 3,329,967 A | 7/1967 | Martinez et al. |
| 3,341,132 A | 9/1967 | Parkison |
| 3,342,419 A | 9/1967 | Weese ..................... E03C 1/046 |
| | | 239/313 |
| 3,344,994 A | 10/1967 | Fife |
| 3,363,842 A | 1/1968 | Burns |
| 3,383,051 A | 5/1968 | Fiorentino |
| 3,389,925 A | 6/1968 | Gottschald |
| 3,393,311 A | 7/1968 | Dahl |
| 3,393,312 A | 7/1968 | Dahl |
| 3,404,410 A | 10/1968 | Sumida |
| 3,492,029 A | 1/1970 | French et al. |
| 3,516,611 A | 6/1970 | Piggott |
| 3,546,961 A | 12/1970 | Marton |
| 3,550,863 A | 12/1970 | McDermott |
| 3,552,436 A | 1/1971 | Stewart |
| 3,565,116 A | 2/1971 | Gabin |
| 3,566,917 A | 3/1971 | White |
| 3,580,513 A | 5/1971 | Martin |
| 3,584,822 A | 6/1971 | Oram |
| 3,596,835 A | 8/1971 | Smith et al. |
| 3,612,577 A | 10/1971 | Pope |
| 3,637,143 A | 1/1972 | Shames et al. |
| 3,641,333 A | 2/1972 | Gendron |
| 3,643,685 A | 2/1972 | Hays ....................... F16K 1/126 |
| | | 137/501 |
| 3,645,500 A | 2/1972 | Walter ................... F16K 31/528 |
| | | 251/340 |
| 3,647,144 A | 3/1972 | Parkison et al. |
| 3,663,044 A | 5/1972 | Contreras et al. |
| 3,669,470 A | 6/1972 | Deurloo |
| 3,672,648 A | 6/1972 | Price |
| 3,682,392 A | 8/1972 | Kint |
| 3,685,745 A | 8/1972 | Peschcke-Koedt |
| D224,834 S | 9/1972 | Laudell |
| 3,711,029 A | 1/1973 | Bartlett |
| 3,722,798 A | 3/1973 | Bletcher et al. |
| 3,722,799 A | 3/1973 | Rauh |
| 3,731,084 A | 5/1973 | Trevorrow |
| 3,754,779 A | 8/1973 | Peress |
| D228,622 S | 10/1973 | Juhlin |
| 3,762,648 A | 10/1973 | Delnes et al. |
| 3,768,735 A | 10/1973 | Ward |
| 3,784,156 A | 1/1974 | Paetzel ................... F16K 1/123 |
| | | 137/219 |
| 3,786,995 A | 1/1974 | Manoogian et al. |
| 3,801,019 A | 4/1974 | Trenary et al. |
| 3,810,580 A | 5/1974 | Rauh |
| 3,826,454 A | 7/1974 | Zieger |
| 3,831,631 A | 8/1974 | Draxler ..................... B23K 5/22 |
| | | 137/606 |
| 3,840,734 A | 10/1974 | Oram |
| 3,845,291 A | 10/1974 | Portyrata |
| 3,847,372 A | 11/1974 | Litchfield ............. E21B 21/106 |
| | | 137/315.39 |
| 3,860,271 A | 1/1975 | Rodgers |
| 3,861,719 A | 1/1975 | Hand |
| 3,865,310 A | 2/1975 | Elkins et al. |
| 3,869,151 A | 3/1975 | Fletcher et al. |
| 3,887,136 A | 6/1975 | Anderson |
| 3,896,845 A | 7/1975 | Parker |
| 3,897,933 A | 8/1975 | Christenot ............... F16K 31/54 |
| | | 251/248 |
| 3,902,671 A | 9/1975 | Symmons |
| 3,910,277 A | 10/1975 | Zimmer |
| D237,708 S | 11/1975 | Grohe |
| 3,929,164 A | 12/1975 | Richter |
| 3,929,287 A | 12/1975 | Givler et al. |
| 3,958,756 A | 5/1976 | Trenary et al. |
| D240,322 S | 6/1976 | Staub |
| 3,963,179 A | 6/1976 | Tomaro |
| 3,967,783 A | 7/1976 | Halsted et al. |
| 3,979,096 A | 9/1976 | Zieger |
| 3,994,443 A | 11/1976 | Shenker |
| 3,997,116 A | 12/1976 | Moen |
| 3,998,390 A | 12/1976 | Peterson et al. |
| 3,999,714 A | 12/1976 | Lang |
| 4,005,880 A | 2/1977 | Anderson et al. |
| 4,006,920 A | 2/1977 | Sadler et al. |
| 4,022,426 A | 5/1977 | Read ....................... E21B 34/12 |
| | | 166/330 |
| 4,023,782 A | 5/1977 | Elfer |
| 4,042,984 A | 8/1977 | Butler |
| 4,045,054 A | 8/1977 | Arnold |
| D245,858 S | 9/1977 | Grube |
| D245,860 S | 9/1977 | Grube |
| 4,068,801 A | 1/1978 | Leutheuser |
| 4,081,135 A | 3/1978 | Tomaro |
| 4,084,271 A | 4/1978 | Ginsberg |
| 4,091,998 A | 5/1978 | Peterson |
| D249,356 S | 9/1978 | Nagy |
| 4,117,979 A | 10/1978 | Lagarelli et al. |
| 4,129,257 A | 12/1978 | Eggert |
| 4,130,120 A | 12/1978 | Kohler, Jr. |
| 4,131,233 A | 12/1978 | Koenig |
| 4,133,486 A | 1/1979 | Fanella |
| 4,135,549 A | 1/1979 | Baker |
| D251,045 S | 2/1979 | Grube |
| 4,141,502 A | 2/1979 | Grohe |
| 4,151,955 A | 5/1979 | Stouffer |
| 4,151,957 A | 5/1979 | Gecewlcz et al. |
| 4,162,801 A | 7/1979 | Kresky et al. |
| 4,164,959 A | 8/1979 | Wurzburger ............. F16K 1/385 |
| | | 137/553 |
| 4,165,837 A | 8/1979 | Rundzaltls |
| 4,167,196 A | 9/1979 | Morris |
| 4,174,822 A | 11/1979 | Larsson |
| 4,185,781 A | 1/1980 | O'Brien |
| 4,190,207 A | 2/1980 | Fienhold et al. |
| 4,191,332 A | 3/1980 | De Langis et al. |
| 4,203,550 A | 5/1980 | On |
| 4,209,132 A | 6/1980 | Kwan |
| D255,626 S | 7/1980 | Grube |
| 4,219,160 A | 8/1980 | Allred, Jr. |
| 4,221,338 A | 9/1980 | Shames et al. |
| 4,226,263 A | 10/1980 | Muchow ................... F16K 5/10 |
| | | 137/614.17 |
| 4,239,409 A | 12/1980 | Osrwo |
| 4,243,253 A | 1/1981 | Rogers, Jr. |
| 4,244,526 A | 1/1981 | Arth |

(56) References Cited

U.S. PATENT DOCUMENTS

| | | |
|---|---|---|
| D258,677 S | 3/1981 | Larsson |
| 4,254,914 A | 3/1981 | Shames et al. |
| 4,258,414 A | 3/1981 | Sokol |
| 4,272,022 A | 6/1981 | Evans |
| 4,274,400 A | 6/1981 | Baus |
| 4,275,843 A | 6/1981 | Moen |
| 4,282,612 A | 8/1981 | King |
| 4,282,899 A | 8/1981 | Dunckhorst ........ F16K 11/0873 137/624.18 |
| D261,300 S | 10/1981 | Klose |
| D261,417 S | 10/1981 | Klose |
| 4,303,201 A | 12/1981 | Elkins et al. |
| 4,319,608 A | 3/1982 | Ralkov et al. |
| 4,324,364 A | 4/1982 | Buzzi et al. |
| 4,330,089 A | 5/1982 | Finkbeiner |
| D266,212 S | 9/1982 | Haug et al. |
| 4,350,298 A | 9/1982 | Tada |
| 4,353,508 A | 10/1982 | Butterfield et al. |
| 4,358,056 A | 11/1982 | Greenhut et al. |
| D267,582 S | 1/1983 | Mackay et al. |
| D268,359 S | 3/1983 | Klose |
| D268,442 S | 3/1983 | Darmon |
| D268,611 S | 4/1983 | Klose |
| 4,383,554 A | 5/1983 | Merriman |
| 4,396,797 A | 8/1983 | Sakuragl et al. |
| 4,398,669 A | 8/1983 | Fienhold |
| 4,416,338 A | 11/1983 | Nelson ..................... B25D 9/16 173/169 |
| 4,425,965 A | 1/1984 | Bayh, III et al. |
| 4,432,392 A | 2/1984 | Paley |
| D274,457 S | 6/1984 | Haug |
| 4,461,052 A | 7/1984 | Mostul |
| 4,465,308 A | 8/1984 | Martini |
| 4,467,964 A | 8/1984 | Kaeser |
| 4,495,550 A | 1/1985 | Visciano |
| 4,522,592 A | 6/1985 | Johnson ............... A61C 17/043 251/340 |
| 4,527,745 A | 7/1985 | Butterfield et al. |
| 4,535,852 A | 8/1985 | Boyadjieff ............ F16K 5/0652 166/332.3 |
| 4,540,202 A | 9/1985 | Amphoux et al. |
| 4,545,081 A | 10/1985 | Nestor et al. |
| 4,553,775 A | 11/1985 | Hailing |
| D281,820 S | 12/1985 | Oba et al. |
| 4,561,593 A | 12/1985 | Cammack et al. |
| 4,564,889 A | 1/1986 | Bolson |
| 4,571,003 A | 2/1986 | Roling et al. |
| 4,572,232 A | 2/1986 | Gruber |
| D283,645 S | 4/1986 | Tanaka |
| 4,587,991 A | 5/1986 | Chorkey |
| 4,588,130 A | 5/1986 | Trenary et al. |
| 4,598,866 A | 7/1986 | Cammack et al. |
| 4,614,303 A | 9/1986 | Moseley, Jr. et al. |
| 4,614,329 A | 9/1986 | Hansen ................. F16K 31/535 251/248 |
| 4,616,298 A | 10/1986 | Bolson |
| 4,618,100 A | 10/1986 | White et al. |
| 4,629,121 A | 12/1986 | Hengesbach ......... B05B 1/1636 239/119 |
| 4,629,124 A | 12/1986 | Gruber |
| 4,629,125 A | 12/1986 | Llu |
| 4,643,463 A | 2/1987 | Hailing et al. |
| 4,645,244 A | 2/1987 | Curtis |
| RE32,386 E | 3/1987 | Hunter |
| 4,650,120 A | 3/1987 | Kress |
| 4,650,470 A | 3/1987 | Epstein |
| 4,652,025 A | 3/1987 | Conroy, Sr. |
| 4,654,900 A | 4/1987 | McGhee |
| 4,657,185 A | 4/1987 | Rundzaitis |
| 4,669,666 A | 6/1987 | Finkbelner |
| 4,669,757 A | 6/1987 | Bartholomew |
| 4,674,687 A | 6/1987 | Smith et al. |
| 4,683,917 A | 8/1987 | Bartholomew |
| 4,703,893 A | 11/1987 | Gruber |
| 4,717,180 A | 1/1988 | Roman |
| 4,719,654 A | 1/1988 | Blessing |
| 4,733,337 A | 3/1988 | Bieberstein |
| D295,437 S | 4/1988 | Fabian |
| 4,739,801 A | 4/1988 | Kimura et al. |
| 4,749,126 A | 6/1988 | Kessener et al. |
| D296,582 S | 7/1988 | Haug et al. |
| 4,754,928 A | 7/1988 | Rogers et al. |
| D297,160 S | 8/1988 | Robbins |
| 4,764,047 A | 8/1988 | Johnston et al. |
| 4,778,104 A | 10/1988 | Fisher |
| 4,778,111 A | 10/1988 | Leap |
| 4,787,591 A | 11/1988 | Villacorta |
| 4,790,294 A | 12/1988 | Allred, III et al. |
| 4,801,091 A | 1/1989 | Sandvik |
| 4,809,369 A | 3/1989 | Bowden |
| 4,839,599 A | 6/1989 | Fischer |
| 4,841,590 A | 6/1989 | Terry |
| 4,842,059 A | 6/1989 | Tomek |
| D302,325 S | 7/1989 | Charet et al. |
| 4,848,403 A | 7/1989 | Pilolla .................... F16K 3/085 137/625.31 |
| 4,850,616 A | 7/1989 | Pava |
| 4,854,499 A | 8/1989 | Neuman |
| 4,856,822 A | 8/1989 | Parker |
| 4,865,362 A | 9/1989 | Holden |
| D303,830 S | 10/1989 | Ramsey et al. |
| 4,871,196 A | 10/1989 | Kingsford |
| 4,896,658 A | 1/1990 | Yonekubo et al. |
| D306,351 S | 2/1990 | Charet et al. |
| 4,901,927 A | 2/1990 | Valdivia |
| 4,903,178 A | 2/1990 | Englot et al. |
| 4,903,897 A | 2/1990 | Hayes |
| 4,903,922 A | 2/1990 | Harris, III |
| 4,907,137 A | 3/1990 | Schladitz et al. |
| 4,907,744 A | 3/1990 | Jousson |
| 4,909,435 A | 3/1990 | Kidouchi et al. |
| 4,911,029 A | 3/1990 | Banba .................. F16K 17/363 137/38 |
| 4,914,759 A | 4/1990 | Goff |
| 4,946,202 A | 8/1990 | Perricone |
| 4,951,329 A | 8/1990 | Shaw |
| 4,953,585 A | 9/1990 | Rollini et al. |
| 4,964,573 A | 10/1990 | Lipski |
| 4,972,048 A | 11/1990 | Martin |
| D313,267 S | 12/1990 | Lenci et al. |
| 4,976,460 A | 12/1990 | Newcombe et al. |
| D314,246 S | 1/1991 | Bache |
| D315,191 S | 3/1991 | Mikol |
| 4,998,673 A | 3/1991 | Pilolla |
| 5,004,158 A | 4/1991 | Halem et al. |
| D317,348 S | 6/1991 | Geneve et al. |
| 5,020,570 A | 6/1991 | Cotter |
| 5,022,103 A | 6/1991 | Faist |
| D317,968 S | 7/1991 | Tsai |
| 5,032,015 A | 7/1991 | Christianson |
| 5,033,528 A | 7/1991 | Volcani |
| 5,033,897 A | 7/1991 | Chen |
| D319,294 S | 8/1991 | Kohler, Jr. et al. |
| D320,064 S | 9/1991 | Presman |
| 5,046,764 A | 9/1991 | Kimura et al. |
| D321,062 S | 10/1991 | Bonbright |
| 5,058,804 A | 10/1991 | Yonekubo et al. |
| D322,119 S | 12/1991 | Haug et al. |
| D322,681 S | 12/1991 | Yuen |
| 5,070,552 A | 12/1991 | Gentry et al. |
| D323,545 S | 1/1992 | Ward |
| 5,082,019 A | 1/1992 | Tetrault |
| 5,086,878 A | 2/1992 | Swift |
| 5,090,624 A | 2/1992 | Rogers |
| 5,100,055 A | 3/1992 | Rokitenetz ............ B05B 1/1654 239/11 |
| D325,769 S | 4/1992 | Haug et al. |
| D325,770 S | 4/1992 | Haug et al. |
| 5,103,384 A | 4/1992 | Drohan |
| D326,311 S | 5/1992 | Lenci et al. |
| D327,115 S | 6/1992 | Rogers |
| 5,121,511 A | 6/1992 | Sakamoto et al. |
| D327,729 S | 7/1992 | Rogers |

(56) References Cited

U.S. PATENT DOCUMENTS

| | | |
|---|---|---|
| 5,127,580 A | 7/1992 | Fu-I |
| 5,134,251 A | 7/1992 | Martin |
| D328,944 S | 8/1992 | Robbins |
| 5,141,016 A | 8/1992 | Nowicki |
| D329,504 S | 9/1992 | Yuen |
| 5,143,300 A | 9/1992 | Cutler |
| 5,145,114 A | 9/1992 | Monch |
| 5,148,556 A | 9/1992 | Bottoms et al. |
| D330,068 S | 10/1992 | Haug et al. |
| D330,408 S | 10/1992 | Thacker |
| D330,409 S | 10/1992 | Raffo |
| 5,153,976 A | 10/1992 | Benchaar et al. |
| 5,154,355 A | 10/1992 | Gonzalez |
| 5,154,483 A | 10/1992 | Zeller |
| 5,161,567 A | 11/1992 | Humpert |
| 5,163,752 A | 11/1992 | Copeland et al. |
| 5,171,429 A | 12/1992 | Yasuo |
| 5,172,860 A | 12/1992 | Yuch |
| 5,172,862 A | 12/1992 | Heimann et al. |
| 5,172,866 A | 12/1992 | Ward |
| D332,303 S | 1/1993 | Klose |
| D332,994 S | 2/1993 | Huen |
| D333,339 S | 2/1993 | Klose |
| 5,197,767 A | 3/1993 | Kimura et al. |
| D334,794 S | 4/1993 | Klose |
| D335,171 S | 4/1993 | Lenci et al. |
| 5,201,468 A | 4/1993 | Freier et al. |
| 5,206,963 A | 5/1993 | Wiens |
| 5,207,499 A | 5/1993 | Vajda et al. |
| 5,213,267 A | 5/1993 | Heimann et al. |
| 5,220,697 A | 6/1993 | Birchfield |
| D337,839 S | 7/1993 | Zeller |
| 5,228,625 A | 7/1993 | Grassberger |
| 5,230,106 A | 7/1993 | Henkin et al. |
| D338,542 S | 8/1993 | Yuen |
| 5,232,162 A | 8/1993 | Chih |
| D339,492 S | 9/1993 | Klose |
| D339,627 S | 9/1993 | Klose |
| D339,848 S | 9/1993 | Gottwald |
| 5,246,169 A | 9/1993 | Heimann et al. |
| 5,246,301 A | 9/1993 | Hirasawa |
| D340,376 S | 10/1993 | Klose |
| 5,253,670 A | 10/1993 | Perrott |
| 5,253,807 A | 10/1993 | Newbegin |
| 5,254,809 A | 10/1993 | Martin |
| D341,007 S | 11/1993 | Haug et al. |
| D341,191 S | 11/1993 | Klose |
| D341,220 S | 11/1993 | Eagan |
| 5,263,646 A | 11/1993 | McCauley |
| 5,265,833 A | 11/1993 | Heimann et al. |
| 5,268,826 A | 12/1993 | Greene |
| 5,276,596 A | 1/1994 | Krenzel |
| 5,277,391 A | 1/1994 | Haug et al. |
| 5,286,071 A | 2/1994 | Storage |
| 5,288,110 A | 2/1994 | Allread |
| 5,294,054 A | 3/1994 | Benedict et al. |
| 5,297,735 A | 3/1994 | Heimann et al. |
| 5,297,739 A | 3/1994 | Allen .................... A46B 17/06 |
| | | 239/530 |
| D345,811 S | 4/1994 | Van Deursen et al. |
| D346,426 S | 4/1994 | Warshawsky |
| D346,428 S | 4/1994 | Warshawsky |
| D346,430 S | 4/1994 | Warshawsky |
| D347,262 S | 5/1994 | Black et al. |
| D347,265 S | 5/1994 | Gottwald |
| 5,316,216 A | 5/1994 | Cammack et al. |
| D348,720 S | 7/1994 | Haug et al. |
| 5,329,650 A | 7/1994 | Zaccai et al. |
| D349,947 S | 8/1994 | Hing-Wah |
| 5,333,787 A | 8/1994 | Smith et al. |
| 5,333,789 A | 8/1994 | Garneys |
| 5,340,064 A | 8/1994 | Heimann et al. |
| 5,340,165 A | 8/1994 | Sheppard |
| D350,808 S | 9/1994 | Warshawsky |
| 5,344,080 A | 9/1994 | Matsui |
| 5,349,987 A | 9/1994 | Shieh |
| 5,356,076 A | 10/1994 | Bishop .................. B05B 7/0425 |
| | | 239/311 |
| 5,356,077 A | 10/1994 | Shames |
| D352,092 S | 11/1994 | Warshawsky |
| D352,347 S | 11/1994 | Dannenberg |
| D352,766 S | 11/1994 | Hill et al. |
| 5,360,172 A | 11/1994 | Wang .................... B05B 1/3026 |
| | | 239/530 |
| 5,368,235 A | 11/1994 | Drozdoff et al. |
| 5,369,556 A | 11/1994 | Zeller |
| 5,370,427 A | 12/1994 | Hoelle et al. |
| 5,385,500 A | 1/1995 | Schmidt |
| D355,242 S | 2/1995 | Warshawsky |
| D355,703 S | 2/1995 | Duell |
| D356,626 S | 3/1995 | Wang |
| 5,397,064 A | 3/1995 | Heitzman |
| 5,398,872 A | 3/1995 | Joubran |
| 5,398,977 A | 3/1995 | Berger et al. |
| 5,402,812 A | 4/1995 | Moineau et al. |
| 5,405,089 A | 4/1995 | Heimann et al. |
| 5,414,879 A | 5/1995 | Hiraishi et al. |
| 5,423,348 A | 6/1995 | Jezek et al. |
| 5,433,384 A | 7/1995 | Chan et al. |
| D361,399 S | 8/1995 | Carbone et al. |
| D361,623 S | 8/1995 | Huen |
| 5,441,075 A | 8/1995 | Clare |
| 5,449,206 A | 9/1995 | Lockwood |
| D363,360 S | 10/1995 | Santarsiero |
| 5,454,809 A | 10/1995 | Janssen |
| 5,468,057 A | 11/1995 | Megerle et al. |
| D364,935 S | 12/1995 | deBlois |
| D365,625 S | 12/1995 | Bova |
| D365,646 S | 12/1995 | deBlois |
| 5,476,225 A | 12/1995 | Chan |
| D366,309 S | 1/1996 | Huang |
| D366,707 S | 1/1996 | Kaiser |
| D366,708 S | 1/1996 | Santarsiero |
| D366,709 S | 1/1996 | Szymanski |
| D366,710 S | 1/1996 | Szymanski |
| 5,481,765 A | 1/1996 | Wang |
| D366,948 S | 2/1996 | Carbone |
| D367,315 S | 2/1996 | Andrus |
| D367,696 S | 3/1996 | Andrus |
| D367,934 S | 3/1996 | Carbone |
| D368,146 S | 3/1996 | Carbone |
| D368,317 S | 3/1996 | Swyst |
| 5,499,767 A | 3/1996 | Morand |
| D368,539 S | 4/1996 | Carbone et al. |
| D368,540 S | 4/1996 | Santarsiero |
| D368,541 S | 4/1996 | Kaiser et al. |
| D368,542 S | 4/1996 | deBlois et al. |
| D369,204 S | 4/1996 | Andrus |
| D369,205 S | 4/1996 | Andrus |
| 5,507,436 A | 4/1996 | Berg |
| D369,873 S | 5/1996 | deBlois et al. |
| D369,874 S | 5/1996 | Santarsiero |
| D369,875 S | 5/1996 | Carbone |
| D370,052 S | 5/1996 | Chan et al. |
| D370,250 S | 5/1996 | Fawcett et al. |
| D370,277 S | 5/1996 | Kaiser |
| D370,278 S | 5/1996 | Nolan |
| D370,279 S | 5/1996 | deBlois |
| D370,280 S | 5/1996 | Kaiser |
| D370,281 S | 5/1996 | Johnstone et al. |
| 5,517,392 A | 5/1996 | Rousso et al. |
| 5,521,803 A | 5/1996 | Eckert et al. |
| D370,542 S | 6/1996 | Santarsiero |
| D370,735 S | 6/1996 | deBlois |
| D370,987 S | 6/1996 | Santarsiero |
| D370,988 S | 6/1996 | Santarsiero |
| D371,448 S | 7/1996 | Santarsiero |
| D371,618 S | 7/1996 | Nolan |
| D371,619 S | 7/1996 | Szymanski |
| D371,856 S | 7/1996 | Carbone |
| D372,318 S | 7/1996 | Szymanski |
| D372,319 S | 7/1996 | Carbone |
| 5,531,625 A | 7/1996 | Zhong |
| 5,539,624 A | 7/1996 | Dougherty |

(56) References Cited

U.S. PATENT DOCUMENTS

| | | |
|---|---|---|
| D372,548 S | 8/1996 | Carbone |
| D372,998 S | 8/1996 | Carbone |
| D373,210 S | 8/1996 | Santarsiero |
| 5,547,132 A | 8/1996 | Grogan |
| 5,547,374 A | 8/1996 | Coleman |
| D373,434 S | 9/1996 | Nolan |
| D373,435 S | 9/1996 | Nolan |
| D373,645 S | 9/1996 | Johnstone et al. |
| D373,646 S | 9/1996 | Szymanski et al. |
| D373,647 S | 9/1996 | Kaiser |
| D373,648 S | 9/1996 | Kaiser |
| D373,649 S | 9/1996 | Carbone |
| D373,651 S | 9/1996 | Szymanski |
| D373,652 S | 9/1996 | Kaiser |
| 5,551,637 A | 9/1996 | Lo |
| 5,552,973 A | 9/1996 | Hsu |
| 5,558,278 A | 9/1996 | Gallorini |
| D374,271 S | 10/1996 | Fleischmann |
| D374,297 S | 10/1996 | Kaiser |
| D374,298 S | 10/1996 | Swyst |
| D374,299 S | 10/1996 | Carbone |
| D374,493 S | 10/1996 | Szymanski |
| D374,494 S | 10/1996 | Santarsiero |
| D374,732 S | 10/1996 | Kaiser |
| D374,733 S | 10/1996 | Santasiero |
| 5,560,548 A | 10/1996 | Mueller et al. |
| 5,567,115 A | 10/1996 | Carbone |
| D375,541 S | 11/1996 | Michaluk |
| 5,577,664 A | 11/1996 | Heitzman |
| D376,217 S | 12/1996 | Kaiser |
| D376,860 S | 12/1996 | Santarsiero |
| D376,861 S | 12/1996 | Johnstone et al. |
| D376,862 S | 12/1996 | Carbone |
| 5,605,173 A | 2/1997 | Arnaud |
| D378,401 S | 3/1997 | Neufeld et al. |
| 5,613,638 A | 3/1997 | Blessing |
| 5,613,639 A | 3/1997 | Storm .......... B05B 1/3026 137/625.32 |
| 5,615,837 A | 4/1997 | Roman |
| 5,624,074 A | 4/1997 | Parisi |
| 5,624,498 A | 4/1997 | Lee et al. |
| D379,212 S | 5/1997 | Chan |
| D379,404 S | 5/1997 | Spelts |
| 5,632,049 A | 5/1997 | Chen |
| D381,405 S | 7/1997 | Waidele et al. |
| D381,737 S | 7/1997 | Chan |
| 5,645,218 A | 7/1997 | Heren .......... B05B 1/3026 239/242 |
| D382,936 S | 8/1997 | Shfaram |
| 5,653,260 A | 8/1997 | Huber |
| 5,667,146 A | 9/1997 | Pimentel et al. |
| D385,332 S | 10/1997 | Andrus |
| D385,333 S | 10/1997 | Caroen et al. |
| D385,334 S | 10/1997 | Caroen et al. |
| D385,616 S | 10/1997 | Dow et al. |
| D385,947 S | 11/1997 | Dow et al. |
| D387,230 S | 12/1997 | von Buelow et al. |
| 5,697,557 A | 12/1997 | Blessing et al. |
| 5,699,964 A | 12/1997 | Bergmann et al. |
| 5,702,057 A | 12/1997 | Huber |
| D389,558 S | 1/1998 | Andrus |
| 5,704,080 A | 1/1998 | Kuhne |
| 5,707,011 A | 1/1998 | Bosio |
| 5,718,380 A | 2/1998 | Schorn et al. |
| D392,369 S | 3/1998 | Chan |
| 5,730,361 A | 3/1998 | Thonnes |
| 5,730,362 A | 3/1998 | Cordes |
| 5,730,363 A | 3/1998 | Kress |
| 5,742,961 A | 4/1998 | Casperson et al. |
| D394,490 S | 5/1998 | Andrus et al. |
| 5,746,375 A | 5/1998 | Guo |
| 5,749,552 A | 5/1998 | Fan |
| 5,749,602 A | 5/1998 | Delaney et al. |
| D394,899 S | 6/1998 | Caroen et al. |
| D395,074 S | 6/1998 | Nelbrook et al. |
| D395,075 S | 6/1998 | Kolada |
| D395,142 S | 6/1998 | Neibrook |
| 5,764,760 A | 6/1998 | Grandbert et al. |
| 5,765,760 A | 6/1998 | Kuo |
| 5,769,802 A | 6/1998 | Wang |
| 5,772,120 A | 6/1998 | Huber |
| 5,778,939 A | 7/1998 | Hok-Yin |
| 5,788,157 A | 8/1998 | Kress |
| D398,370 S | 9/1998 | Purdy |
| 5,806,771 A | 9/1998 | Loschelder et al. |
| 5,819,791 A | 10/1998 | Chronister et al. |
| 5,820,574 A | 10/1998 | Henkin et al. |
| 5,823,431 A | 10/1998 | Pierce |
| 5,823,442 A | 10/1998 | Guo |
| 5,826,803 A | 10/1998 | Cooper |
| 5,833,138 A | 11/1998 | Crane et al. |
| 5,839,666 A | 11/1998 | Heimann et al. |
| D402,350 S | 12/1998 | Andrus |
| D403,754 S | 1/1999 | Gottwald |
| D404,116 S | 1/1999 | Bosio |
| 5,855,348 A | 1/1999 | Fornara |
| 5,860,599 A | 1/1999 | Lin |
| 5,862,543 A | 1/1999 | Reynoso et al. |
| 5,862,985 A | 1/1999 | Nelbrook et al. |
| D405,502 S | 2/1999 | Tse |
| 5,865,375 A | 2/1999 | Hsu |
| 5,865,378 A | 2/1999 | Holllnshead et al. |
| 5,873,647 A | 2/1999 | Kurtz et al. |
| D408,893 S | 4/1999 | Tse |
| D409,276 S | 5/1999 | Ratzlaff |
| D410,276 S | 5/1999 | Ben-Tsur |
| 5,918,809 A | 7/1999 | Simmons |
| 5,918,811 A | 7/1999 | Denham et al. |
| D413,157 S | 8/1999 | Ratzlaff |
| 5,937,905 A | 8/1999 | Santos |
| 5,938,123 A | 8/1999 | Heitzman |
| 5,941,462 A | 8/1999 | Sandor |
| 5,947,388 A | 9/1999 | Woodruff |
| D415,247 S | 10/1999 | Haverstraw et al. |
| 5,961,046 A | 10/1999 | Joubran |
| 5,967,417 A | 10/1999 | Mantel |
| 5,979,776 A | 11/1999 | Williams |
| 5,992,762 A | 11/1999 | Wang |
| D418,200 S | 12/1999 | Ben-Tsur |
| 5,997,047 A | 12/1999 | Pimentel et al. |
| 6,003,165 A | 12/1999 | Loyd |
| D418,902 S | 1/2000 | Haverstraw et al. |
| D418,903 S | 1/2000 | Haverstraw et al. |
| D418,904 S | 1/2000 | Milrud |
| 6,016,975 A | 1/2000 | Amaduzzi |
| D421,099 S | 2/2000 | Mullenmeister |
| 6,021,960 A | 2/2000 | Kehat |
| D422,053 S | 3/2000 | Brenner et al. |
| 6,042,027 A | 3/2000 | Sandvik |
| 6,042,155 A | 3/2000 | Lockwood |
| D422,336 S | 4/2000 | Haverstraw et al. |
| D422,337 S | 4/2000 | Chan |
| D423,083 S | 4/2000 | Haug et al. |
| D423,110 S | 4/2000 | Cipkowski |
| D424,160 S | 5/2000 | Haug et al. |
| D424,161 S | 5/2000 | Haug et al. |
| D424,162 S | 5/2000 | Haug et al. |
| D424,163 S | 5/2000 | Haug et al. |
| D426,290 S | 6/2000 | Haug et al. |
| D427,661 S | 7/2000 | Haverstraw et al. |
| D428,110 S | 7/2000 | Haug et al. |
| D428,125 S | 7/2000 | Chan |
| 6,085,780 A | 7/2000 | Morris |
| D430,267 S | 8/2000 | Milrud et al. |
| 6,095,801 A | 8/2000 | Splewak |
| D430,643 S | 9/2000 | Tse |
| 6,113,002 A | 9/2000 | Finkbeiner |
| 6,123,272 A | 9/2000 | Havlcan et al. |
| 6,123,308 A | 9/2000 | Faisst |
| D432,624 S | 10/2000 | Chan |
| D432,625 S | 10/2000 | Chan |
| D433,096 S | 10/2000 | Tse |
| D433,097 S | 10/2000 | Tse |
| 6,126,091 A | 10/2000 | Heitzman |

(56) References Cited

U.S. PATENT DOCUMENTS

| | | |
|---|---|---|
| 6,126,290 A | 10/2000 | Veigel |
| D434,109 S | 11/2000 | Ko |
| 6,164,569 A | 12/2000 | Hollinshead et al. |
| 6,164,570 A | 12/2000 | Smeltzer |
| D435,889 S | 1/2001 | Ben-Tsur et al. |
| D439,305 S | 3/2001 | Slothower |
| 6,199,580 B1 | 3/2001 | Morris |
| 6,202,679 B1 | 3/2001 | Titus |
| D440,276 S | 4/2001 | Slothower |
| D440,277 S | 4/2001 | Slothower |
| D440,278 S | 4/2001 | Slothower |
| D441,059 S | 4/2001 | Fleischmann |
| 6,209,799 B1 | 4/2001 | Finkbeiner |
| D443,025 S | 5/2001 | Kollmann et al. |
| D443,026 S | 5/2001 | Kollmann et al. |
| D443,027 S | 5/2001 | Kollmann et al. |
| D443,029 S | 5/2001 | Kollmann et al. |
| 6,223,998 B1 | 5/2001 | Heitzman |
| 6,230,984 B1 | 5/2001 | Jager |
| 6,230,988 B1 | 5/2001 | Chao et al. |
| 6,230,989 B1 | 5/2001 | Haverstraw et al. |
| D443,335 S | 6/2001 | Andrus |
| D443,336 S | 6/2001 | Kollmann et al. |
| D443,347 S | 6/2001 | Gottwald |
| 6,241,166 B1 | 6/2001 | Overington et al. |
| 6,250,572 B1 | 6/2001 | Chen |
| D444,846 S | 7/2001 | Cross |
| D444,865 S | 7/2001 | Gottwald |
| D445,871 S | 7/2001 | Fan |
| 6,254,014 B1 | 7/2001 | Clearman et al. |
| 6,254,017 B1 | 7/2001 | Kuo ................. B05B 15/65 239/532 |
| 6,270,278 B1 | 8/2001 | Mauro |
| 6,276,004 B1 | 8/2001 | Bertrand et al. |
| 6,283,447 B1 | 9/2001 | Fleet |
| 6,286,764 B1 | 9/2001 | Garvey et al. |
| D449,673 S | 10/2001 | Kollmann et al. |
| D450,370 S | 11/2001 | Wales et al. |
| D450,805 S | 11/2001 | Lindholm et al. |
| D450,806 S | 11/2001 | Lindholm et al. |
| D450,807 S | 11/2001 | Lindholm et al. |
| D451,169 S | 11/2001 | Lindholm et al. |
| D451,170 S | 11/2001 | Lindholm et al. |
| D451,171 S | 11/2001 | Lindholm et al. |
| D451,172 S | 11/2001 | Lindholm et al. |
| 6,321,777 B1 | 11/2001 | Wu |
| 6,322,006 B1 | 11/2001 | Guo |
| D451,583 S | 12/2001 | Lindholm et al. |
| D451,980 S | 12/2001 | Lindholm et al. |
| D452,553 S | 12/2001 | Lindholm et al. |
| D452,725 S | 1/2002 | Lindholm et al. |
| D452,897 S | 1/2002 | Gillette et al. |
| 6,336,764 B1 | 1/2002 | Liu |
| 6,338,170 B1 | 1/2002 | De Simone |
| D453,369 S | 2/2002 | Lobermeier |
| D453,370 S | 2/2002 | Lindholm et al. |
| D453,551 S | 2/2002 | Lindholm et al. |
| 6,349,735 B2 | 2/2002 | Gul |
| D454,617 S | 3/2002 | Curbbun et al. |
| D454,938 S | 3/2002 | Lord |
| 6,375,342 B1 | 4/2002 | Koren et al. |
| 6,378,841 B1 | 4/2002 | Russell ................. F16K 5/201 251/158 |
| D457,937 S | 5/2002 | Lindholm et al. |
| 6,382,531 B1 | 5/2002 | Tracy |
| D458,348 S | 6/2002 | Mullenmeister |
| 6,412,711 B1 | 7/2002 | Fan |
| D461,224 S | 8/2002 | Lobermeier |
| D461,878 S | 8/2002 | Green et al. |
| 6,450,425 B1 | 9/2002 | Chen |
| 6,454,186 B2 | 9/2002 | Haverstraw et al. |
| 6,463,658 B1 | 10/2002 | Larsson |
| 6,464,265 B1 | 10/2002 | Mikol |
| D465,552 S | 11/2002 | Tse |
| D465,553 S | 11/2002 | Singtoroj |
| 6,484,952 B2 | 11/2002 | Koren |
| D468,800 S | 1/2003 | Tse |
| D469,165 S | 1/2003 | Lim |
| 6,502,796 B1 | 1/2003 | Wales |
| 6,508,415 B2 | 1/2003 | Wang |
| 6,511,001 B1 | 1/2003 | Huang |
| D470,219 S | 2/2003 | Schweitzer |
| 6,516,070 B2 | 2/2003 | Macey |
| D471,253 S | 3/2003 | Tse |
| D471,953 S | 3/2003 | Colligan et al. |
| 6,533,194 B2 | 3/2003 | Marsh et al. |
| 6,537,455 B2 | 3/2003 | Farley |
| D472,958 S | 4/2003 | Young |
| 6,550,697 B2 | 4/2003 | Lai |
| 6,568,605 B1 * | 5/2003 | Chen ................. B05B 1/3013 239/525 |
| 6,585,174 B1 | 7/2003 | Huang ................. B05B 1/3026 239/530 |
| 6,595,439 B1 | 7/2003 | Chen |
| 6,607,148 B1 | 8/2003 | Marsh et al. |
| 6,611,971 B1 | 9/2003 | Antoniello et al. |
| 6,637,676 B2 | 10/2003 | Zieger et al. |
| 6,641,057 B2 | 11/2003 | Thomas et al. |
| D483,837 S | 12/2003 | Fan |
| 6,659,117 B2 | 12/2003 | Gilmore |
| 6,659,372 B2 | 12/2003 | Marsh et al. |
| D485,887 S | 1/2004 | Luettgen et al. |
| D486,888 S | 2/2004 | Lobermeier |
| 6,691,338 B2 | 2/2004 | Zieger |
| 6,691,933 B1 | 2/2004 | Bosio |
| D487,301 S | 3/2004 | Haug et al. |
| D487,498 S | 3/2004 | Blomstrom |
| 6,701,953 B2 | 3/2004 | Agosta |
| 6,715,699 B1 | 4/2004 | Greenberg et al. |
| 6,719,218 B2 | 4/2004 | Cool et al. |
| 6,722,631 B2 | 4/2004 | Bailey ................. F16K 1/22 251/251 |
| D489,798 S | 5/2004 | Hunt |
| D490,498 S | 5/2004 | Gollchowskl |
| 6,736,336 B2 | 5/2004 | Wong |
| 6,739,523 B2 | 5/2004 | Haverstraw et al. |
| 6,739,527 B1 | 5/2004 | Chung |
| D492,004 S | 6/2004 | Haug et al. |
| D492,007 S | 6/2004 | Kollmann et al. |
| 6,742,725 B1 | 6/2004 | Fan |
| D493,208 S | 7/2004 | Lin |
| D493,864 S | 8/2004 | Haug et al. |
| D494,655 S | 8/2004 | Lin |
| D494,661 S | 8/2004 | Zieger et al. |
| D495,027 S | 8/2004 | Mazzola |
| 6,776,357 B1 | 8/2004 | Naito |
| 6,789,751 B1 | 9/2004 | Fan |
| D496,987 S | 10/2004 | Glunk |
| D497,974 S | 11/2004 | Haug et al. |
| D498,514 S | 11/2004 | Haug et al. |
| D500,121 S | 12/2004 | Blomstrom |
| 6,827,039 B1 | 12/2004 | Nelson |
| D500,549 S | 1/2005 | Blomstrom |
| D501,242 S | 1/2005 | Blomstrom |
| 6,840,493 B2 | 1/2005 | York ................. F15B 15/065 251/250 |
| D502,760 S | 3/2005 | Zieger et al. |
| D502,761 S | 3/2005 | Zieger et al. |
| D503,211 S | 3/2005 | Lin |
| D503,463 S | 3/2005 | Hughes et al. |
| 6,863,227 B2 | 3/2005 | Wollenberg et al. |
| 6,869,030 B2 | 3/2005 | Blessing et al. |
| D503,774 S | 4/2005 | Zieger |
| D503,775 S | 4/2005 | Zieger |
| D503,966 S | 4/2005 | Zieger |
| 6,899,292 B2 | 5/2005 | Titinet |
| D506,243 S | 6/2005 | Wu |
| D507,037 S | 7/2005 | Wu |
| 6,935,581 B2 | 8/2005 | Titinet |
| D509,280 S | 9/2005 | Bailey et al. |
| D509,563 S | 9/2005 | Bailey et al. |
| D510,123 S | 9/2005 | Tsai |
| D511,809 S | 11/2005 | Haug et al. |
| D512,119 S | 11/2005 | Haug et al. |

(56) References Cited

U.S. PATENT DOCUMENTS

| | | |
|---|---|---|
| 6,981,661 B1 | 1/2006 | Chen |
| D516,169 S | 2/2006 | Wu |
| 7,000,854 B2 | 2/2006 | Malek et al. |
| 7,004,409 B2 | 2/2006 | Okubo |
| 7,004,410 B2 | 2/2006 | Li |
| D520,109 S | 5/2006 | Wu |
| 7,040,554 B2 | 5/2006 | Drennow |
| 7,048,210 B2 | 5/2006 | Clark |
| 7,055,767 B1 | 6/2006 | Ko |
| D525,341 S | 7/2006 | Bossini |
| 7,070,125 B2 | 7/2006 | Williams et al. |
| 7,077,342 B2 | 7/2006 | Lee |
| D527,440 S | 8/2006 | Macan |
| 7,093,780 B1 | 8/2006 | Chung |
| 7,093,819 B1 | 8/2006 | Hall ............... F16K 5/0642 |
| | | 251/214 |
| 7,097,122 B1 | 8/2006 | Farley |
| D527,790 S | 9/2006 | Hughes et al. |
| D528,631 S | 9/2006 | Gillette et al. |
| 7,100,845 B1 | 9/2006 | Hsieh |
| 7,111,795 B2 | 9/2006 | Thong |
| 7,111,798 B2 | 9/2006 | Thomas et al. |
| D529,986 S | 10/2006 | Chan |
| D530,389 S | 10/2006 | Glenslak et al. |
| D530,392 S | 10/2006 | Tse |
| D531,259 S | 10/2006 | Hsieh |
| 7,114,666 B2 | 10/2006 | Luettgen et al. |
| D533,253 S | 12/2006 | Luettgen et al. |
| D534,239 S | 12/2006 | Dingler et al. |
| D535,354 S | 1/2007 | Wu |
| D536,060 S | 1/2007 | Sadler |
| 7,156,325 B1 | 1/2007 | Chen |
| 7,182,043 B1 | 2/2007 | Nelson |
| D538,391 S | 3/2007 | Mazzola |
| D538,395 S | 3/2007 | Starck |
| D540,424 S | 4/2007 | Kirar |
| D540,425 S | 4/2007 | Endo et al. |
| D540,426 S | 4/2007 | Cropelli |
| D540,427 S | 4/2007 | Bouroullec et al. |
| D542,391 S | 5/2007 | Gilbert |
| D542,393 S | 5/2007 | Haug et al. |
| D544,573 S | 6/2007 | Dingier et al. |
| 7,229,031 B2 | 6/2007 | Schmidt |
| 7,243,863 B2 | 7/2007 | Glunk |
| 7,246,760 B2 | 7/2007 | Marty et al. |
| D552,713 S | 10/2007 | Rexach |
| 7,278,591 B2 | 10/2007 | Clearman et al. |
| D556,295 S | 11/2007 | Genord et al. |
| 7,299,510 B2 | 11/2007 | Tsai ............... E03C 1/023 |
| | | 239/283 |
| D557,763 S | 12/2007 | Schonherr et al. |
| D557,764 S | 12/2007 | Schonherr et al. |
| D557,765 S | 12/2007 | Schonherr et al. |
| D558,301 S | 12/2007 | Hoernig |
| 7,303,151 B2 | 12/2007 | Wu |
| D559,357 S | 1/2008 | Wang et al. |
| D559,945 S | 1/2008 | Patterson et al. |
| D560,269 S | 1/2008 | Tse |
| D562,937 S | 2/2008 | Schonherr et al. |
| D562,938 S | 2/2008 | Blessing |
| D562,941 S | 2/2008 | Pan |
| 7,331,536 B1 | 2/2008 | Zhen et al. |
| 7,347,388 B2 | 3/2008 | Chung |
| D565,699 S | 4/2008 | Berberet |
| D565,702 S | 4/2008 | Daunter et al. |
| D565,703 S | 4/2008 | Lammel et al. |
| D566,228 S | 4/2008 | Neagoe |
| D566,229 S | 4/2008 | Rexach |
| D567,328 S | 4/2008 | Spangler et al. |
| D567,335 S | 4/2008 | Huang |
| 7,360,723 B2 | 4/2008 | Lev |
| 7,364,097 B2 | 4/2008 | Okuma |
| 7,374,112 B1 | 5/2008 | Bulan et al. |
| 7,384,007 B2 | 6/2008 | Ho |
| D577,099 S | 9/2008 | Leber |
| D577,793 S | 9/2008 | Leber |
| D578,604 S | 10/2008 | Wu et al. |
| D578,605 S | 10/2008 | Wu et al. |
| D578,608 S | 10/2008 | Wu et al. |
| D580,012 S | 11/2008 | Quinn et al. |
| D580,513 S | 11/2008 | Quinn et al. |
| D581,013 S | 11/2008 | Citterio |
| D581,014 S | 11/2008 | Quinn et al. |
| D581,485 S | 11/2008 | Kollmann et al. |
| 7,461,698 B2 | 12/2008 | Klipstein ............... E21B 21/106 |
| | | 166/332.4 |
| D586,426 S | 2/2009 | Schoenherr et al. |
| 7,503,345 B2 | 3/2009 | Paterson et al. |
| D590,048 S | 4/2009 | Leber et al. |
| 7,520,448 B2 | 4/2009 | Luettgen et al. |
| D592,276 S | 5/2009 | Shoenherr et al. |
| D592,278 S | 5/2009 | Leber |
| 7,537,175 B2 | 5/2009 | Miura et al. |
| D599,883 S | 9/2009 | Tippens |
| D600,777 S | 9/2009 | Whitaker et al. |
| D603,935 S | 11/2009 | Leber |
| 7,617,990 B2 | 11/2009 | Huffman |
| D605,731 S | 12/2009 | Leber |
| D606,623 S | 12/2009 | Whitaker et al. |
| D606,626 S | 12/2009 | Zore |
| D608,412 S | 1/2010 | Barnard et al. |
| D608,413 S | 1/2010 | Barnard et al. |
| D616,061 S | 5/2010 | Whitaker et al. |
| 7,721,363 B2 | 5/2010 | Huang |
| 7,721,979 B2 | 5/2010 | Mazzola |
| D617,419 S | 6/2010 | Lee |
| D617,873 S | 6/2010 | Lee |
| 7,740,186 B2 | 6/2010 | Macan et al. |
| D621,904 S | 8/2010 | Yoo et al. |
| D621,905 S | 8/2010 | Yoo et al. |
| 7,770,820 B2 | 8/2010 | Clearman et al. |
| 7,770,822 B2 | 8/2010 | Leber |
| 7,779,860 B2 | 8/2010 | Pears ............... A47L 9/0072 |
| | | 137/556 |
| D624,156 S | 9/2010 | Leber |
| 7,789,326 B2 | 9/2010 | Luettgen ............... B05B 1/1636 |
| | | 239/447 |
| D625,776 S | 10/2010 | Williams |
| 7,832,662 B2 | 11/2010 | Gallo |
| D628,676 S | 12/2010 | Lee |
| D629,867 S | 12/2010 | Rexach et al. |
| 7,871,020 B2 | 1/2011 | Nelson et al. |
| D633,174 S | 2/2011 | Lee |
| D637,694 S | 5/2011 | Lammel et al. |
| D641,830 S | 7/2011 | Alexander |
| D641,831 S | 7/2011 | Williams |
| 7,971,855 B2 | 7/2011 | Burgess ............... F16K 5/0621 |
| | | 251/315.1 |
| 7,988,070 B1 | 8/2011 | Yang ............... B05B 1/18 |
| | | 239/116 |
| 8,020,787 B2 | 9/2011 | Leber |
| 8,020,788 B2 | 9/2011 | Luettgen et al. |
| 8,028,935 B2 | 10/2011 | Leber |
| D652,108 S | 1/2012 | Eads |
| D652,110 S | 1/2012 | Nichols |
| D652,114 S | 1/2012 | Yoo |
| D652,894 S | 1/2012 | Nichols |
| 8,109,450 B2 | 2/2012 | Luettgen et al. |
| D655,389 S | 3/2012 | Schoenherr et al. |
| D656,582 S | 3/2012 | Flowers et al. |
| 8,132,745 B2 | 3/2012 | Leber et al. |
| 8,132,786 B2 | 3/2012 | Burgess ............... F16K 5/0621 |
| | | 251/315.1 |
| 8,146,838 B2 | 4/2012 | Luettgen et al. |
| D660,940 S | 5/2012 | Flowers et al. |
| 8,220,726 B2 | 7/2012 | Qui et al. |
| D667,531 S | 9/2012 | Romero et al. |
| D669,158 S | 10/2012 | Flowers et al. |
| 8,292,200 B2 | 10/2012 | Macan et al. |
| 8,297,534 B2 | 10/2012 | Li et al. |
| D672,433 S | 12/2012 | Yoo et al. |
| D673,649 S | 1/2013 | Quinn et al. |
| D673,650 S | 1/2013 | Chibitty |
| D674,047 S | 1/2013 | Yoo et al. |

(56) References Cited

U.S. PATENT DOCUMENTS

| | | | |
|---|---|---|---|
| D674,050 S | 1/2013 | Quinn et al. | |
| 8,348,181 B2 | 1/2013 | Whitaker | |
| 8,366,024 B2 | 2/2013 | Leber | B05B 3/04 239/381 |
| D678,463 S | 3/2013 | Quinn et al. | |
| D678,467 S | 3/2013 | Quinn et al. | |
| 8,640,973 B2 | 2/2014 | Gansebom | |
| 8,746,278 B2 | 6/2014 | Py | A61M 39/10 137/614 |
| D731,026 S | 6/2015 | Bahler | |
| D737,931 S | 9/2015 | Schoenherr | |
| D744,612 S | 12/2015 | Peterson | |
| 9,199,254 B2 | 12/2015 | Zhou | B05B 1/1636 |
| 9,295,997 B2 | 3/2016 | Harwanko et al. | |
| D753,794 S | 4/2016 | Starck | |
| D755,346 S | 5/2016 | Yan | |
| 9,387,493 B2 | 7/2016 | Lev | |
| 9,387,495 B2 | 7/2016 | Schumacher | B05B 1/30 |
| 9,399,860 B2 | 7/2016 | Lev | |
| 9,550,195 B1 | 1/2017 | Cao | B05B 1/185 |
| D778,402 S | 2/2017 | Schoenherr | |
| D778,403 S | 2/2017 | Schoenherr | |
| D778,404 S | 2/2017 | Schoenherr | |
| 9,566,593 B2 | 2/2017 | Marty et al. | |
| D787,634 S | 5/2017 | Eads | |
| 9,687,861 B1 | 6/2017 | Gomez | B05B 1/185 |
| D793,529 S | 8/2017 | Garland | |
| 9,752,689 B2 | 9/2017 | Broome | F16K 5/0647 |
| D811,523 S | 2/2018 | Andrew | |
| D828,906 S | 9/2018 | Lu et al. | |
| D832,975 S | 11/2018 | Garuti et al. | |
| 2001/0042797 A1 | 11/2001 | Shrigley | |
| 2002/0109023 A1 | 8/2002 | Thomas et al. | |
| 2003/0042332 A1 | 3/2003 | Lai | |
| 2003/0062426 A1 | 4/2003 | Gregory et al. | |
| 2003/0121993 A1 | 7/2003 | Haverstraw et al. | |
| 2003/0127541 A1 | 7/2003 | Marino | B05B 1/12 239/539 |
| 2003/0127620 A1 | 7/2003 | Houde | A61M 39/0613 251/229 |
| 2003/0205688 A1 | 11/2003 | Milberger | F16K 5/0605 251/315.01 |
| 2004/0000405 A1 | 1/2004 | Fournier, Jr. | E21B 21/10 166/373 |
| 2004/0074993 A1 | 4/2004 | Thomas et al. | |
| 2004/0118949 A1 | 6/2004 | Marks | |
| 2004/0217209 A1 | 11/2004 | Bui | |
| 2004/0244105 A1 | 12/2004 | Tsai | |
| 2004/0256497 A1 | 12/2004 | Sharkey | A62C 31/02 239/569 |
| 2005/0001072 A1 | 1/2005 | Bolus et al. | |
| 2005/0284967 A1 | 12/2005 | Korb | |
| 2006/0016908 A1 | 1/2006 | Chung | |
| 2006/0016913 A1 | 1/2006 | Lo | |
| 2006/0102747 A1 | 5/2006 | Ho | |
| 2006/0163391 A1 | 7/2006 | Schorn | |
| 2006/0219822 A1 | 10/2006 | Miller et al. | |
| 2006/0272086 A1 | 12/2006 | Mesa | |
| 2007/0040054 A1 | 2/2007 | Farzan | |
| 2007/0200013 A1 | 8/2007 | Hsiao | |
| 2007/0210272 A1 | 9/2007 | Giacomini | F16K 27/067 251/148 |
| 2007/0246577 A1 | 10/2007 | Leber | |
| 2007/0255021 A1 | 11/2007 | Cristina | |
| 2007/0272770 A1 | 11/2007 | Leber et al. | |
| 2008/0041471 A1* | 2/2008 | Paterson | F16K 5/0407 137/625.47 |
| 2008/0060706 A1 | 3/2008 | Combs | A62C 35/68 137/556 |
| 2008/0073449 A1 | 3/2008 | Haynes et al. | |
| 2008/0083844 A1 | 4/2008 | Leber et al. | |
| 2008/0121293 A1 | 5/2008 | Leber et al. | |
| 2008/0121771 A1 | 5/2008 | Sen et al. | |
| 2008/0156897 A1 | 7/2008 | Leber | |
| 2008/0156902 A1 | 7/2008 | Luettgen et al. | |
| 2008/0223951 A1 | 9/2008 | Tracey | A01G 25/16 239/71 |
| 2008/0223957 A1 | 9/2008 | Schorn | |
| 2008/0272203 A1 | 11/2008 | Leber | B05B 15/65 239/101 |
| 2008/0272591 A1 | 11/2008 | Leber | |
| 2009/0039181 A1 | 2/2009 | Auer, Jr. | |
| 2009/0194613 A1 | 8/2009 | Mang | B05B 1/18 239/562 |
| 2009/0200404 A1 | 8/2009 | Cristina | |
| 2009/0218420 A1 | 9/2009 | Mazzola | |
| 2009/0223579 A1* | 9/2009 | Bautch | B05B 1/3026 137/561 R |
| 2009/0307836 A1 | 12/2009 | Blattner et al. | |
| 2010/0025611 A1 | 2/2010 | Mazzacano | F16K 5/0647 251/292 |
| 2010/0127096 A1 | 5/2010 | Leber | |
| 2010/0140522 A1 | 6/2010 | Chang | F16K 5/0647 251/315.16 |
| 2010/0258695 A1 | 10/2010 | Wu | |
| 2010/0264237 A1 | 10/2010 | Engel | B05B 1/1654 239/443 |
| 2010/0320295 A1 | 12/2010 | Mang | B05B 1/18 |
| 2011/0000983 A1 | 1/2011 | Chang | |
| 2011/0011953 A1 | 1/2011 | Macan et al. | |
| 2011/0073678 A1 | 3/2011 | Qiu et al. | |
| 2011/0121098 A1 | 5/2011 | Luettgen et al. | |
| 2011/0179566 A1 | 7/2011 | Yang | |
| 2012/0048968 A1 | 3/2012 | Williams | |
| 2012/0091377 A1 | 4/2012 | Tips | B05B 12/002 251/231 |
| 2012/0187320 A1 | 7/2012 | Lu | |
| 2012/0222207 A1 | 9/2012 | Slothower et al. | |
| 2013/0001455 A1 | 1/2013 | Thomas | F16K 5/0605 251/315.16 |
| 2013/0026397 A1 | 1/2013 | Burgess | F16K 31/535 251/65 |
| 2013/0126646 A1 | 5/2013 | Wu | |
| 2013/0140475 A1 | 6/2013 | Burgess | F16K 31/088 251/65 |
| 2013/0147186 A1 | 6/2013 | Leber | |
| 2013/0247294 A1 | 9/2013 | Zhou | B05B 1/1636 4/615 |
| 2013/0340854 A1 | 12/2013 | Quinn | E03C 1/0412 137/343 |
| 2014/0252138 A1 | 9/2014 | Wischstadt et al. | |
| 2014/0367482 A1 | 12/2014 | Cacka | |
| 2015/0137018 A1 | 5/2015 | Russell | F16K 31/528 251/252 |
| 2015/0165452 A1 | 6/2015 | Luettgen et al. | |
| 2015/0211644 A1 | 7/2015 | Pavlik | F16K 5/0647 251/315.1 |
| 2015/0226341 A1 | 8/2015 | Broome | F16K 5/0647 251/249.5 |
| 2015/0233101 A1 | 8/2015 | Andersen | |
| 2015/0211728 A1 | 12/2015 | Zhadanov | |
| 2016/0015000 A1 | 1/2016 | Diez | |
| 2016/0236213 A1 | 8/2016 | Jenkins | B05B 1/3026 |
| 2016/0250651 A1 | 9/2016 | Ayers | B05B 1/12 239/391 |
| 2017/0016545 A1 | 1/2017 | Wang | F16K 11/0873 |
| 2018/0010704 A1 | 1/2018 | Mitsuoka | F16K 35/027 |
| 2018/0056310 A1 | 3/2018 | Dodd | B05B 1/1654 |
| 2018/0065131 A1 | 3/2018 | Rogers | B05B 1/1627 |
| 2018/0195625 A1 | 7/2018 | Hung | F16K 5/0626 |

FOREIGN PATENT DOCUMENTS

| | | |
|---|---|---|
| CH | 234284 | 3/1963 |
| CN | 201260999 Y | 6/2009 |
| CN | 200920182881 | 9/2009 |
| CN | 101628263 A | 1/2010 |
| CN | 101773880 A | 7/2010 |
| CN | 201940296 U | 8/2011 |
| CN | 201230021930 | 2/2012 |
| CN | 201530310992 | 8/2015 |

(56) References Cited

FOREIGN PATENT DOCUMENTS

| | | |
|---|---|---|
| DE | 352813 | 5/1922 |
| DE | 848627 | 9/1952 |
| DE | 854100 | 10/1952 |
| DE | 2360534 | 6/1974 |
| DE | 2806093 | 8/1979 |
| DE | 3107808 | 9/1982 |
| DE | 3246327 | 6/1984 |
| DE | 3440901 | 7/1985 |
| DE | 3706320 | 3/1988 |
| DE | 8804236 | 6/1988 |
| DE | 4034695 | 5/1991 |
| DE | 19608085 | 9/1996 |
| DE | 10034818 A1 | 1/2002 |
| DE | 202005000881 | 3/2005 |
| DE | 102006032017 | 1/2008 |
| DE | 202008009530 | 9/2008 |
| DE | 202013101201 | 3/2013 |
| EP | 0167063 | 6/1985 |
| EP | 0478999 | 4/1992 |
| EP | 0514753 | 11/1992 |
| EP | 0435030 | 7/1993 |
| EP | 0617644 | 10/1994 |
| EP | 0683354 | 11/1995 |
| EP | 0687851 | 12/1995 |
| EP | 0695907 | 2/1996 |
| EP | 0700729 | 3/1996 |
| EP | 0719588 | 7/1996 |
| EP | 0721082 | 7/1996 |
| EP | 0733747 | 9/1996 |
| EP | 0808661 | 11/1997 |
| EP | 0726811 | 1/1998 |
| EP | 1921214 | 5/2008 |
| EP | 2164642 | 10/2010 |
| EP | 2260945 | 12/2010 |
| FR | 538538 | 6/1922 |
| FR | 873808 | 7/1942 |
| FR | 1039750 | 10/1953 |
| FR | 1098836 | 8/1955 |
| FR | 2591099 | 6/1987 |
| FR | 2596492 | 10/1987 |
| FR | 2695452 | 3/1994 |
| GB | 10086 | 4/1894 |
| GB | 3314 | 12/1914 |
| GB | 129812 | 7/1919 |
| GB | 204600 | 10/1923 |
| GB | 634483 | 3/1950 |
| GB | 971866 | 10/1964 |
| GB | 1111126 | 4/1968 |
| GB | 2066074 | 1/1980 |
| GB | 2066704 | 7/1981 |
| GB | 2068778 | 8/1981 |
| GB | 2121319 | 12/1983 |
| GB | 2155984 | 10/1985 |
| GB | 2156932 A | 10/1985 |
| GB | 2199771 | 7/1988 |
| GB | 2298595 | 11/1996 |
| GB | 2337471 | 11/1999 |
| IT | 327400 | 7/1935 |
| IT | 350359 | 7/1937 |
| IT | 563459 | 5/1957 |
| JP | S63-181459 | 11/1988 |
| JP | H2-78660 | 6/1990 |
| JP | 4062238 | 2/1992 |
| JP | 4146708 | 5/1992 |
| JP | 2004278194 | 10/2004 |
| NL | 8902957 | 6/1991 |
| WO | WO93/12894 | 7/1993 |
| WO | WO93/25839 | 12/1993 |
| WO | WO96/00617 | 1/1996 |
| WO | WO98/30336 | 7/1998 |
| WO | WO99/59726 | 11/1999 |
| WO | WO00/10720 | 3/2000 |
| WO | WO08/082699 | 7/2008 |
| WO | WO10/04593 | 1/2010 |

OTHER PUBLICATIONS

Color Copy, Labeled 1A Gemlo, available at least as early as Dec. 2, 1998.
Color Copy, Labeled 1B, Gemlo, available at least as early as Dec. 2, 1998.
International Search Report, PCT/US07/88962, 9 pages, dated Jun. 10, 2008.
International Search Report, PCT/US07/67141, 8 pages, dated Jul. 2, 2008.
EZ Wash Wand, accessed at least as early as Feb. 2016, http://www.ezwashwand.com.
WashWands, accessed at least as early as Feb. 2016, http://www.washwand.com.
Woof Washer, accessed at least as early as Feb. 2016, http://www.woofwasher.com.

* cited by examiner

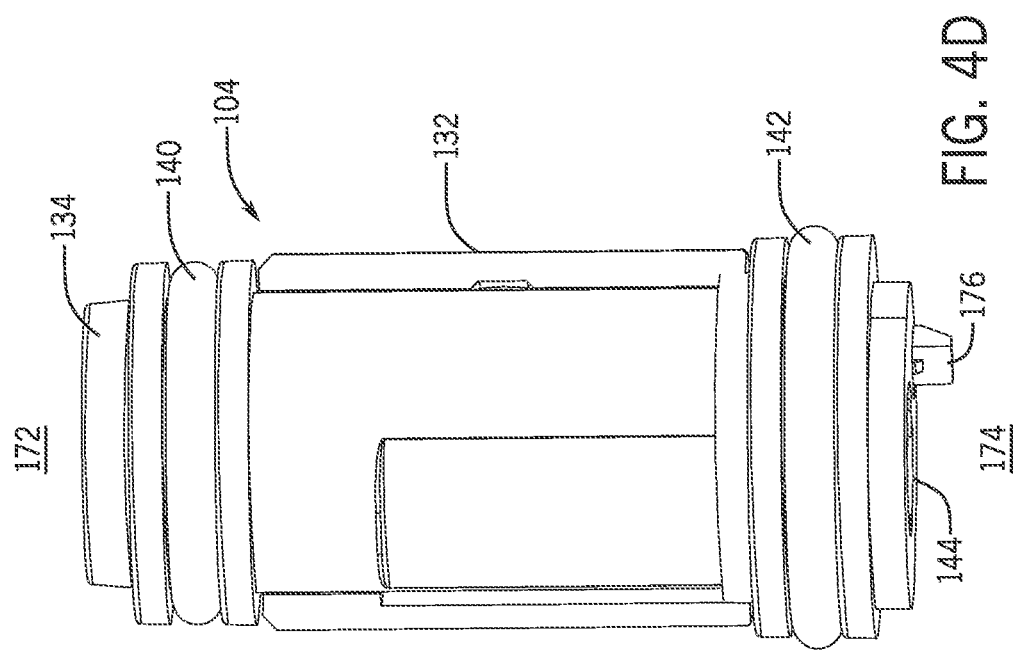

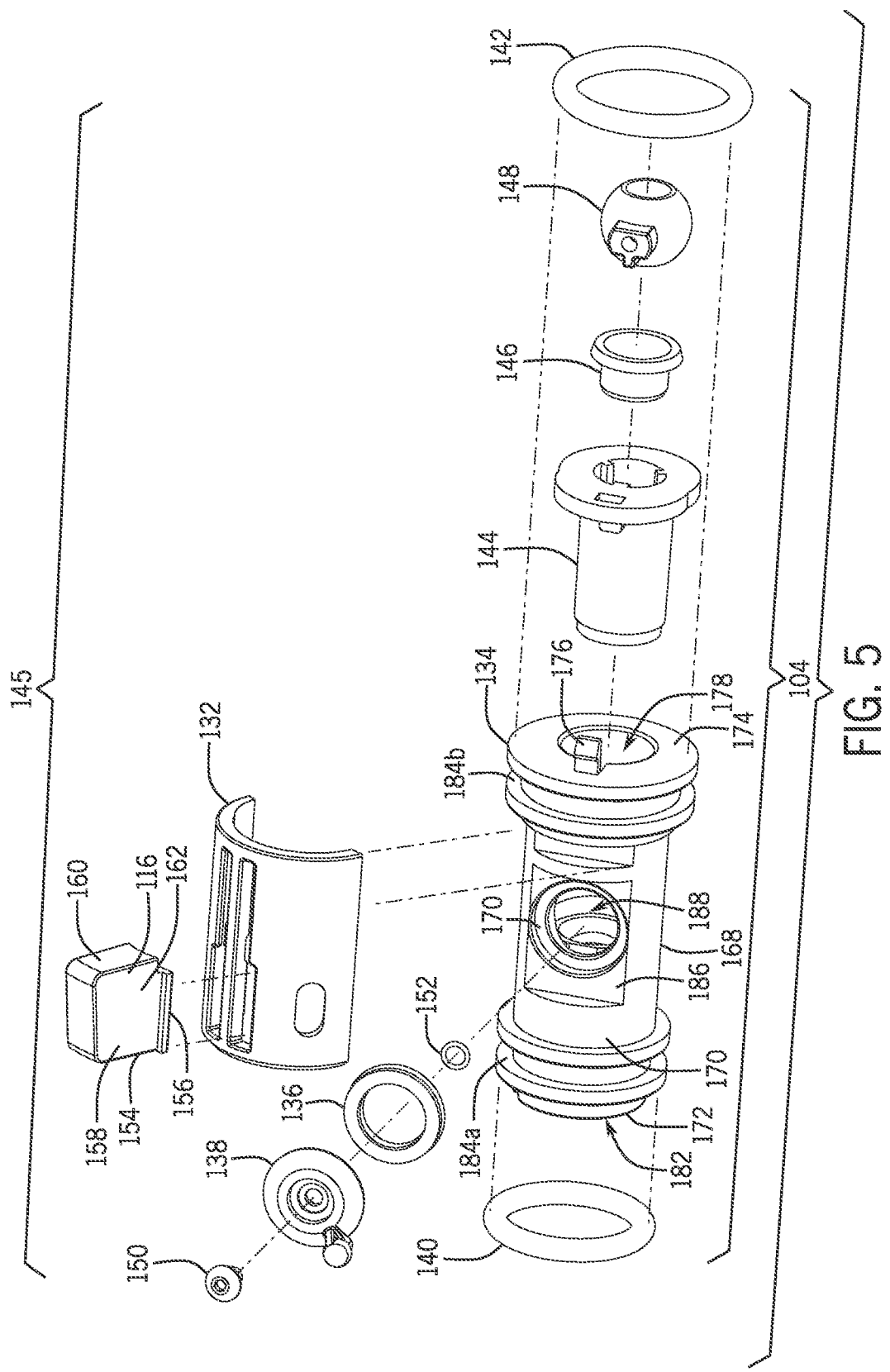

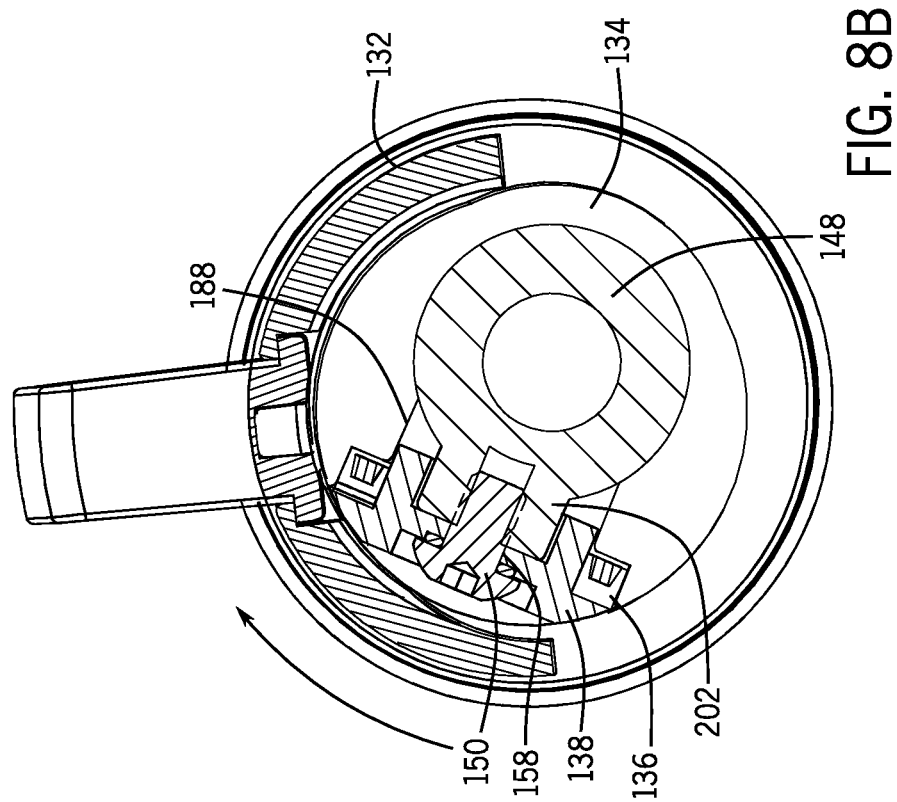

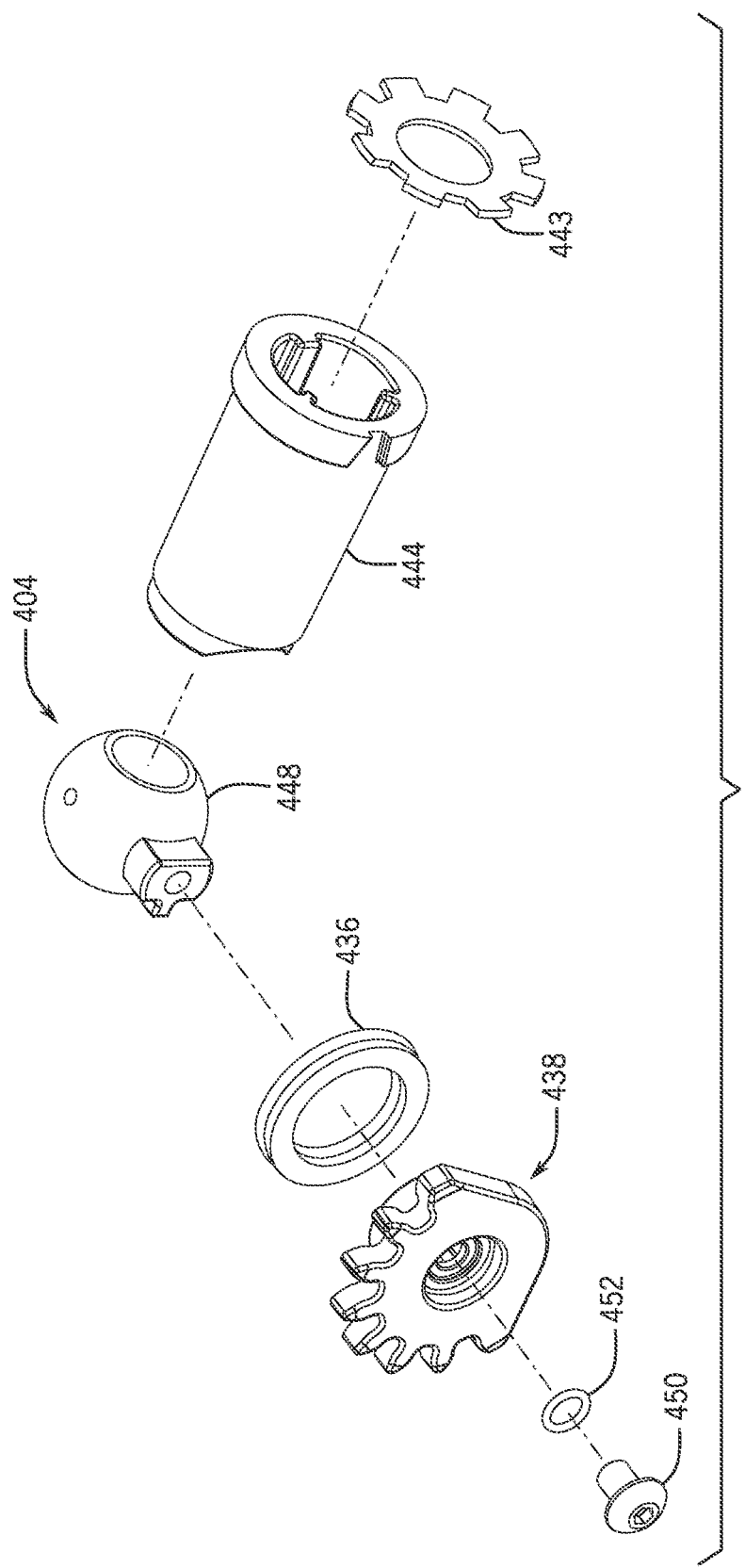

PAUSE ASSEMBLY FOR SHOWERHEADS

CROSS REFERENCE TO RELATED APPLICATIONS

This application is a continuation of U.S. application Ser. No. 16/540,905 entitled "Linearly Actuated Pause Assembly for Showerheads," filed on Aug. 14, 2019, which is a divisional of U.S. application Ser. No. 15/699,153 entitled "Pause Assembly for Showerheads," filed on Sep. 8, 2017 (now U.S. Pat. No. 10,441,960), which claims the benefit of priority under 35 U.S.C. § 119(e) of U.S. Provisional Patent Application No. 62/384,870 filed Sep. 8, 2016, and entitled "Pause Assembly for Showerheads," each of which are hereby incorporated herein in their entireties.

TECHNICAL FIELD

The present disclosure relates to bathing and showering devices, and more specifically to showerheads.

BACKGROUND

Showerheads come in many forms, such as fixed mount showerheads that are secured in position to a wall or other support structure and handheld showerheads that are movable relation to the wall or support structure. Most showerhead systems include controls for turning the showerhead on/off, as well as adjusting the temperature. These controls typically include valves, such as hot and cold water valves and/or mixing valves that determine the amount of hot/cold water delivered from one or more fluid sources to the showerhead. For many showerhead systems these controls are connected to the wall or support structure and are separate from the showerhead system. In these instances, the controls may be out of the reach of a user while the user is showering, especially with handheld showerheads where the user may be on the opposite site of the shower enclosure. However, there may be times when a user needs to quickly pause or dramatically reduce the water flow or otherwise make adjustments to the flow. Therefore, there is a need for a control assembly that can be easily accessed by a user at different locations in the shower enclosure.

SUMMARY

In one exemplary embodiment, a showerhead is disclosed. The showerhead may include a head portion operably connected to a showerhead engine, the engine including a plurality of nozzles in fluid communication with the head portion and a handle fluidly connected to a water source, the handle defining a flow path between the water source and the head portion. The showerhead may also include a pause assembly positioned within the flow path of the handle and operable to vary a flow volume from the water source to the head portion. The pause assembly includes a valve housing received within the flow path and defining a valve cavity in fluid communication with the flow path and the head portion; an actuator movable along an arcuate path on an outer surface of the valve housing from a first position to a second position; and a valve operably connected to the actuator and receive within the valve cavity, as the actuator moves from the first position to the second position, the valve rotates within the valve cavity from an open positon to a closed position.

In another exemplary embodiment, a showerhead including a housing defining a plurality of nozzles and an inlet and having a water control assembly is disclosed. The water control assembly may be positioned at least partially within the housing between the plurality of nozzles and the inlet to control water flow from the inlet to the plurality of nozzles. The water control assembly including an actuator linearly movable along a length of the housing, a valve operably coupled to the actuator that rotates from a first position allowing fluid flow from the inlet to reach the nozzles to a second position reducing fluid flow from the inlet to the nozzles, and a valve driver coupled between the actuator and the valve, where the valve driver converts the linear motion of the actuator into a rotational movement of the valve.

In yet another embodiment, a handheld spray head is disclosed. The spray head including a core assembly defining a flow path therein and fluidly connected to a fluid source, the core assembly including a core outer surface and a plurality of nozzles. The spray head also includes a housing having a housing outer surface that is positioned around the core assembly and a flow state assembly positioned within a flow path of the core assembly and operable to vary a flow volume from the fluid sources to the nozzles. The flow state assembly includes an actuator movable along a linear path on the core outer surface, a control operably connected to the actuator and movable along a linear path on the housing outer surface, and a valve operably connected to the actuator and positioned within the flow path, and as the actuator moves, the valve changes the flow volume within the flow path between the flow state assembly and the nozzles.

In another embodiment, a handheld showerhead is disclosed. The showerhead including a handle portion having an inlet and a flow pathway, a head portion extending from the handle portion and defining a plurality of nozzle apertures in fluid communication with the flow pathway, and a pause assembly connected to the handle portion and positioned within the flow pathway to vary a fluid flow from the inlet to the plurality of nozzle apertures. The pause assembly including a controller movable relative to the handle portion and extending outside of the handle to be gripped by a user, a driver coupled to the controller and movable therewith, and a valve coupled to the driver, and as the user moves the controller along a longitudinal axis of the handle portion, the driver converts the motion of the controller into a rotation of the valve, such that the valve rotates between a first position defining a first flow to the plurality of nozzles and a second position defining a second flow to the plurality of nozzles.

In another embodiment, a handheld showerhead is disclosed. The showerhead includes a head portion including a plurality of nozzles, a handle extending from the head portion and including an inlet, and a pause assembly positioned within the handle to control water flow from the inlet to the plurality of nozzles. The pause assembly includes a control extending outwardly from the handle for manipulation by a user to change a state of the pause assembly and an actuator that translates motion of the control to change the state of the pause assembly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIG. 4D is a side elevation view of the control assembly of FIG. 4A.

FIG. 5 is an exploded view of the control assembly of FIG. 4A.

FIG. 8B is a cross-section view of the control assembly taken along line 8B-8B in FIG. 4A.

FIG. 15B is an exploded top isometric view of the control assembly of FIG. 15A.

DETAILED DESCRIPTION

The present disclosure is generally related to a control assembly for a showerhead that can be positioned on a showerhead so that its movable with the showerhead and easily accessible by a user. The control assembly can be used with a fixed mount or a handheld showerhead and may be incorporated into a housing for the showerhead. In instances where the control assembly is incorporated into a handheld showerhead, the user can move to different locations of a shower or bath enclosure with the showerhead and still be able to quickly and efficiently pause or otherwise control the flow of the fluid through the showerhead.

In one example, the control assembly is a pause assembly that can pause, reduce, or stop water flow from a water source to the showerhead nozzles. In this example, the pause assembly is positioned within a housing for the showerhead and includes a valve housing, a valve, and an actuator connected to the housing and the valve to move the valve between various positions within the valve housing. The valve actuator may include a control, such as a slide switch, button, or the like, that is accessible to the user while holding or touching the housing of the showerhead. For example, with a handheld showerhead, the pause assembly may be positioned within a handle of the showerhead and the control extends outwards from the handle. As the user actuates the control, the valve moves to open or close a flow pathway between a fluid source (e.g., J-pipe, wall outlet, hose) and the nozzles of the showerhead. The valve may be configured to have a binary (e.g. fully open or fully closed) configuration, or may have a spectrum configuration allowing varying flow amounts.

In some embodiments, the pause assembly includes a ball valve actuated by a valve driver connected to the user control. The valve driver may convert arcuate movement or linear movement of the user control into rotation of the ball valve within a valve retainer. As the ball valve rotates to different orientations, flow through the valve retainer is opened or closed, allowing or constricting flow to the nozzles of the showerhead.

Figure 1:
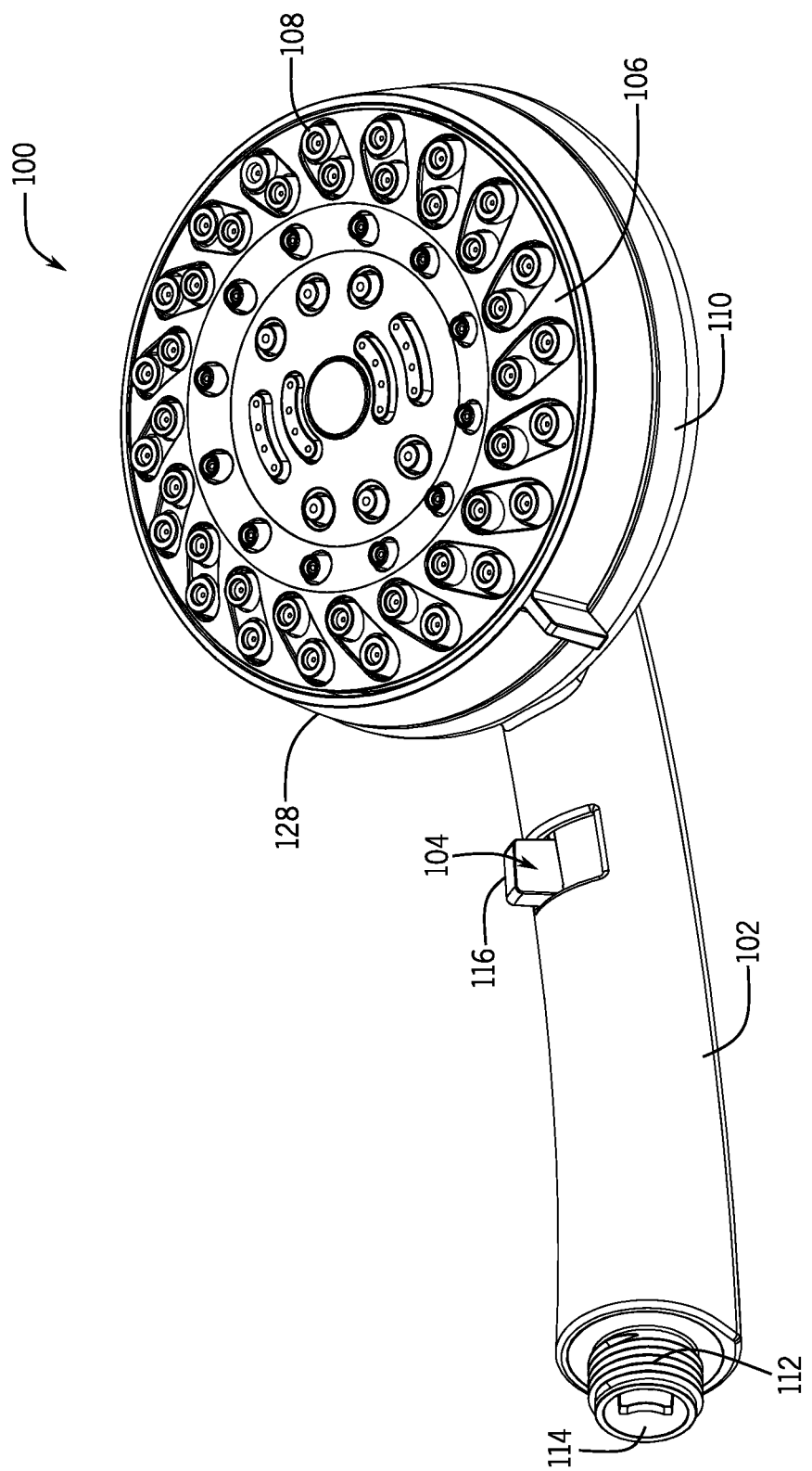
FIG. 1 is a front isometric view of a showerhead including a control assembly.
Figure 2:
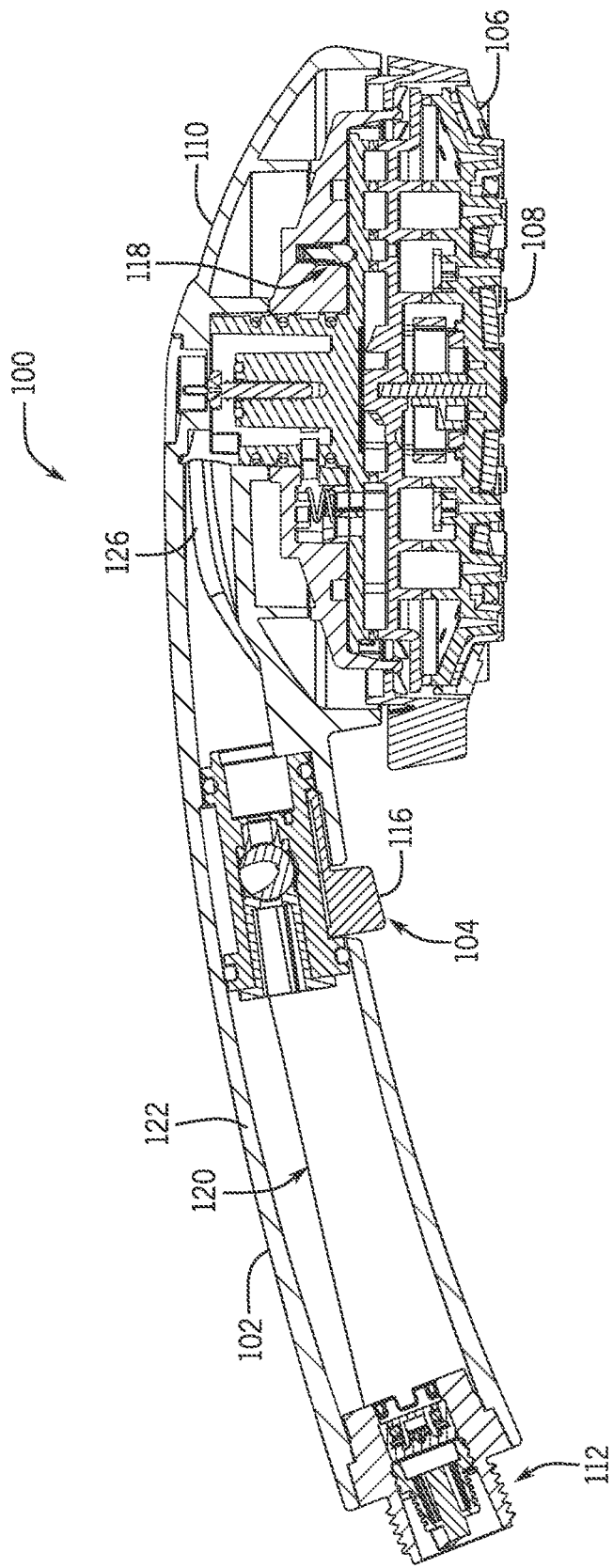
FIG. 2 is a cross-section view of the showerhead of FIG. 1.
Figure 3:
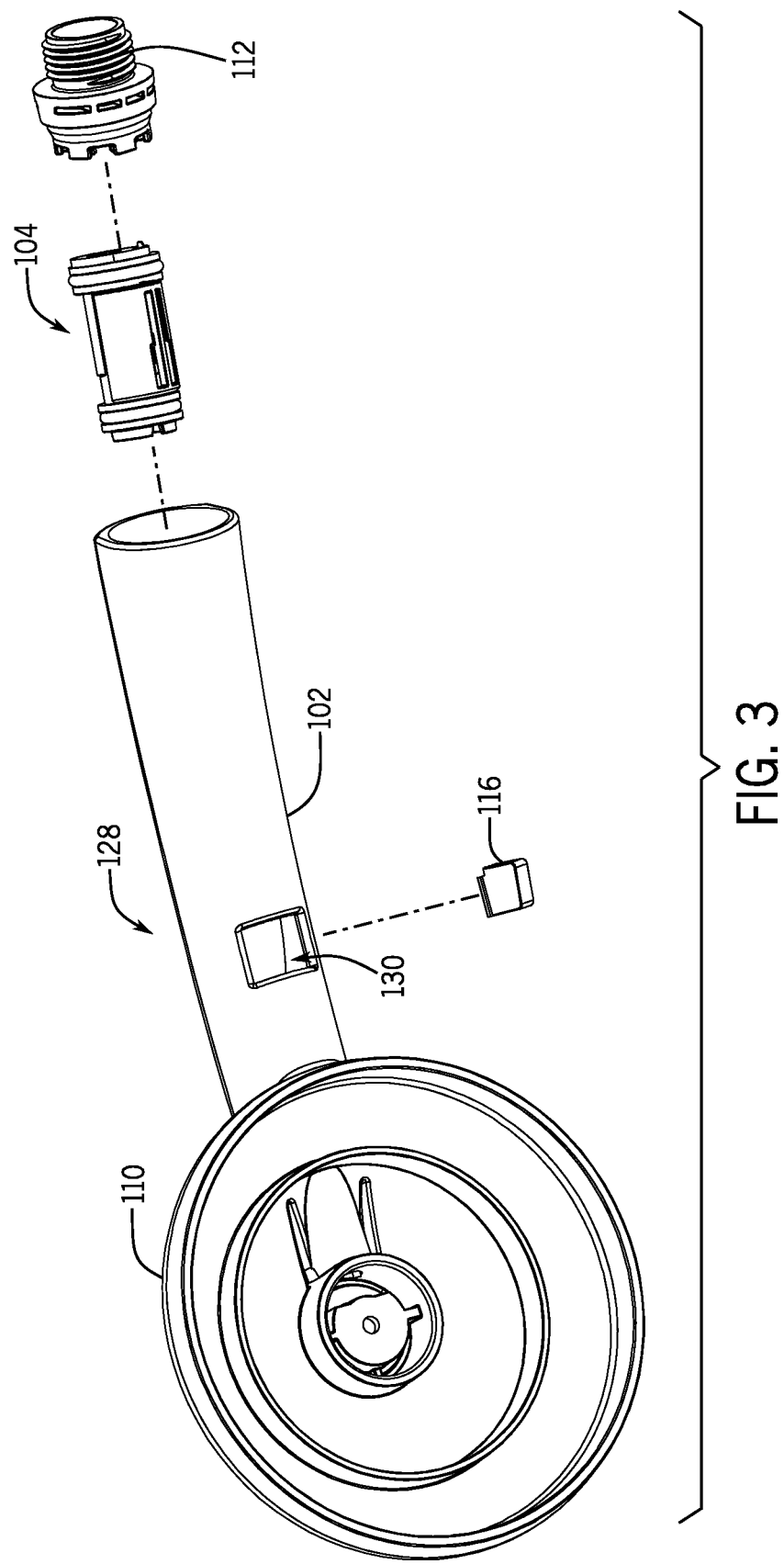
FIG. 3 is an exploded view of the showerhead of FIG. 1.

Turning now to the figures, an illustrative example of a showerhead implementing the control assembly of the present disclosure will now be discussed. FIGS. 1-3 illustrate various views of the showerhead. With reference to FIGS. 1 and 2, the showerhead 100 includes a handle 102 with a head portion 110 extending therefrom. The handle 102 and the head portion 110 define a housing 128 for the showerhead 100, which in this example is a handheld showerhead.

The showerhead 100 includes an engine 118 (see FIG. 2) having a face plate 106 and a plurality of nozzles 108. The engine 118 and the nozzles 108 are fluidly connected to the housing 128 via one or more flow paths defined therein. For example, the handle 102 includes an inlet 114 fluidly connected to a flow path 120 defined by an interior surface 122 of the handle 102. The handle flow path 120 is fluidly connected to a head inlet 126 that provides fluid to the head portion 110. In some embodiments, the showerhead 100 may include multiple modes and the head portion 110 or the engine 118 may direct fluid from the head inlet 126 to one or more mode passages that are fluidly connected to different nozzle groups 108 (e.g., outer ring of nozzles versus interior nozzles). These passages may be formed by the housing 128, engine 118, or a combination of the two.

With reference to FIG. 3, in some embodiments, the housing 128 may be an internal member with the head portion 110 and handle 102 formed together with the head portion 110 extending directly from the handle 102. However, in other embodiments, the head portion 110 may be connected (e.g., through fasteners, adhesives, welding, or the like) to the handle 102. The configuration of the handle 102 and the head portion 110 may be selected based on a desired use for the showerhead. For example, in some instances the showerhead 100 may be a fixed-mount and in these instances, the handle 102 may be shorten to function as an attachment to the J-pipe or other wall source or the housing 128 may be otherwise configured for attachment to the fluid source. The example shown in FIGS. 1-3 the handle 102 is an elongated tubular member having a slight convex curve as it extends from a terminal end at the inlet In instances where the showerhead 100 is a handheld showerhead, the handle 102 may include an attachment assembly 112. The attachment assembly 112 may be a separate component connected to the bottom end of the handle 102 or may be formed within the handle. The attachment assembly 112 includes features, such as threading, grooves, or the like, to secure the handle 102 to a hose or other fluid source. In some embodiments, the attachment assembly 112 may include a flow restrictor, filter or the like.

With reference to FIGS. 1-3, the showerhead 100 includes a control assembly, such as a pause assembly 104. In some embodiments, the pause assembly 104 is connected to the handle 102 and includes a control 116 jutting out from a first side of the handle 102, such that it allows a user to easily and quickly activate the control 116 when holding the handle 102. For example, with reference to FIG. 3, in some embodiments, the handle 102 may include a control aperture 130 defined through a front wall of the housing 128 of the handle 102.

Figure 4A:
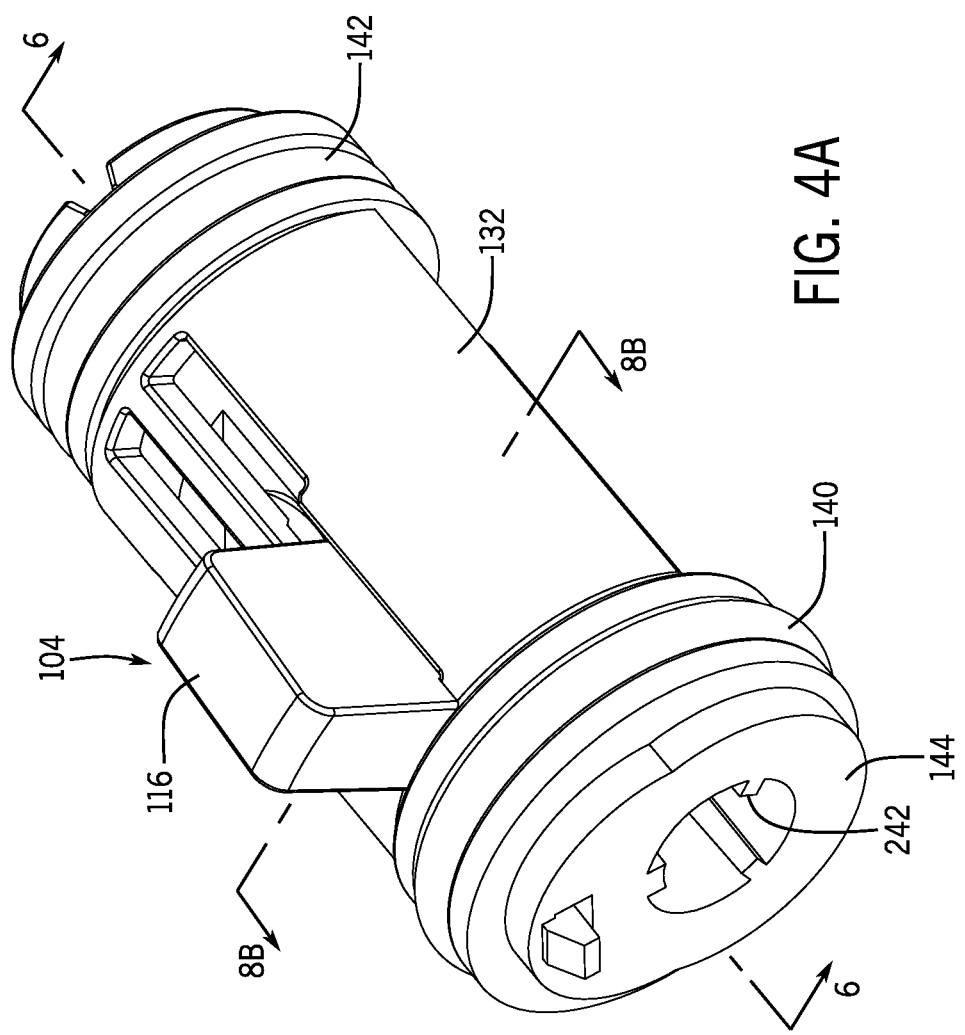
FIG. 4A is a top isometric view of the control assembly.
Figure 4B:
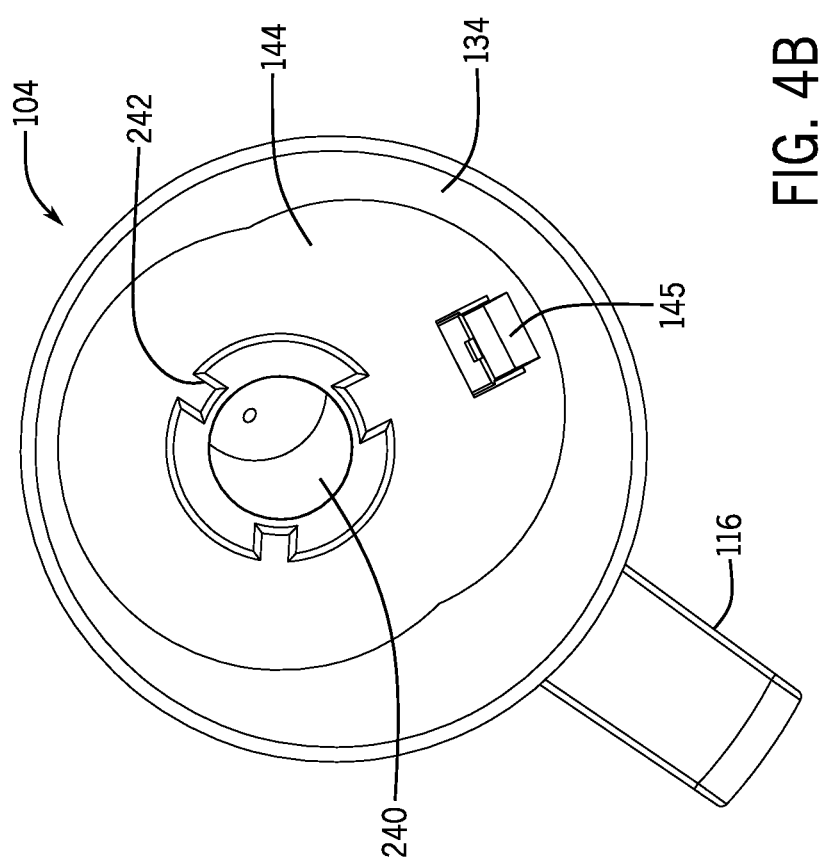
FIG. 4B is a bottom plan view of the control assembly of FIG. 4A.
Figure 4C:
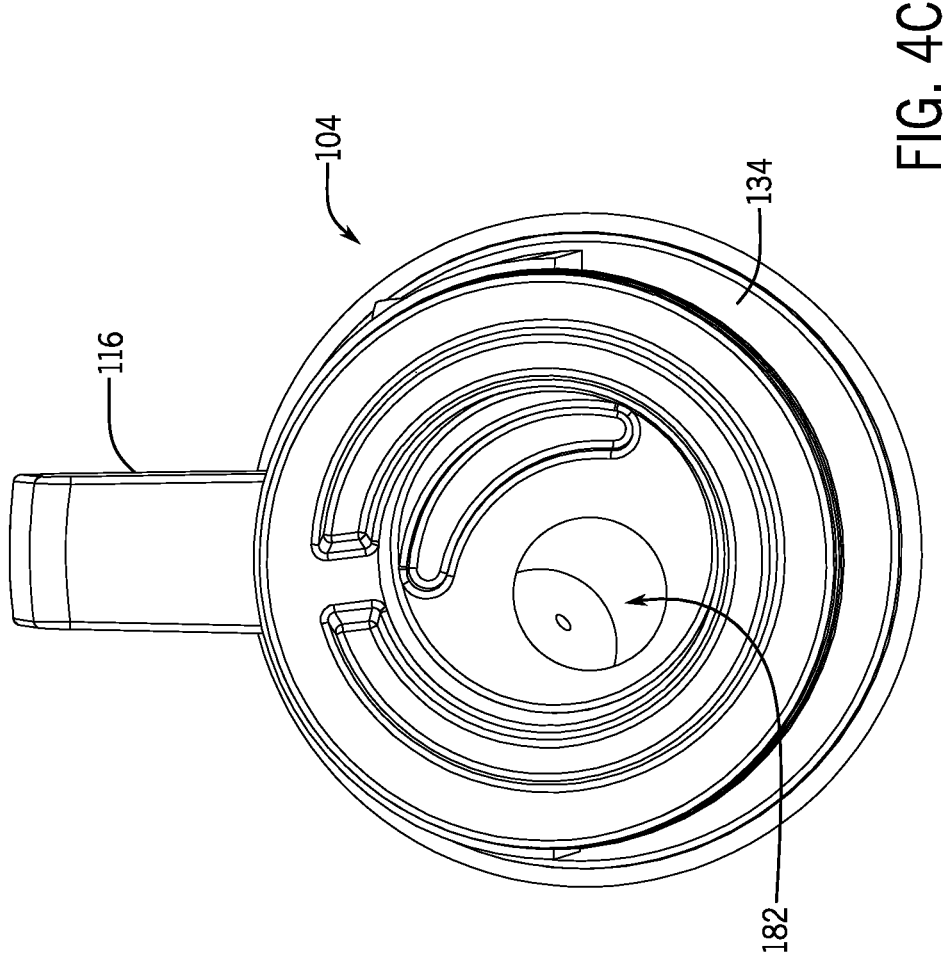
FIG. 4C is a top plan view of the control assembly of FIG. 4A.
Figure 6:
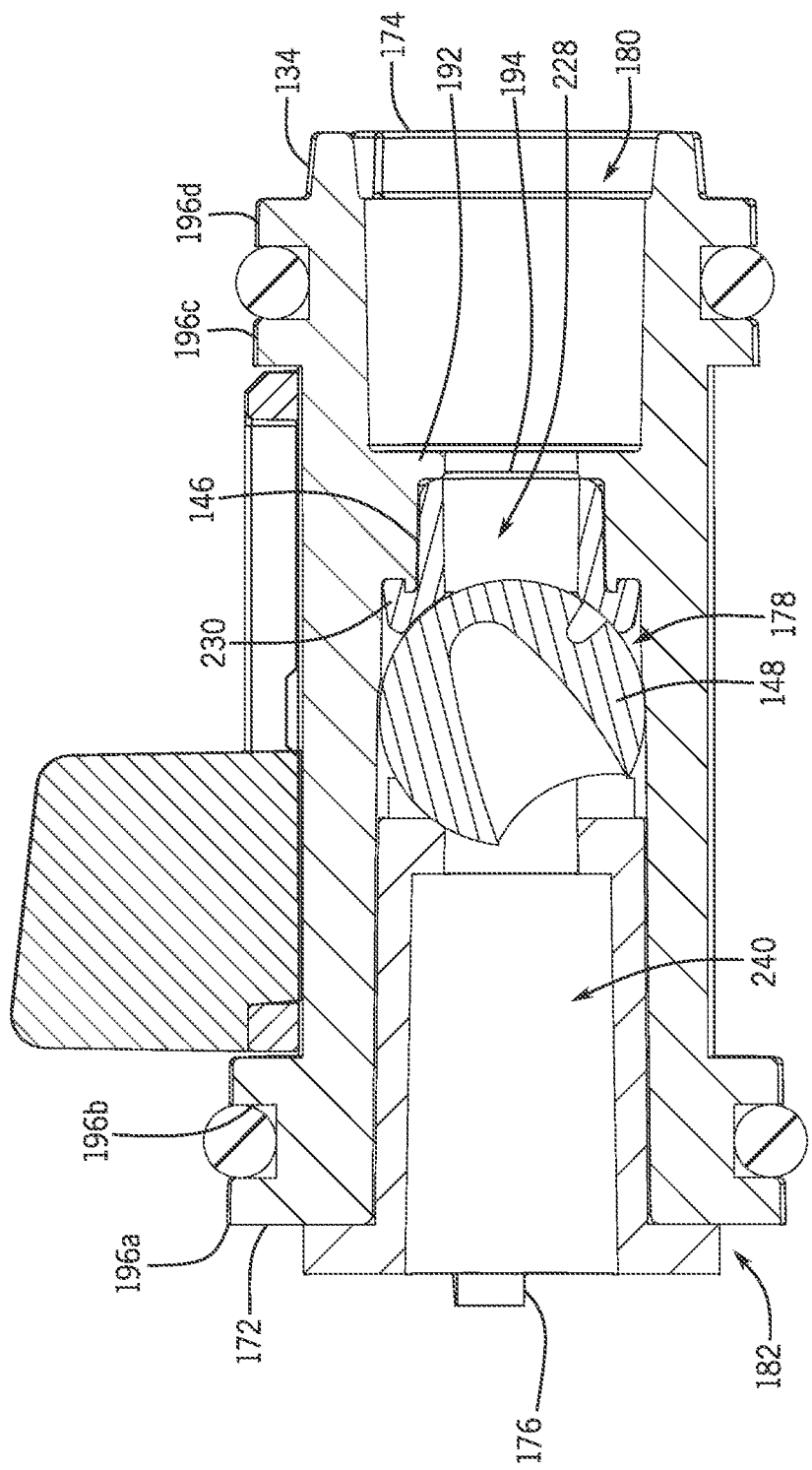
FIG. 6 is a cross-section view of the control assembly taken along line 6-6 in FIG. 4A.

The pause assembly 104 will now be discussed in more detail. FIGS. 4A-5 illustrate various views of the pause assembly 104. FIG. 6 illustrates a cross section of the pause assembly 104 taken along line 6-6 in FIG. 4A with the valve in the closed, trickle, and open positions, respectively. With reference to FIGS. 4A and 5, the pause assembly 104 may generally include a control 116, an actuator 132, a valve housing 134, and a valve assembly 145, each will be discussed in turn below.

With reference to FIG. 5, the control 116 defines a surface or component that the user is able to manipulate in order to change the state of the pause assembly 104. For example, the control 116 may be a slider, button, knob, or the like. The control 116 may include a control body 154 having a closed top end and an open bottom end defining two parallel legs 156. The legs 156 extend outwards from and perpendicular to the control body 154. The control body 154 may be shaped to follow a curvature of the handle 102 and in one embodiment may be angled from a first end 158 towards a second 160, e.g., the second end 160 may be higher than the first end 158 to define angled sidewalls along a length of the control body 154. In the embodiment shown in FIG. 5, the sidewalls 162 define a user engagement surface for the control 116.

Figure 7:
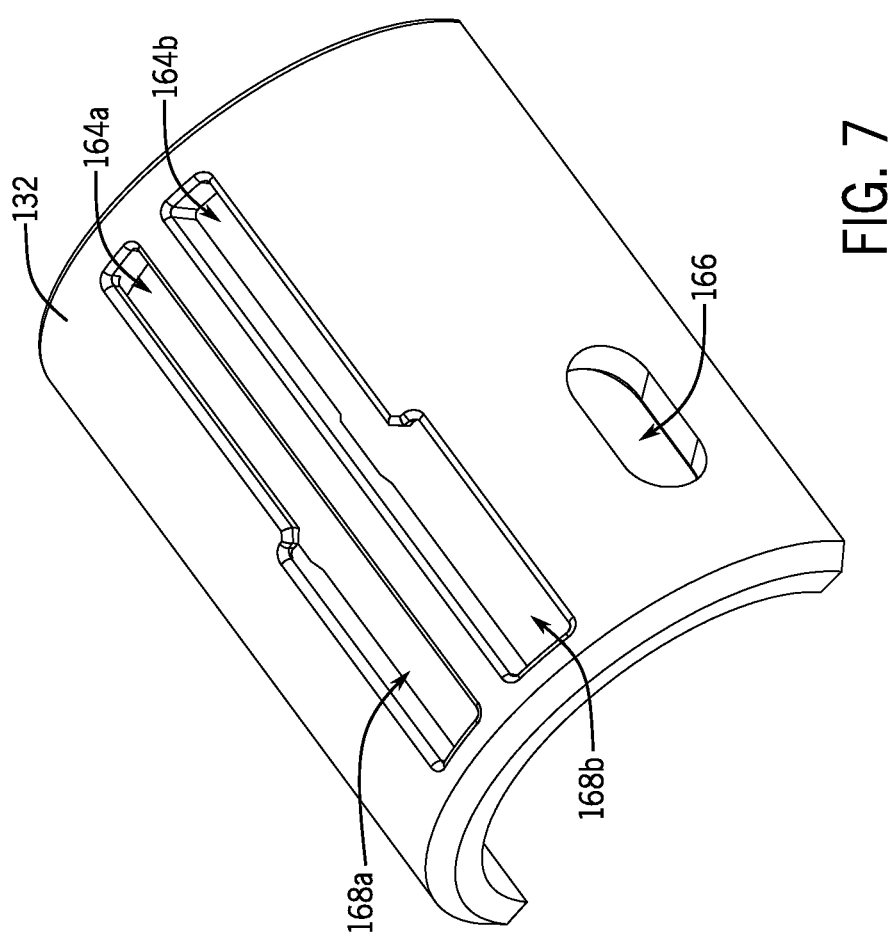
FIG. 7 is a top isometric view of an actuator for the control assembly.

With reference to FIG. 7, the actuator 132 is used to translate motion of the control 116 into motion of the valve driver 138. In one embodiment, the actuator 133 slides along an outer surface of the valve housing 134 as the control 132 is moved by a user, discussed in more detail below. The actuator 132 may be defined generally as a curved plate or apron that has a curvature substantially matching a curvature of the valve housing 134. In one embodiment, the actuator 132 defines two slots 164a, 164b that may be formed as mirror images of one another. Each of the slots 164a, 164b extend along a length of the actuator 132 and may be parallel to one another. In some instances, the slots 164a, 164b may vary in width along their lengths. For example, as shown in FIG. 6, a top end of the slots 164a, 164b may have a bump out 168a, 168b that expands the width of the slots 164a, 164b. These bump outs 168a, 168b allow the control 116 to be inserted into the slots 164a, 164b and the bump outs 168a, 168b may be shaped correspondingly.

The actuator 132 also includes an actuator aperture 166 configured to receive a portion of the valve driver 138 in order to actuate movement of the valve driver 134, discussed below. In one embodiment, the actuator aperture 166 is defined as an oval shaped slot positioned between a first edge of the actuator 132 and the second slot 164b. However, in other embodiments, the actuator aperture 166 may be different configured and/or located.

With reference to FIGS. 5 and 6, the valve housing 134 will now be discussed in more detail. The valve housing 134 may be defined generally as a cylindrical tube and is configured to receive the valve retainer 144 and valve 148. The valve housing 134 includes a valve cavity 178 extending along a portion of its length and in fluid communication with a housing inlet 182 at a first end 172 of the valve housing 134 and a housing outlet 180 at a second end 174. The valve cavity 178 terminates at an end wall 192 that includes a flow aperture 194 therethrough to provide fluid communication between the valve cavity 178 and the housing outlet 180. The end wall 912 helps to constrain the valve assembly within the valve housing 134 and ensure that the valve assembly remains in position during use and that a first end of the valve assembly seals directly against the end wall 192 to help prevent fluid from entering into the housing outlet 180 that does not pass through the valve assembly.

With reference to FIG. 5, the valve housing 134 may also include a prong 176 extending outward from the first end 172 of the valve housing 134. The prong 176, along with the end wall 192, helps to secure the valve assembly 145 within he valve cavity 178. The prong 176 may be somewhat flexible and deform to allow the valve assembly 145 to be received whiten the valve cavity 178 and then deform back to secure the valve assembly 145 in positon, discussed in more detail below.

The valve housing 134 may also include an actuator surface 170 defined on the outer surface thereof. A recessed surface 186 is defined along a portion of the outer surface of the valve housing 134 and a valve aperture 188 defined through the recessed surface 186. The recessed surface 186 allows the components of the valve assembly 145 that extend through the valve housing 134 to sit below the actuator 132 so as to not hinder movement of the actuator 132 along the actuator surface 170. In some embodiments, a seal lip 190 may surround the valve aperture 188 to define a seat for receiving a seal.

The valve housing 134 may also include two pairs of parallel ridge walls 196a, 196b, 196c, 196d on either end of the valve housing 134. Each pair of walls 196a, 196b, 196c, 196d may extend outwards from the outer surface of the valve housing 134 and extend annularly around the valve housing 134. In some embodiments, the ridge walls 196a, 196b, 196c, 196d define seal grooves 184a, 184b for receiving a sealing member therein.

Figure 8A:
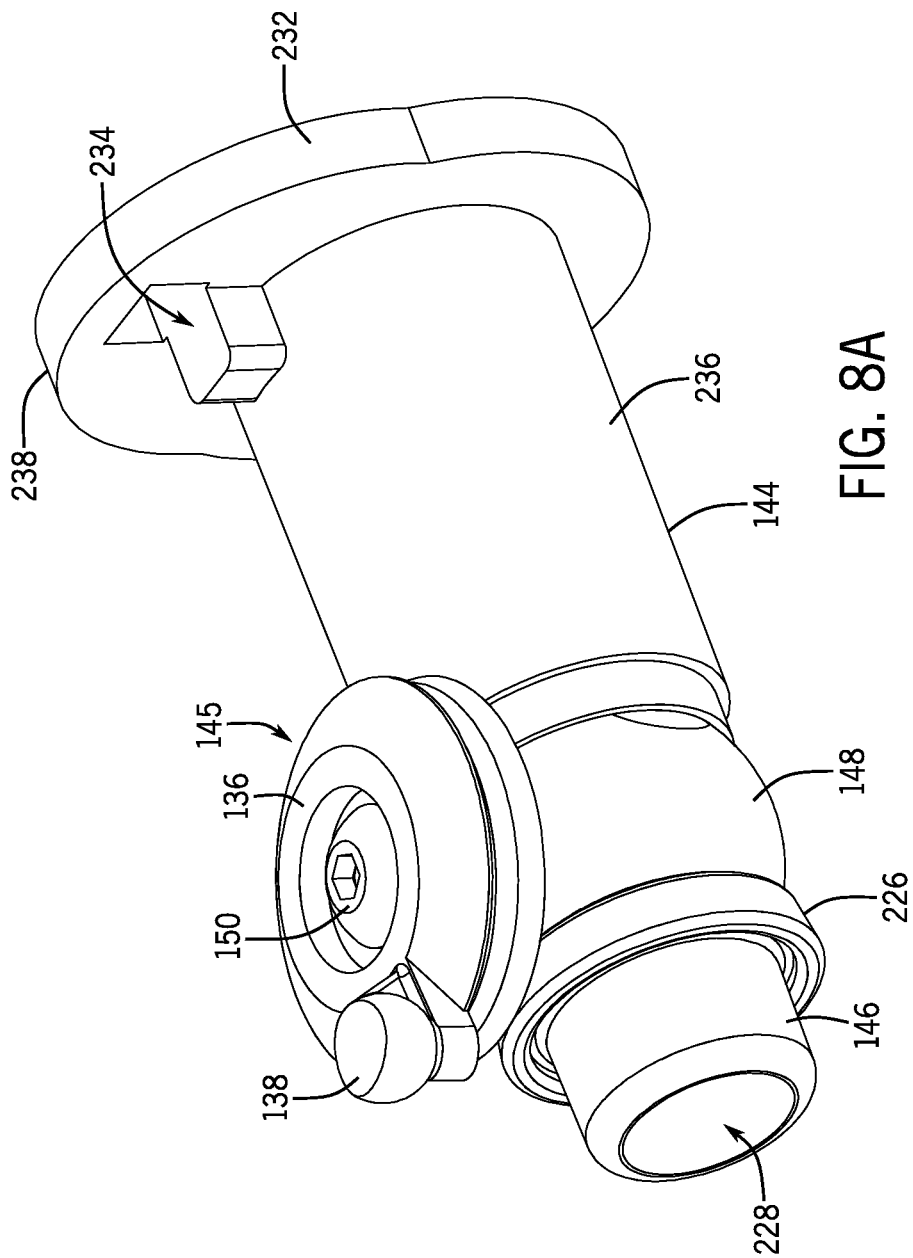
FIG. 8A is an isometric view of the valve assembly of the control assembly.

The valve assembly 145 will now be discussed in more detail. FIG. 8A illustrates a top isometric view of the valve assembly 145. FIG. 8B is a cross-section view of the pause assembly 104 taken along 8B-8B in FIG. 4A. With reference to FIGS. 5, 8A, and 8B, the valve assembly 145 may include a valve retainer 144, a valve 148, a valve seal 146, a valve driver 138, a fastener 150, and one or more seals 136, 150. The valve assembly 145 controls fluid flow through the valve housing 134 to vary the fluid flow between the valve housing inlet 182 and outlet 180, as discussed in more detail below.

Figure 9A:
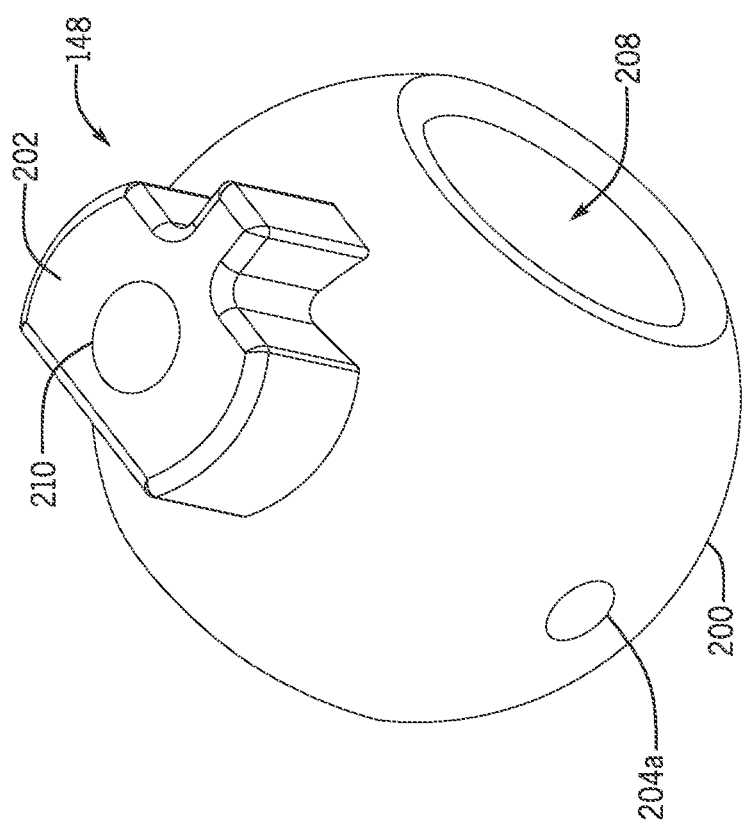
FIG. 9A is an isometric view of a valve of the valve assembly.
Figure 9B:
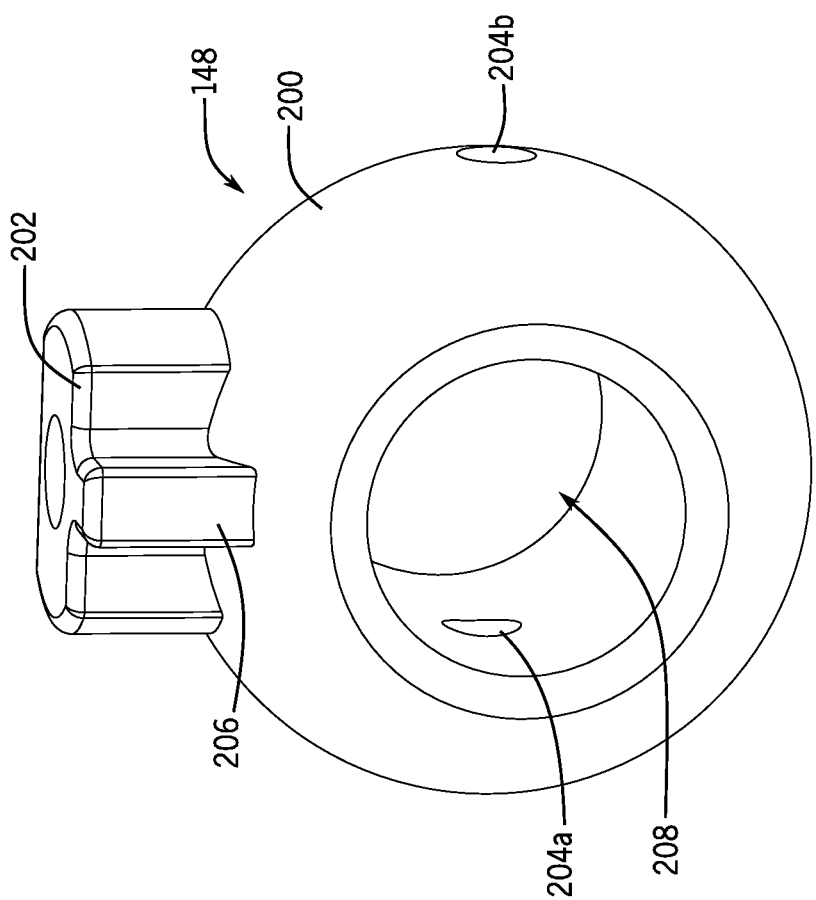
FIG. 9B is a side isometric view of the valve of FIG. 9A.

In one embodiment, the valve assembly 145 includes a ball valve configuration. FIGS. 9A and 9B illustrate various views of the valve 148. With reference to FIGS. 9A and 9B, in some embodiments, the valve 148 is a spherically shaped ball having a main body 200 and defining a flow passage 208 therethrough. The main body 200 may also define two trickle apertures 204a, 204b oriented perpendicular to the flow passage 208. The trickle apertures 204a, 204b may have a reduced diameter as compared to the flow passage 208 and are aligned with one another to allow fluid flow through the main body 200 in a directly transverse to the flow passage 208.

With reference to FIGS. 9A and 9B, the valve 148 may also include a keyed structure 202 extending outwards from a top surface of the main body 200. The keyed structure 202 includes a shape configured to engage the valve driver 138 so that when secured together the two components move together. In one embodiment, the keyed structure 202 may include a nub 206 that fits into a corresponding aperture within the valve driver 138, discussed in more detail below. A fastening cavity 210 may be defined through a central region of the keyed structure 202 and configured to receive a fastener to connect the valve driver 138 and the valve 148 together.

Figure 10A:
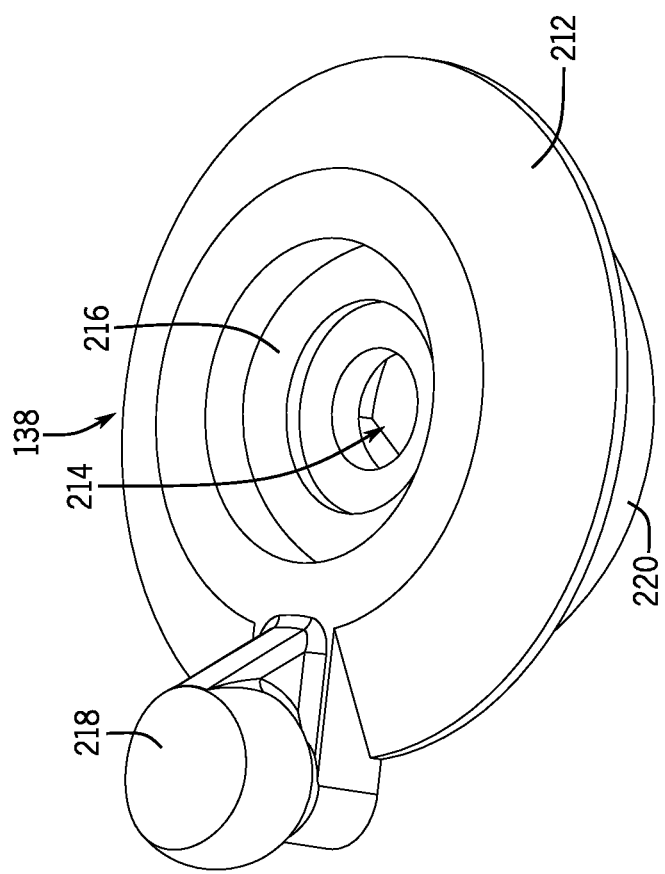
FIG. 10A is a top isometric view of a valve driver of the valve assembly.
Figure 10B:
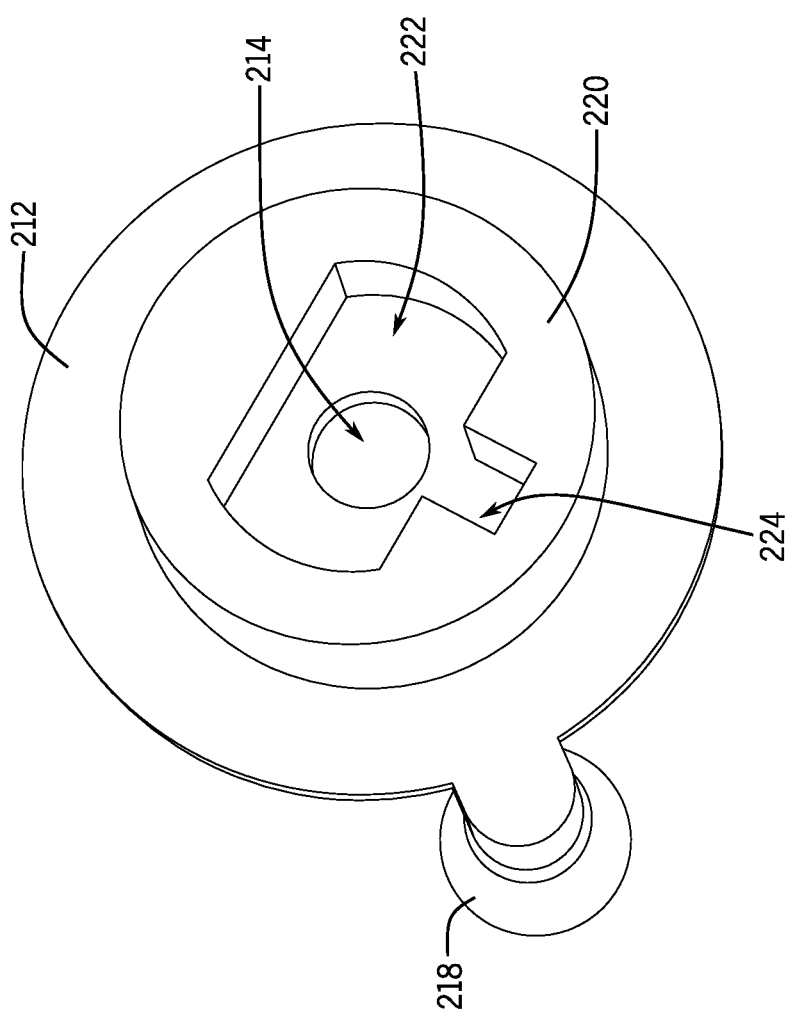
FIG. 10B is a bottom isometric view of the valve driver of FIG. 10A.

The valve driver 138 converts motion of the actuator 132 into motion of the valve 148. FIGS. 10A and 10B illustrate various views of the valve driver 138. With reference to FIGS. 10A and 10B, the valve driver 138 may include a disc 212 or main body having a bottom wall 220 extending from a bottom surface thereof. A boss 218, which may be formed as a knob or protrusion, extends outwards and upwards from a top surface of the disc 212. The boss 218 is configured to engage the actuator aperture 166 in the actuator 132 as discussed below, and may include somewhat cylindrically shaped engagement end.

A fastening aperture 214 is defined through a central region of the valve driver 138 and optionally may be surrounded by a seal ledge 216. The seal ledge 216 may be recessed from the top surface of the disc 212 and configured to receive the seal 136.

With reference to FIG. 10B, the bottom wall 220 of the disc 212 may include a keying feature 222 defined therein. In one embodiment, the keying feature 222 is a cutout or cavity and is shaped to engage and secure to the valve 148. For example, the keying feature 222 may include a nub compartment 224 that is configured to receive the nub 206 of the valve 148 and orientate the valve 148 relative to the valve driver 138.

With reference to FIGS. 6 and 8A, the valve seal 146 of the valve assembly 145. The valve seal 146 may be formed as a sealing material and engages the outer surface of the valve 148 as it is repositioned by the valve driver 138. In some embodiments, the valve seal 146 may be molded to the valve housing 134 and in other embodiments, the valve seal 146 may be a separate component operably coupled thereto (such as shown in 6). In one embodiment, the valve seal 146 may be formed as a generally cylindrical tube including a flow passage 228 defined through its length. A sealing lip 226 extends around a bottom end of the valve seal 146. The sealing lip 226 extends outwards from the outer surface of the valve seal 146 to receive a portion of the valve housing 134, as well as enhance the flexibility of the valve seal 146. In one embodiment, a bottom surface of the sealing lip 226 defines an engagement surface 230 that engages and seals against the outer surface of the valve 148. In some embodiments, the engagement surface 230 may have a radius of curvature that matches the valve 148 or may otherwise be deformable to conform around the valve 148 and define a fluid-tight seal.

With reference to FIGS. 5, 6, and 8A, the valve retainer 144 will now be discussed. The valve retainer 144 is in fluid communication with the valve 148 and the valve housing 134 and may be received within the valve housing 134 to positon and secure the valve 148 within the valve housing 134. In some embodiments, the valve retainer 144 includes a hollow main body 236 defining a flow lumen 240 through its length. The flow lumen 240 may have a varying diameter and may reduce in size before the outlet end of the valve retainer 144 such that the terminal end of the lumen 240 may have a diameter that substantially matches the diameter of the flow passage 230 of the valve 148. However, in other embodiments, the flow lumen 240 may be differently configured. The flow lumen 240 may also include one or more strengthening ribs 242 that extend a substantial length of the lumen 240 (see FIG. 4A). The ribs 242 may also be used to assist in positioning the valve retainer 144 within the valve housing 134. For example, in one embodiment a male tool having corresponding slots receives the ribs 242 and can more easily manipulate the valve retainer 144 to ensure it is correctly positioned within the valve housing 134.

A terminal or first end of the valve retainer 144 may include a securing platform 232 that extends outwards from the main body 226. The platform 232 may be used to secure the valve retainer 144 to the valve housing 134. In some embodiments, the platform 232 may include a prong aperture 234 and a tang 238 that interact with the valve housing 134 to connect the valve retainer 144 to the housing 134 as discussed below.

Assembly of the pause assembly 104 will now be discussed. It should be noted that the below discussion is meant as illustrative only and many of the operations can be performed in a different order or manner. With reference to FIGS. 4A, 5, 6, 8A, and 8B, the valve seal 146 may be inserted into the valve cavity 178 of the valve housing 134. The valve seal 146 is positioned against the end wall 192 and aligned such that the flow passage 228 of the valve seal 146 is aligned with and in fluid communication with the flow aperture 194 of the end wall 192 and the housing outlet 180.

The valve 148 is then inserted into the valve cavity 148. The valve 148 is positioned to interface with the engagement surface 230 of the valve seal 146 and is aligned with the valve housing 134 such that the keyed structure 202 is oriented with and extends partially through the valve aperture 188 of the valve housing 134 (see FIG. 8B). The valve retainer 144 may then be inserted into the valve cavity 178 with the tang 238 of the valve retainer 144 aligning with a corresponding groove on the interior of the valve housing 134 and the prong 176 of the valve housing 134 being aligned with and inserted into the prong aperture 234 of the platform 232 of the valve retainer 144. In this manner, the valve retainer 144 is prevented from movement relative to the valve housing 134 and the valve 148 is clamped against the valve seal 146, defining a fluid tight connection between the two components. However, the valve retainer 144 and valve seal 146 are configured to allow the valve 148 to rotate within the valve cavity 178.

With reference to FIGS. 5 and 8B-10B, the valve 148 may then be secured to the valve driver 138 (alternatively, the valve driver 138 may be secured to the valve 148 before the valve retainer 144 is inserted into the valve housing 134). In particular, the seal 136 is positioned on the seal lip 190 of the valve housing 134 as the keyed structure 202 extends through the valve aperture 188. The valve driver 138 is then oriented with the keyed structure 202 such that the keying feature 222 of the valve driver 138 is aligned with and received around the keyed structure 202 of the valve 148. In particular, the nub 206 may be positioned within the nub cutout 224 and the fastening aperture 214 of the valve driver 138 may be aligned with the fastening cavity 210 of the valve 148. The valve driver 138 is then press fit onto the valve 148, clamping the seal 136 between the valve housing 134 and the disc 212 of the valve driver 138. To secure the valve driver 138 to the valve 148, a seal 152 is positioned on the seal ledge 216 of the valve driver 138 and a fastener 150 is inserted through the fastening aperture 214 of the valve driver 138 and into the fastening cavity 210 of the valve 148. The fastener 150 is then secured in place, e.g., through a friction fit, adhesive, and/or threading. It should be noted that some embodiments, the seals 136, 152 may be omitted or differently configured. However, in one embodiment the seal 136 is a U-cup and the seal 152 is an O-ring but many other implementations are envisioned.

The actuator 132 is then connected to the valve housing 134. The actuator 132 is aligned with the actuator surface 170 and the actuating aperture 166 is positioned over the boss 218 of the valve driver 138. The boss 218 is then received into the actuating aperture 166 and the actuator 132 is connected to valve housing 134. For example, the interior ridge walls 196b, 196c may border the edges of the actuator 132 to secure the actuator 132 to the valve housing 134, while still allowing the actuator 132 to rotate along the actuator surface 170 of the valve housing 134. In these embodiments, the actuator 132 may be trapped between the valve housing 134 and the internal bore of the handle 102. The driver disc of the valve assembly assists in retaining the actuator 132 in correct position. The seals 140, 142 may be positioned within the seal grooves 184a, 184b of the valve housing 134.

Connecting the pause assembly 104 to the showerhead 100 will now be discussed. With reference to FIGS. 1-4A, the pause assembly 104, with the control 116 disconnected, is inserted into the flow path 120 of the handle 102. The pause assembly 104 is aligned with the control aperture 130 such that the bump outs 168a, 168b of the actuator 132 are exposed via the control aperture 130. The legs 156 of the control 116 are then inserted into the slots 164a, 164b of the actuator 132 at the bump outs 168a, 168b and slid down the slots 164a, 164b towards the inlet end 172 of the valve housing 134. At the same time, the pause assembly 104 is pushed towards the head portion 110 of the showerhead 100 such that the outlet end of the valve housing 134 is positioned adjacent a stop 134 within the housing 128. In this position, the bump outs 168a, 168b and top end of the pause assembly 104 are enclosed by the handle 102, helping to secure the pause assembly 104 in position as the control 116 is trapped within the control aperture 130. The control 116 is thus allowed to transverse across a radial surface of the pause assembly 104, but is constrained from longitudinal movement along a length of the handle 102 by the edges of the handle 102 defining the control aperture 130. The seals 140, 142 of the pause assembly 104 engage the interior surface 122 of the handle 102 and also help to secure the pause assembly 104 in the desired location within the handle 102, as well as the fluid pressure of fluid flowing through the handle 102.

Once the pause assembly 104 is connected to the handle 102, the attachment assembly 112 (if included) is inserted into the open bottom end of the handle 102 and connected thereto. The engine 118 may then be connected to the head portion 110 of the showerhead 110. The handle 102 can then be fluidly connected to a water source, such as a hose or J-pipe.

Figure 11A:
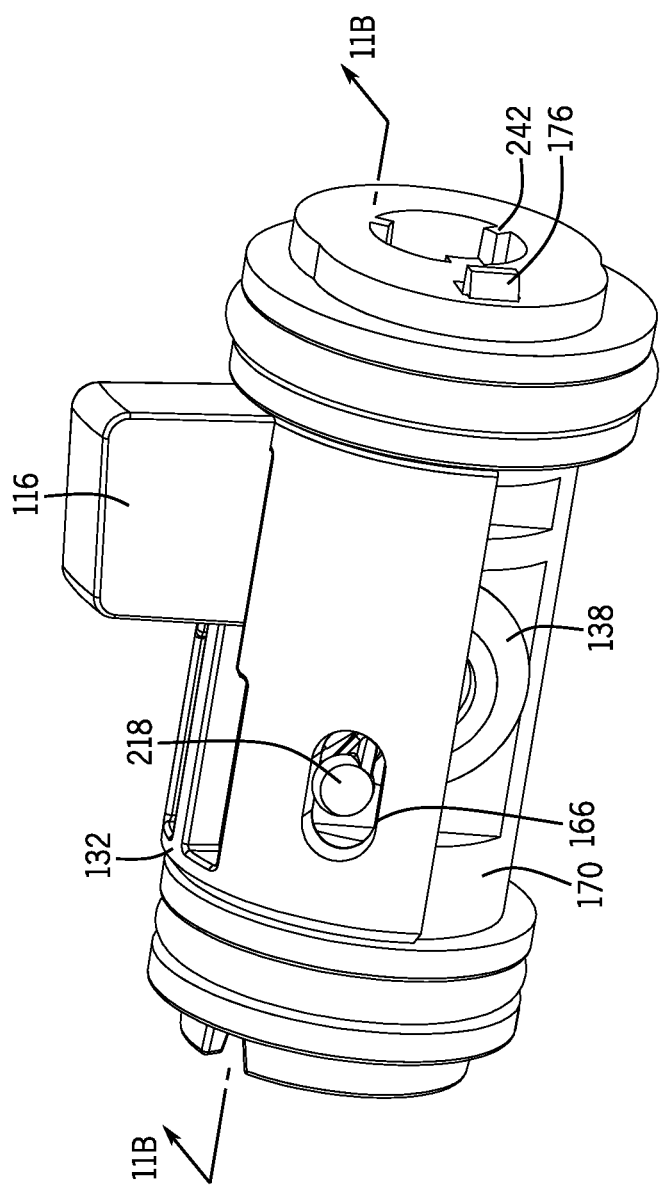
FIG. 11A is a side isometric view of the control assembly in a pause position.
Figure 11B:
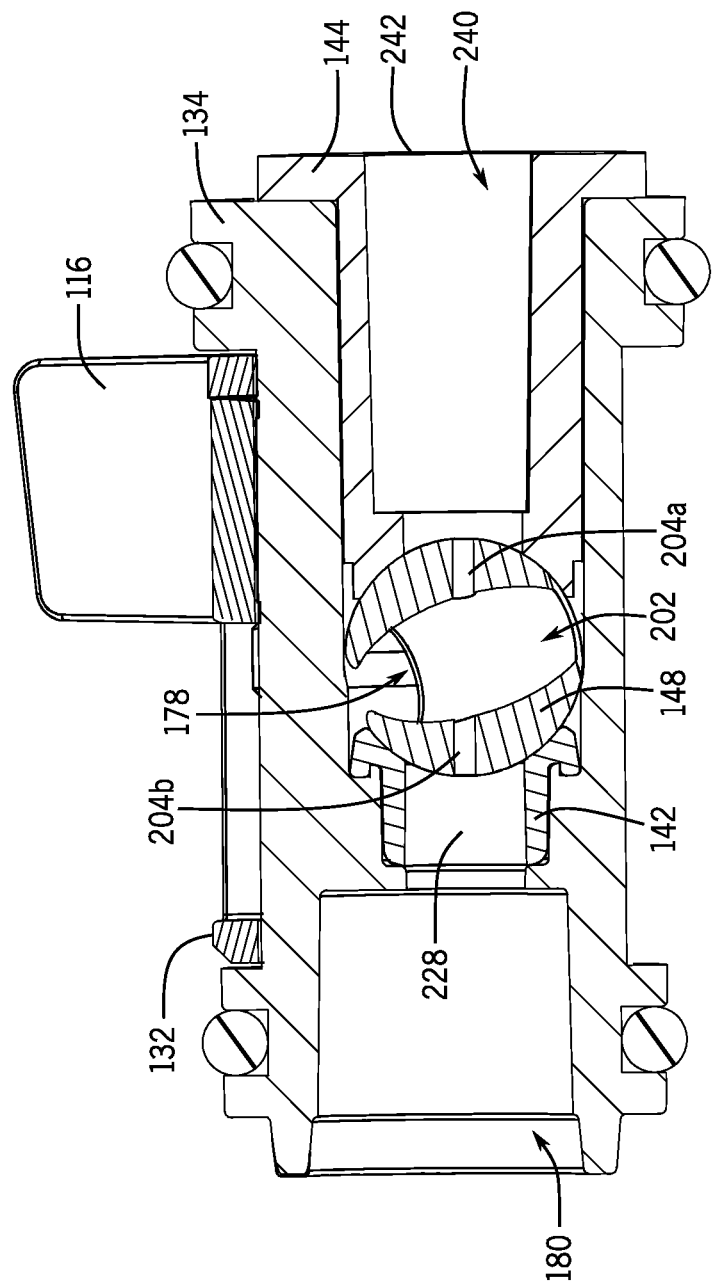
FIG. 11B is a cross-section of the control assembly in the pause position taken along line 11B-11B in FIG. 11A.

Operation of the pause assembly 104 will now be discussed in more detail. With reference to FIG. 1, to pause or stop water flow from exiting the showerhead 100, a user moves the control 116 to the closed position. FIGS. 11A and 11B illustrate the pause assembly in the closed condition. In one example, the user forces the control 116 to move radially in an arc from a first side of the handle 102 towards a second sidewall of the handle 102. The control 116, which is connected to the actuator 132, causes the actuator 132 to move along the actuator surface 170 of the valve housing 134 correspondingly. As the actuator 132 moves, the boss 218 of the valve driver 138, which is received within the actuator aperture 166 moves therewith.

This movement, causes the valve driver 138 to rotate a predetermined number of degrees and due to the valve 148 being keyed to the valve driver 138, causes the valve 148 to rotate within the valve housing 134. At the end of the valve driver 138 movement, the valve 148 is positioned within the valve housing 134 such that the trickle apertures 204a, 204b are aligned with the flow lumen 240 of the valve retainer 144 and the flow passage 228 of the valve seal 146. Due to the seal defined by the engagement surface 230 of the valve seal 146, all of the fluid entering into the pause assembly 104 is directed through the second trickle aperture 204b, which causes the flow to essentially pause, except for a small "trickle" flow. The size of the trickle apertures 204a, 204b may be determined based on water pressure and help to avoid damage to the handle 102 in instances where the pause assembly 104 is closed for long periods of time, by providing a release for some of the fluid within the handle 102 to the showerhead 100. However, in some embodiments, the trickle apertures 204a, 204b may be omitted and the valve 148 my seal against the seal 146, preventing all flow from the handle inlet from reaching the head portion 110, i.e., fully pausing water flow.

Figure 12A:
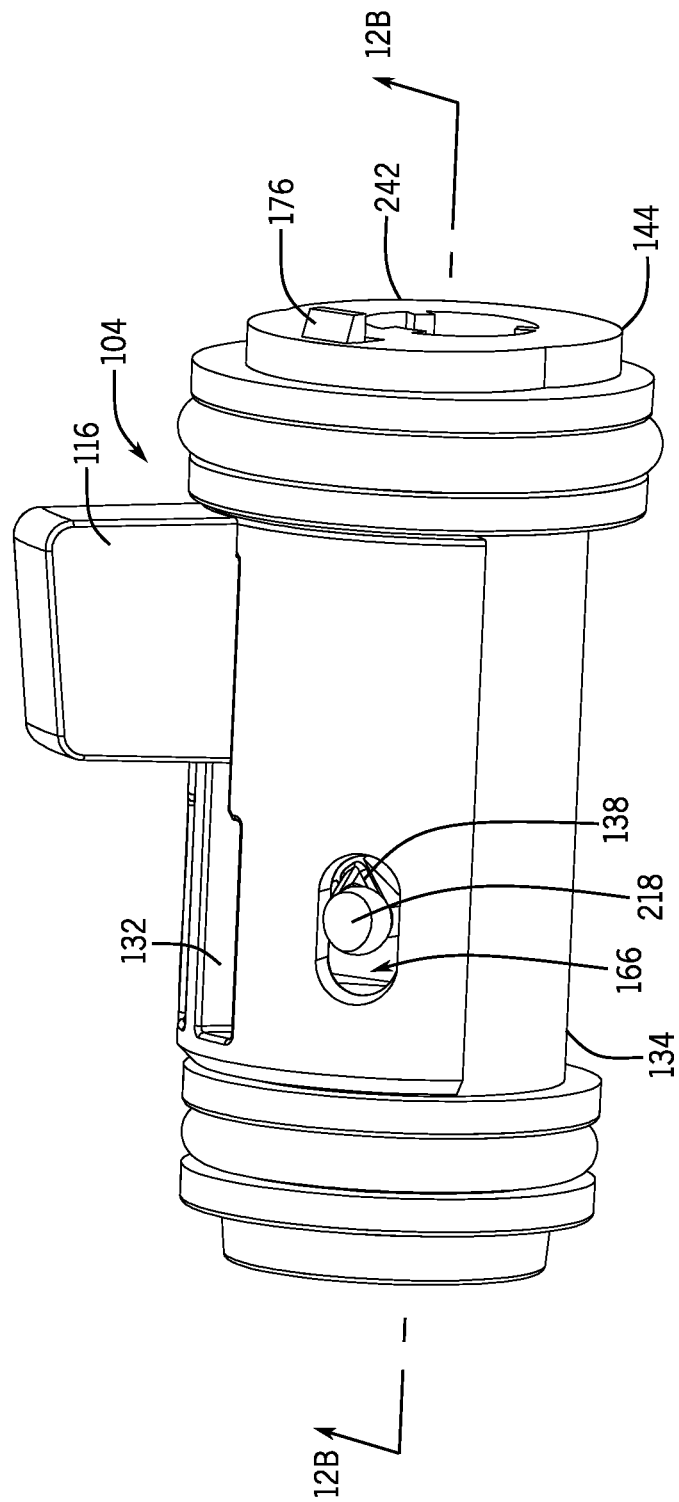
FIG. 12A is a side elevation view of the control assembly in a flow position.
Figure 12B:
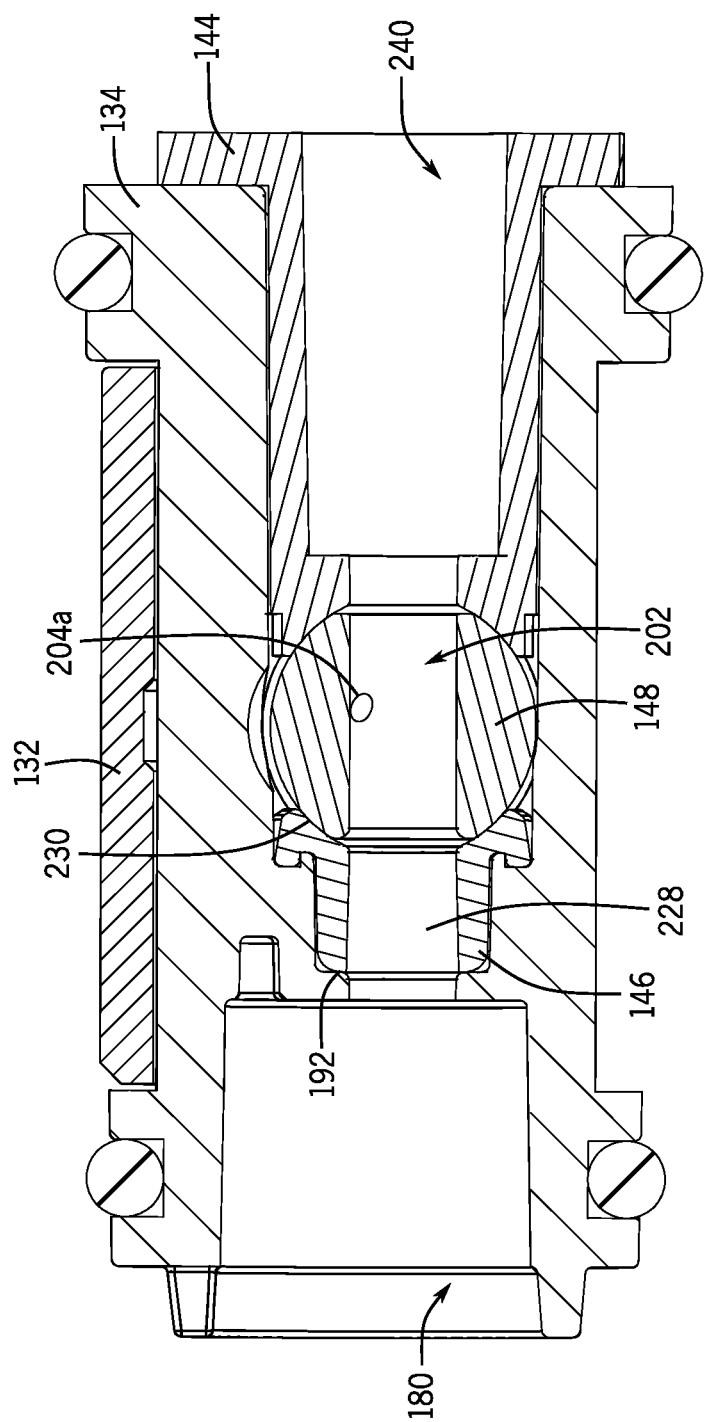
FIG. 12B is a cross-action view of the control assembly in the flow position taken along line 12B-12B in FIG. 12A.

FIGS. 12A and 12B illustrate the pause assembly 104 in the open position. With reference to FIGS. 1, 12A, and 12b, to move the pause assembly 104 to the open positon, the user forces the control 116 to the first side of the handle 102, causing the control 116 to move along an arc constrained by the control aperture 130. The actuator 132 moves along the actuator surface 170 with the control 116, and encloses an exposed portion of the valve driver 138 as it extends to the open position (compare FIG. 12A with 11A). As the boss 218 of the valve driver 138 is connected to the actuator 132, this movement causes the valve driver 138 to rotate relative to the valve housing 134, causing the valve 148 to rotate within the valve housing 134. At the end of the actuator movement 132, the valve 148 is oriented within the valve cavity 178 of the valve housing 134 such that the flow passage 208 is aligned and fluidly connected to the flow lumen 240 of the retainer 144 and the flow passage 228 of the valve seal 146. The engagement surface 230 of the valve seal 146 engages the outer surface of the valve 148, to help ensure that all fluid flowing through the flow passage 208 is directed into the flow passages 228 of the seal 146. From the flow passage 228, the fluid flows into the housing outlet 180 and into the flow path 120 within the handle 102. From the flow path 120, the fluid is directed into the head inlet 126 and the engine 118 where it can be expelled via one or more of the nozzles 108.

It should be noted that although the examples shown in FIGS. 11A-12B illustrate the pause assembly 104 in the open or closed positons, in some embodiments, the valve 148 may be rotatable to multiple configurations between the two orientations. This allows a slowly reduced or slowly increased flow volume as the user moves the control 116 from the first position to the second position and can keep the control 116 in a positon between the two extremes in order to have a more preferable water flow volume.

Using the pause assembly 104 of the present disclosure, a user can easily turn the control 116 while holding the handle 102 since the control 116 is accessible within the handle 102. This allows a user to control the water flow of the showerhead 100 from various locations within a shower enclosure, even when the user is far away from the main controls.

Figure 13A:
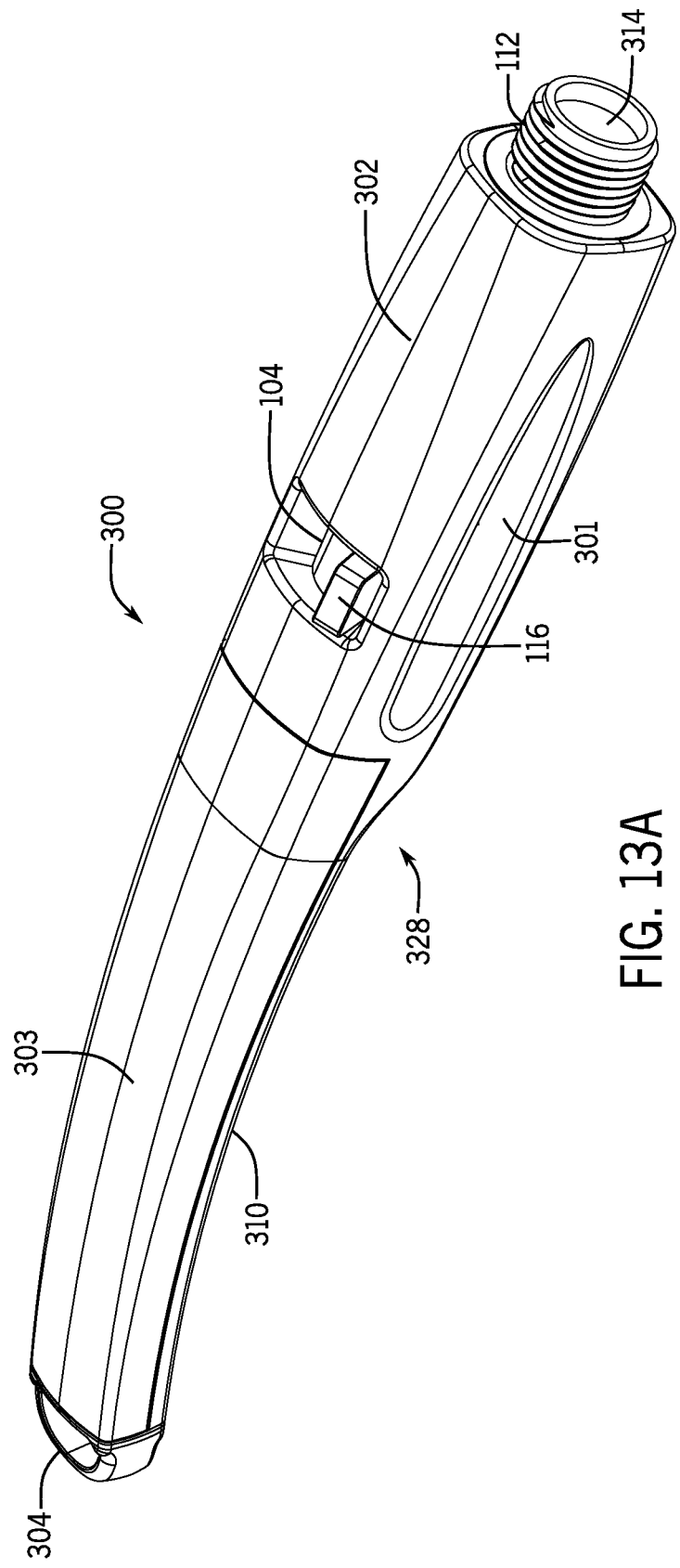
FIG. 13A is a top isometric view of an additional showerhead including a control assembly.
Figure 13B:
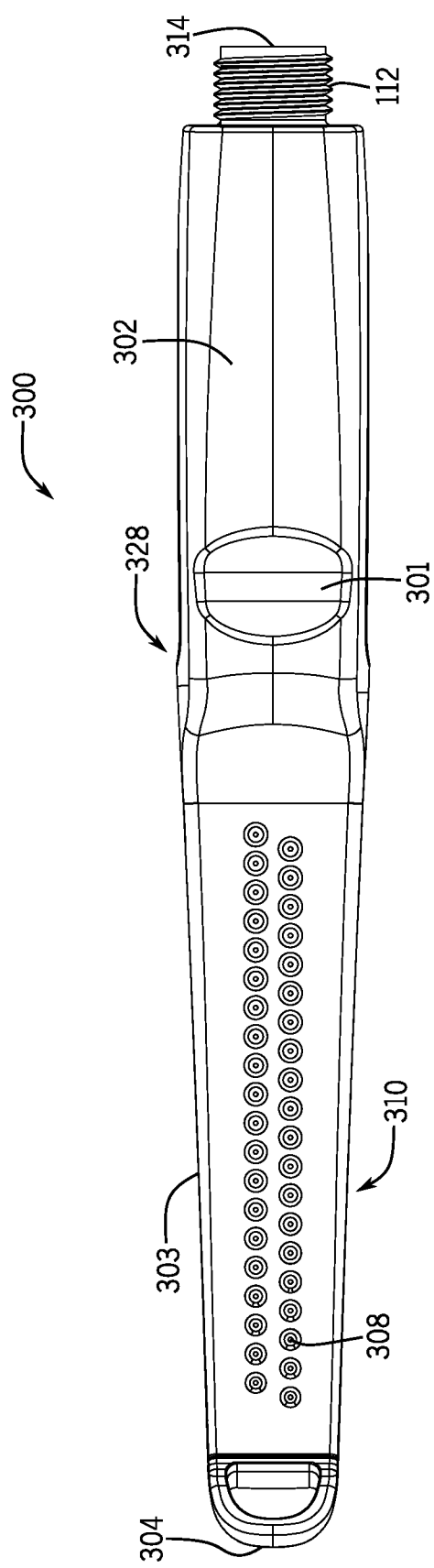
FIG. 13B is a bottom view of the showerhead of FIG. 13A.
Figure 13C:
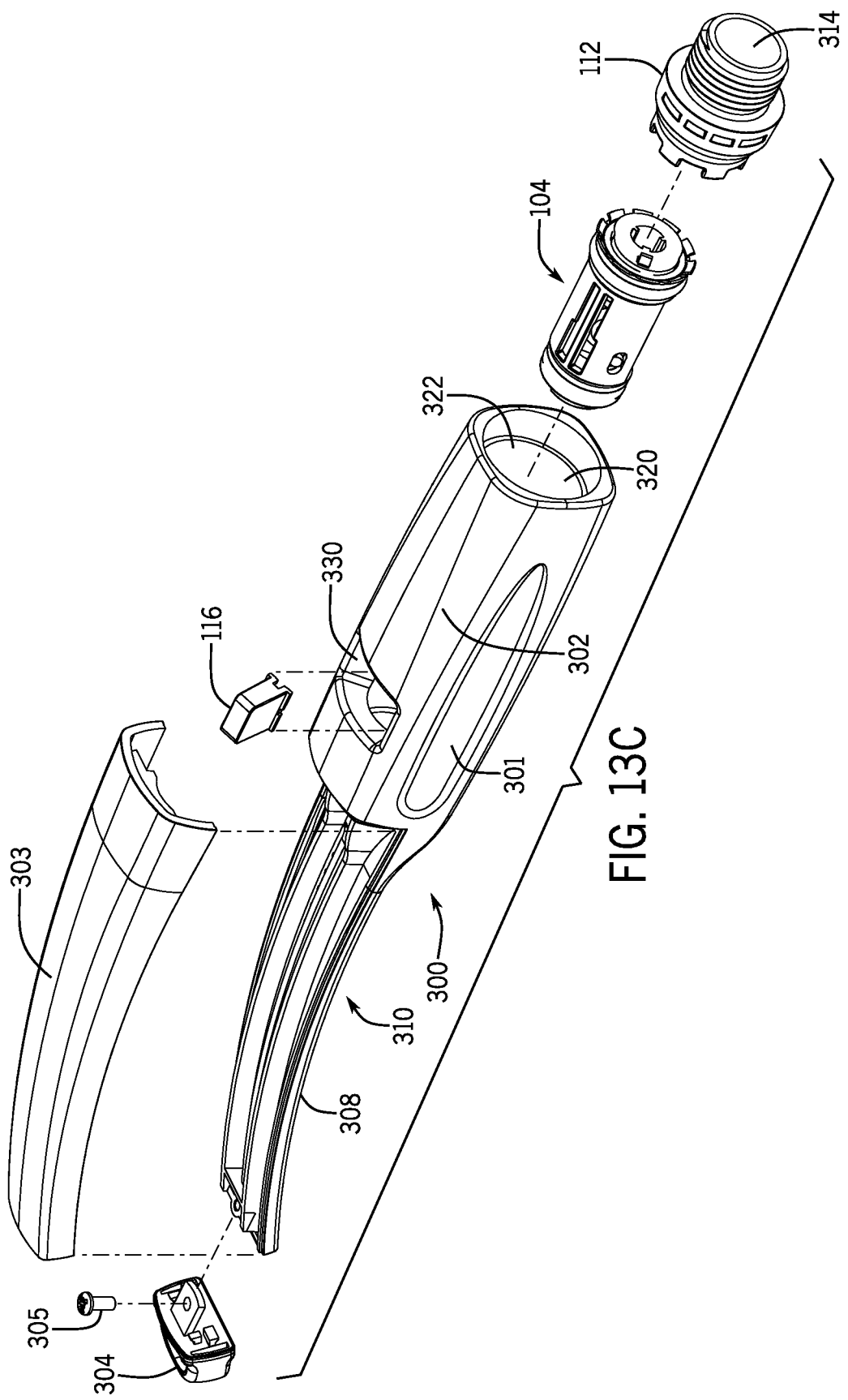
FIG. 13C is an exploded top isometric view of the showerhead of FIG. 13A.

The control assembly of FIGS. 1-12 can be incorporated into various types of water fixtures. For example, FIGS. 13A-13C illustrate various views of an alternate embodiment of a water fixture or showerhead 300 (hereinafter referred to as "showerhead" for the sake of convenience without intent to limit) that includes a control assembly, such as the pause assembly 104, positioned within a handle 302. The pause assembly 104 may be substantially the same as the pause assembly in FIGS. 1-12, but the housing for the showerhead 300 may be differently configured. Except as otherwise noted below, the showerhead 300 is similar to the showerhead 100 described above. Accordingly, in certain instances, like features will not be discussed when they would be apparent to those skilled in the art.

FIG. 13A illustrates a top isometric view of the showerhead 300. FIG. 13B illustrates a bottom view of the showerhead 300. FIG. 13C illustrates an exploded top isometric view of the showerhead 300. With reference to FIGS. 13A-13C, the showerhead 300, which may be a handheld showerhead, a watering wand, or any other water fixture, includes a handle 302 with a head portion 310, such as an elongated head portion 310, extending therefrom. The handle 302 and the head portion 310 define a housing 328 for the showerhead 300. The head portion 310 is designed to conform to the body of a pet or selected body features of a person during a washing or bathing process. In some embodiments, the head portion may include a rear cover 303. The rear cover 303 may be connected (e.g. through fasteners, adhesives, welding, or the like) to the head portion 310. The handle 302 may include an attachment assembly 112. The handle 302 may be sized to be easily grasped by the user's hand and may further have a plurality of surface features 301, such as indentations, grooves, or the like, provided to allow a user to maintain a firm or comfortable grip in a wet environment. Additionally, the handle may have an aesthetically pleasing appearance.

The showerhead 300 may further include a hanging element 304, such as a loop, hook, suction cup, or the like, to couple or otherwise attach the showerhead 300 to the wall, J-pipe, hook, nail, or other attachment point. The hanging element 304 may be connected (e.g. through fastener 305, adhesives, welding, clips, or the like) to the head portion 310. However, in other embodiments, the hanging element 304 may be formed together with (such as formed monolithically with) the head portion 310.

The head portion 310 includes a plurality of nozzles 308 that are fluidly connected to the housing 328 via one or more flow paths defined therein. For example, the handle 302 may include an inlet 314 fluidly connected to a flow path 320 defined by an interior surface 322 of the handle 302. The flow path 320 provides fluid to the head portion 310 and nozzles 308. As shown in FIG. 13B, the nozzles 308 may be arranged in one or more rows or columns along the head portion 310. For example, the nozzles 308 may be arranged in a plurality of rows (e.g., two rows) extending along a length of the head portion 310, such as between the handle 302 and the hanging element 304. In some embodiments, the rows of nozzles 308 may extend substantially parallel to one another, such as parallel to a longitudinal axis of the showerhead 300. In some embodiments, the nozzles 308 in one row may be offset (e.g., laterally and/or vertically) from the nozzles 308 in an adjacent row.

With reference to FIG. 13C, the showerhead 300 includes a control assembly, such as the pause assembly 104. The pause assembly 104 is connected to the handle 302 and includes the control 116 jutting out from a first side of the handle 302, such that it allows a user to easily and quickly activate the control 116 when holding the handle 302. As shown in FIG. 13C, the control 116 may jut out from a side of the showerhead 300 opposite the nozzles 308. For example, the handle 302 includes a control aperture 330 defined through a back wall of the housing 328 of the handle 302, the control 116 extending through the control aperture 330.

In addition to varying the water fixture connected to the control assembly, in some embodiments, the operation of the control assembly may be varied. FIGS. 14A-14D illustrate various views of an alternate embodiment of a showerhead 400 that includes a control assembly, such as a pause assembly 404, positioned within a handle 402. The pause assembly 404 may be substantially similar to the pause assembly 104, but may include a different actuator and actuating motion, as described below. Except as otherwise noted below, the showerhead 400 is similar to the showerhead 100 or the showerhead 300 described above. Accordingly, in certain instances, like features will not be discussed when they would be apparent to those skilled in the art.

Figure 14A:
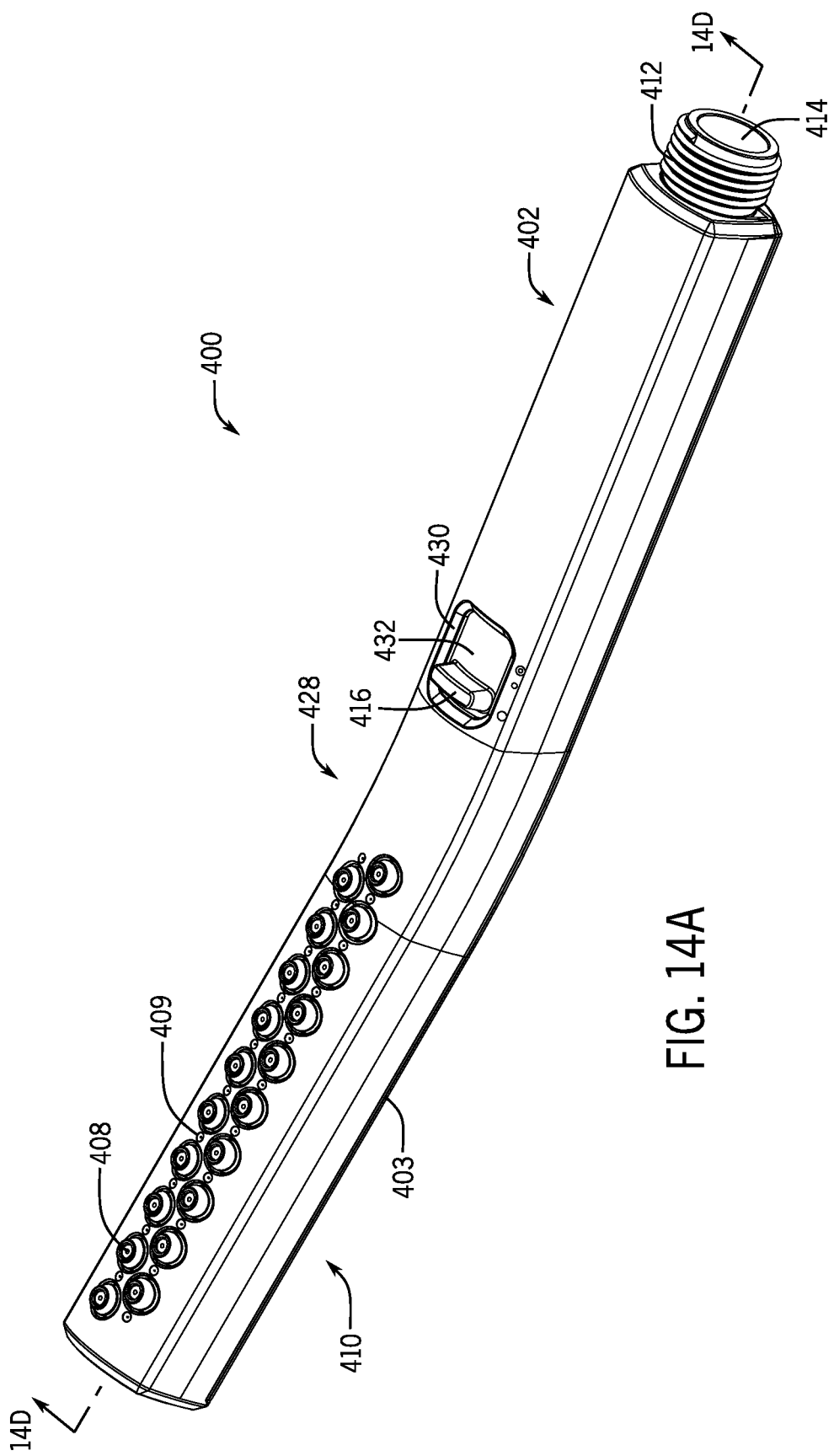
FIG. 14A is a top isometric view of an additional showerhead including a control assembly.
Figure 14B:
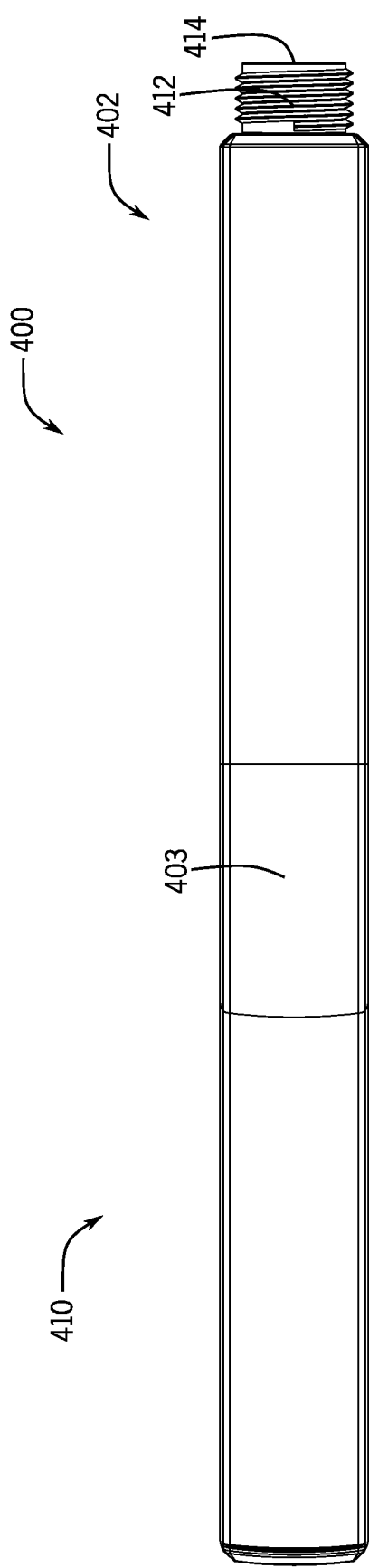
FIG. 14B is a bottom view of the showerhead of FIG. 14A.
Figure 14C:
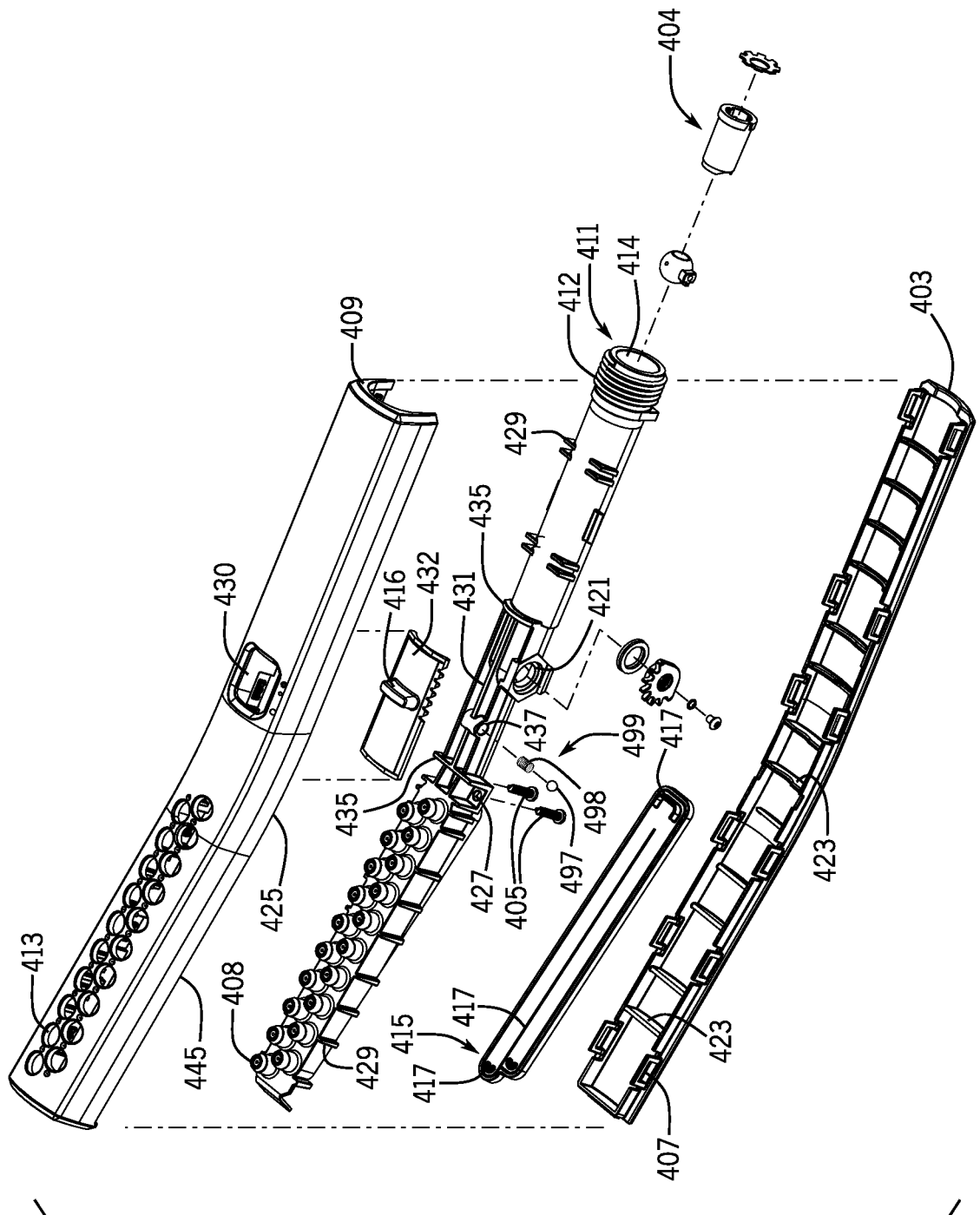
FIG. 14C is an exploded top isometric view of the showerhead of FIG. 14A.
Figure 14D:
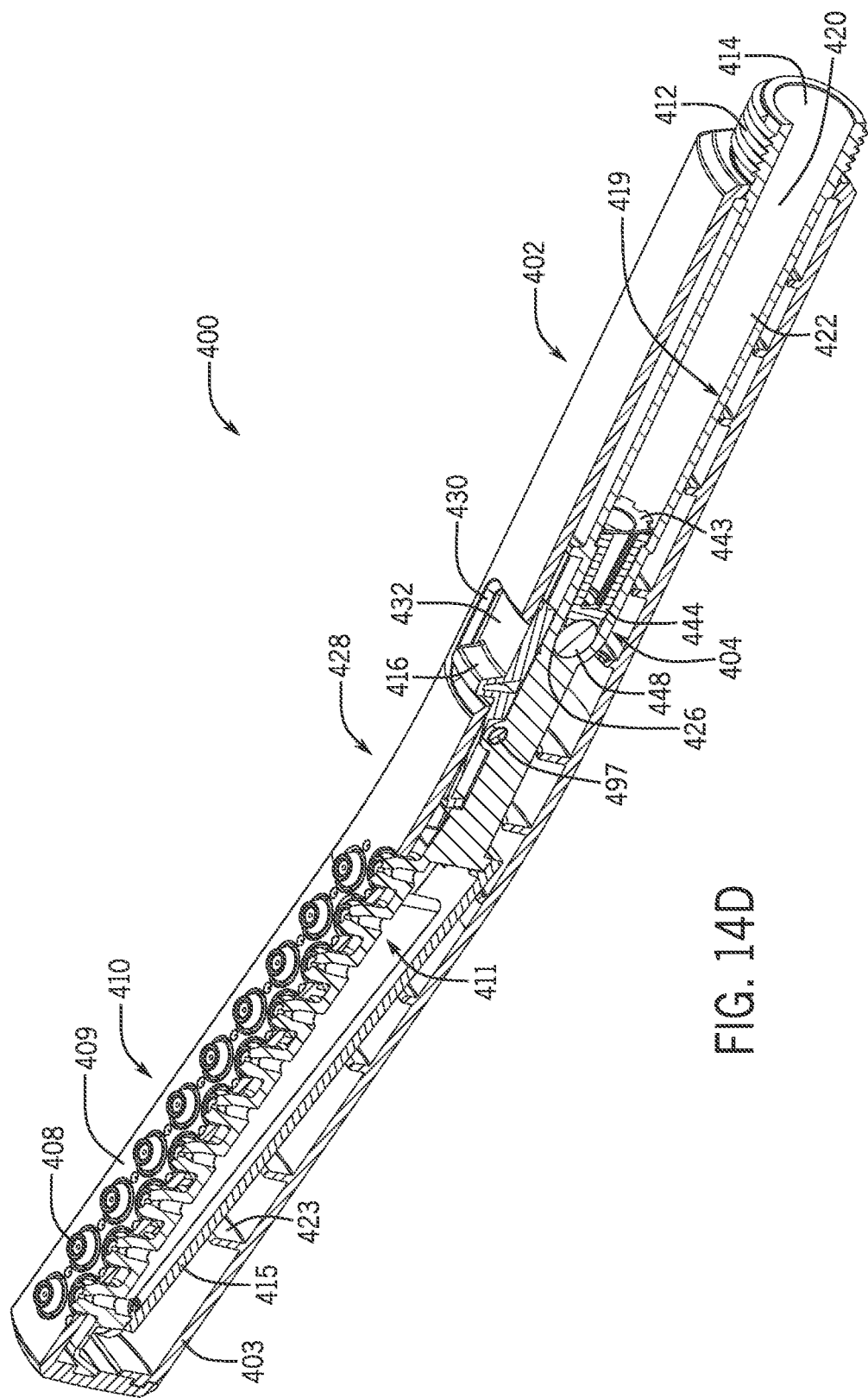
FIG. 14D is a cross-section view of the showerhead of FIG. 14A taken along line 14D-14D in FIG. 14A.

FIG. 14A illustrates a top isometric view of the showerhead 400. FIG. 14B illustrates a bottom view of the showerhead 400. FIG. 14C illustrates an exploded top isometric view of the showerhead 400. FIG. 14D illustrates a cross-section view of the showerhead 400 taken along line 14D-14D in FIG. 14A. With reference to FIGS. 14A and 14B, the showerhead 400 includes a handle 402 with a head portion 410 extending therefrom. The head portion 410 may be integrally formed together or may be separate components operably coupled together. The handle 402 and the head portion 410 define a housing 428 for the showerhead 400, which in this example is a handheld showerhead with an elongated head portion 410. The handle 402 may be sized to be easily grasped by the user's hand and may have an aesthetically pleasing appearance. The head portion 410 is designed to conform to the body of a pet or selected body features of a person during a washing or bathing process. As shown in FIG. 14A, in some embodiments, the head portion 410 may extend at an angle, such as an obtuse angle, relative to the handle 402 to allow the user to more easily direct spray, such as towards separate areas of his or her body, without significantly contorting his or her hands. Additionally, the angle between the handle 402 and the head portion 410 and/or the shape of the head portion 410 may be selected so as to be aesthetically pleasing. The showerhead 400 may include a housing 428, a core assembly 411, an actuator 432, and a control assembly 404, each of which are discussed in turn below.

With reference to FIGS. 14A and 14C, the housing 428 may include both a front cover 409 and a rear cover 403 operably coupled to one another. In some embodiments, the rear cover 403 may be connected to the front cover 409 by a plurality of connectors 407, which may be clips or fasteners, but in other embodiments, the two covers 409, 403 may be connected together in other manners (e.g. adhesives, welding, or the like). The rear cover 403 may also contain a plurality of ribs 423 extending upwards from a bottom surface of the rear cover 403. The ribs 423 may also conform to the bottom surface of the nozzle cover 415 and the bottom and side surfaces of core assembly 411. The ribs 423 provide rigidity to the bottom cover 403 and support to the nozzle cover 415 and the core assembly 411. The ribs 423 may also assist in the proper positioning of core assembly 411 relative to rear cover 403.

The front cover 409 may include a plurality of nozzle apertures 413 defined through a front wall thereof. The front cover 409 may also include at least one fastening recess 425, a control aperture 430 defined through a front wall of the front cover 409 of the handle 402, and a plurality of connector tangs 445. The connector tangs 445 are sized and shaped to interact with the corresponding connectors 407 of rear cover 403 to connect the front cover 409 to the rear cover 403 as discussed below.

With reference to FIGS. 14C and 14D, the showerhead may also include a core assembly 411 to fluidly connect a fluid source to nozzles 408 via one or more flow paths 420 defined therein. The core assembly 411 includes one or more nozzles 408, a nozzle cover 415, an attachment assembly 412, one or more ribs 429, an actuator track 431, one or more stops 435, and a spring cavity 437. The core assembly 411 may be integrally formed together or may be separate components operably coupled together.

The nozzles 408 are sized and shaped to fit into the corresponding nozzle apertures 413 in the front cover 409 and are used to direct fluid out of the showerhead 400 and in a particular direction. The nozzles 408 may be arranged similar to the nozzles 308 described above. The core assembly 411 may also include an inlet 414 fluidly connected to a flow path 420 defined by an interior surface 422 of core assembly 411. The flow path 420 is fluidly connected to a head inlet 426 that provides fluid to the head portion 410.

The core assembly 411 may include a nozzle cover 415 to ease the manufacturing and/or assembly of the core assembly 411. The flow path 420 is further defined by the front face of the nozzle cover 415, which may include a plurality of sealing protrusions 417. The nozzle cover 415 may be a separate component connected (e.g. through fasteners, clips, adhesives, welding, or the like) to the core assembly 411 so as to define the flow path 420 that may direct fluid from the inlet 414 to nozzles 408. In some embodiments, the nozzle cover 415 may be formed as a part of the core assembly 411.

The core assembly 411 may include an attachment assembly 412, which may be substantially similar to the attachment assembly 112. The attachment assembly 412 may be a separate component connected to the bottom end of core assembly 411 or may be formed as a part of the core assembly 411. The attachment assembly 412 includes features, such as threading, grooves, or the like, to secure the core assembly 411 to a hose, pipe, or other fluid source. In some embodiments, the attachment assembly 412 may include a flow restrictor, filter, or the like.

The core assembly 411 may be formed to define a plurality of ribs 429 on its outer surface that substantially conform to the shape of front cover 409 and the shape of rear cover 403. The ribs 429 provide rigidity to the core assembly 411 and support to the front cover 409 and the rear cover 403. The ribs 429 may also assist in the proper positioning of core assembly 411 relative to front cover 409 and rear cover 403. For example, the ribs 429 may be positioned within corresponding structure defined on the front cover 409 and/or the rear cover 403 to properly align the core assembly 411 within the showerhead 400. In some embodiments, the core assembly 411 may include a plurality of fastening apertures 427 that substantially align with fastening recesses 425 of front cover 409.

The core assembly 411 may also be formed to define an actuator track 431 and opposing stops 435, formed on a first side of core assembly 411, to constrain movement of an actuator 432, as described in detail below. The actuator track 431 may further be defined to form a spring cavity 437 along its length. In some embodiments, the core assembly 411 may also be formed to define a driver aperture 421 through a side wall of the handle cavity 419 of the core assembly 411.

Figure 15A:
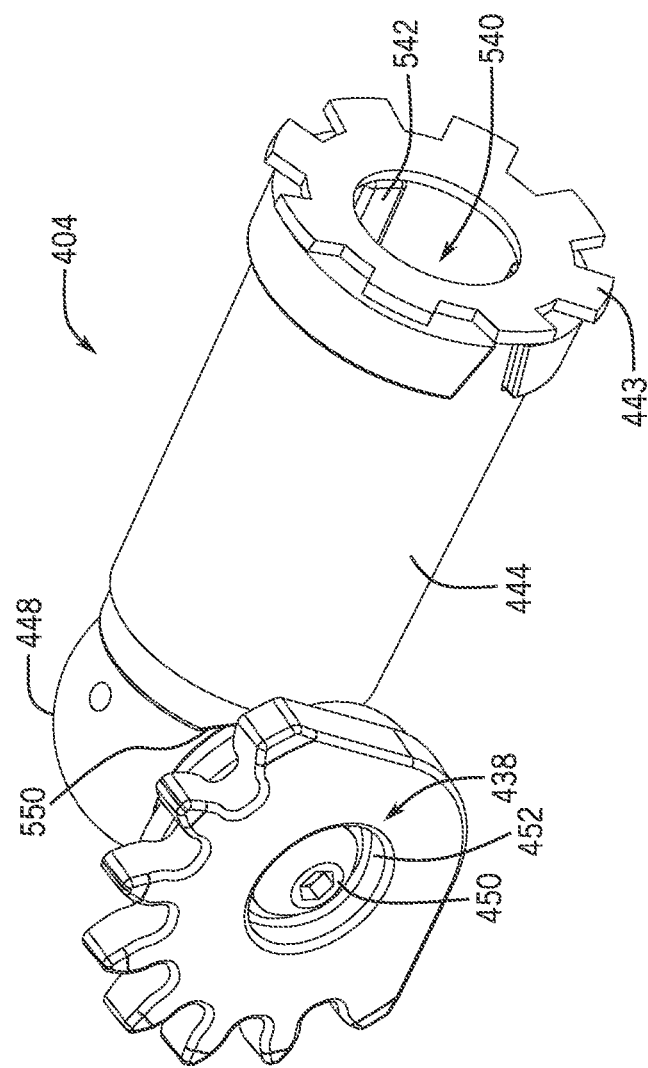
FIG. 15A is a top isometric view of a control assembly.

The showerhead 400 includes a control assembly, such as a flow state assembly, operable to vary a flow volume from the fluid source to the nozzles 408. For example, the flow state assembly may be positioned within the flow path 420 to control fluid flow through the core assembly 411. In one embodiment, the flow state assembly may include the pause assembly 404. The pause assembly 404 controls fluid flow through the handle cavity 419 of core assembly 411 to vary the fluid flow along flow path 420 between inlet 414 and head inlet 426, as discussed in more detail below. With reference to FIGS. 15A-15B, an embodiment of a pause assembly 404 will now be discussed in more detail. FIG. 15A illustrates a top isometric view of the pause assembly 404. FIG. 15B illustrates an exploded top isometric view of the pause assembly 404. The pause assembly 404 may include a retention element 443 (for example, a push nut), a valve retainer 444, a valve 448, a valve driver 438, a fastener 450, and one or more seals 436, 452. In one embodiment, the pause assembly 404 includes a ball valve configuration. The valve 448 is substantially similar to valve 148 as described above and as shown in FIGS. 9A and 9B.

Figure 15D:
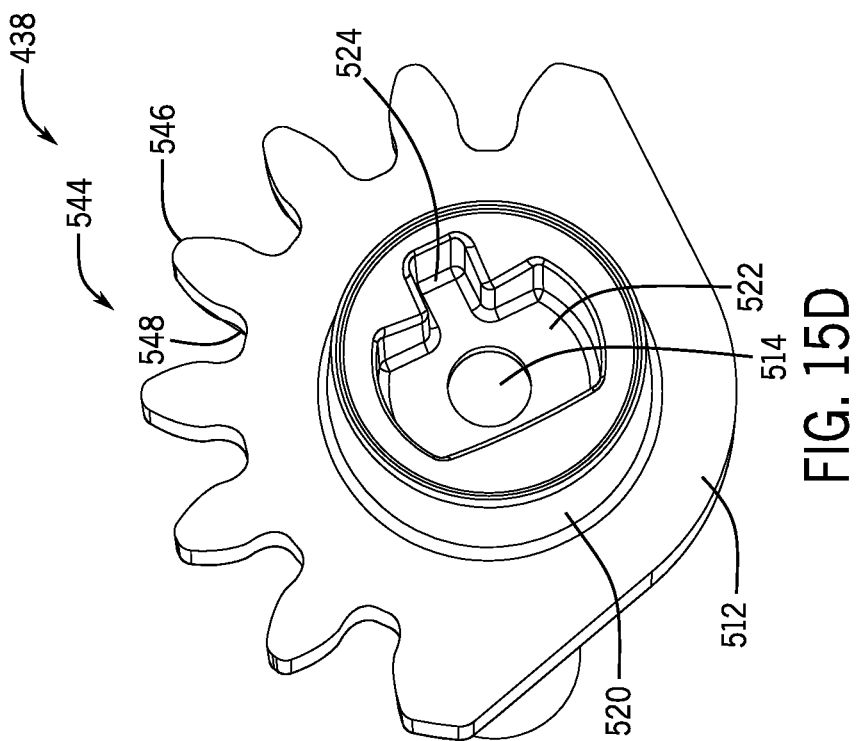
FIG. 15D is a rear isometric view of the valve driver of FIG. 15C.
Figure 15C:
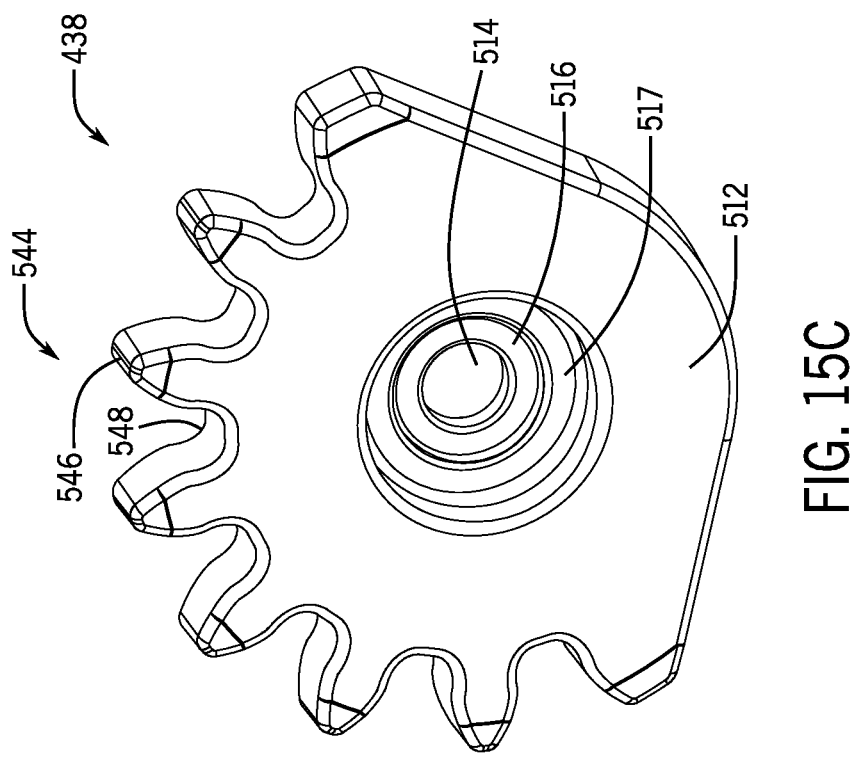
FIG. 15C is a front isometric view of a valve driver of the control assembly of FIG. 15A.

With reference to FIGS. 15C and 15D, the pause assembly 404 may also include a valve driver 438 jutting out from a second side of the core assembly 411, such that it allows the actuator 432 to engage the valve driver 438 as discussed in detail below. The valve driver 438 converts motion of the actuator 432 into motion of the valve 448. FIG. 15C illustrates a front isometric view of the valve driver 438. FIG. 15D illustrates a rear isometric view of the valve driver 438.

The valve driver 438 may include a main body 512 having a bottom wall 520 extending from a bottom surface thereof. The valve driver 438 may also include a plurality of engagement features 544. In one embodiment, the engagement features 544 may be defined by a plurality of teeth 546 and a plurality of grooves 548 as shown in FIG. 15C. However, the engagement features 438 may include any features capable of allowing actuator 432 to engage valve driver 438, i.e. ribs, a friction surface, or the like.

A fastening aperture 514 is defined through a central region of the valve driver 438 and optionally may be surrounded by a seal ledge 516. The seal ledge 516 may be recessed from the top surface of the main body 512 and configured to receive the seal 436. The seal ledge 516 may be surrounded by a fastener ledge 517. The fastener ledge 517 may be recessed from the top surface of the main body 512 and configured to receive the fastener 405.

With reference to FIG. 15D, the bottom wall 520 of the main body 512 may include a keying feature 522 therein. In one embodiment, the keying feature 522 is a cutout or cavity and is shaped to engage and secure the valve 448. For example, the keying feature 522 may include a nub compartment 524 that is configured to receive the nub 206 of the valve 448 and orientate the valve 448 relative to the valve driver 438.

With reference to FIGS. 15A and 15B, the valve retainer 444 will now be discussed in detail. The valve retainer 444 or valve body is in fluid communication with the valve 448 and the flow path 420 and may be received within the handle cavity 419 of core assembly 411 to position and secure the valve 448 within the handle cavity 419. In some embodiments, the valve retainer 444 may be formed as a generally cylindrical tube defining a flow lumen 540 through its length. The flow lumen 540 may have a varying diameter and may reduce in size before the outlet end of the valve retainer 444 such that the terminal end of the flow lumen 540 may have a diameter that substantially matches the diameter of the flow passage 230 of the valve 448. However, in other embodiments, the flow lumen 540 may be differently configured. The flow lumen 540 may include one or more strengthening ribs 542 that extend a substantial length of the flow lumen 540. The ribs 542 may also be used to assist in positioning the valve retainer 444 within the handle cavity 419. For example, in one embodiment a male tool having corresponding slots receives the ribs 542 and can more easily manipulate the valve retainer 444 to ensure it is correctly positioned within the handle cavity 419. A terminal or first end of the valve retainer 444 may include a cutout 550. The cutout 550 may be formed to provide space for securement of the valve driver 438 to the valve 448, as discussed below.

Figure 16A:
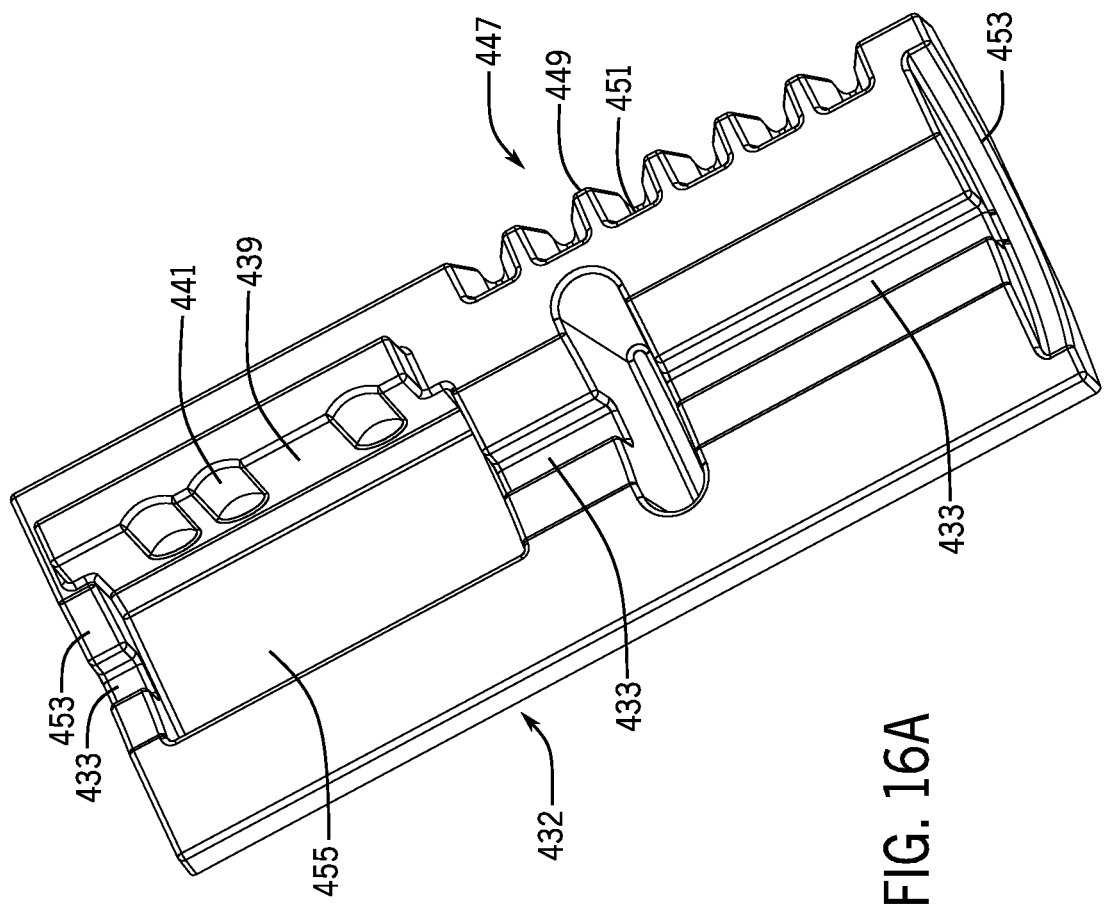
FIG. 16A is a bottom isometric view of an actuator.
Figure 16B:
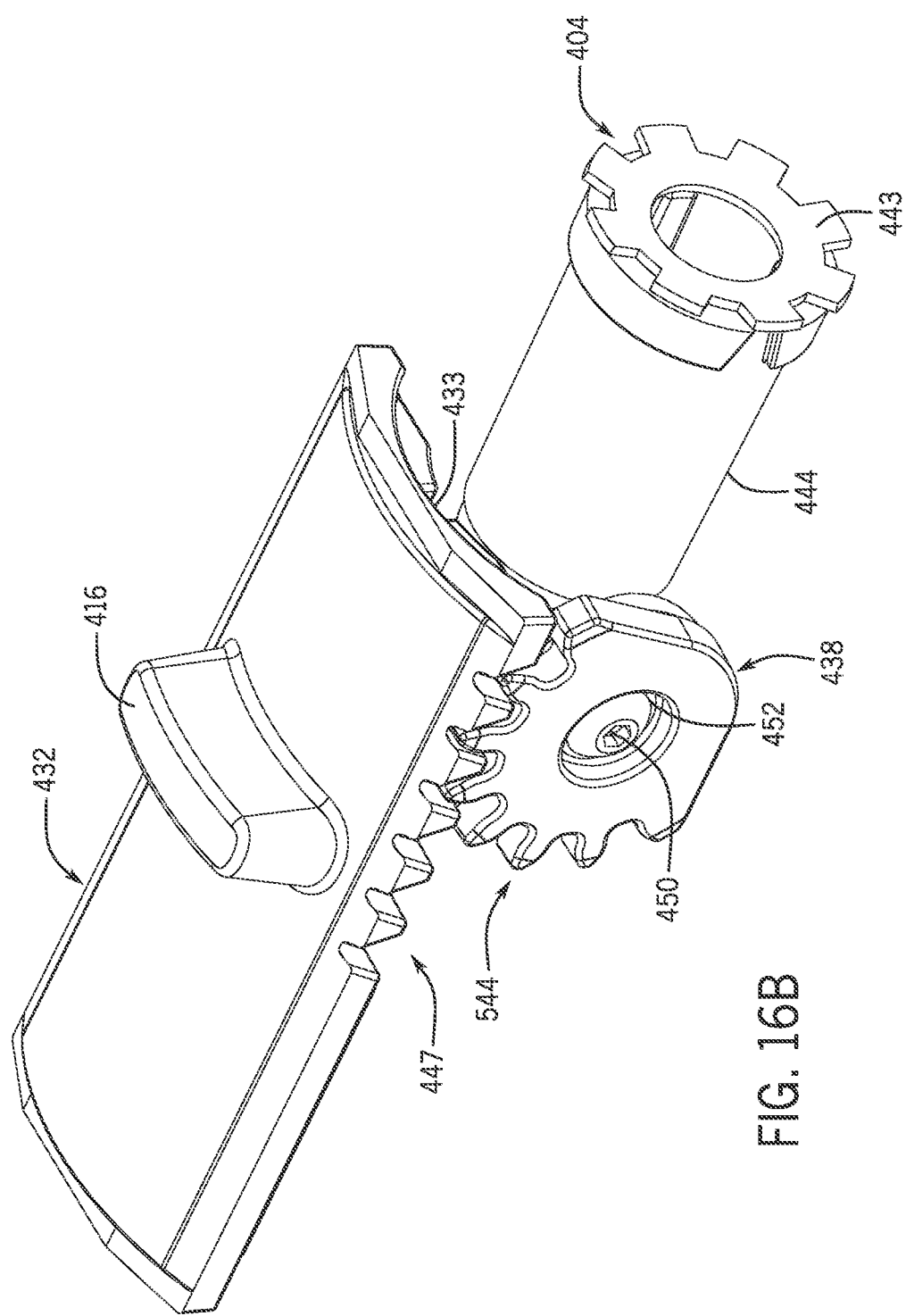
FIG. 16B is a top isometric view of the control assembly of FIG. 15A engaged with the actuator of FIG. 16A.
Figure 16C:
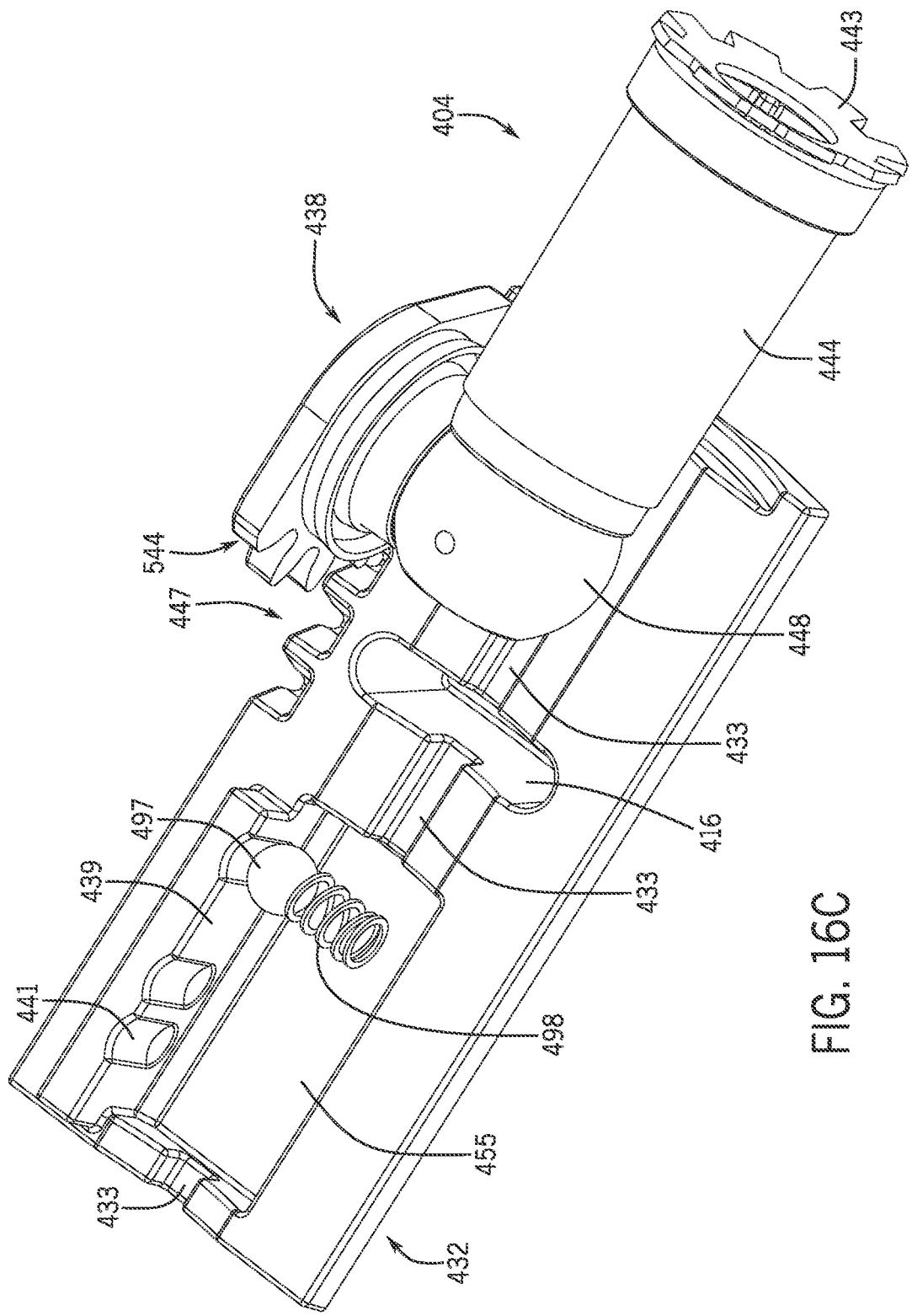
FIG. 16C is a partial cutaway view of the control assembly of FIG. 15A engaged with the actuator of FIG. 16A.
Figure 16D:
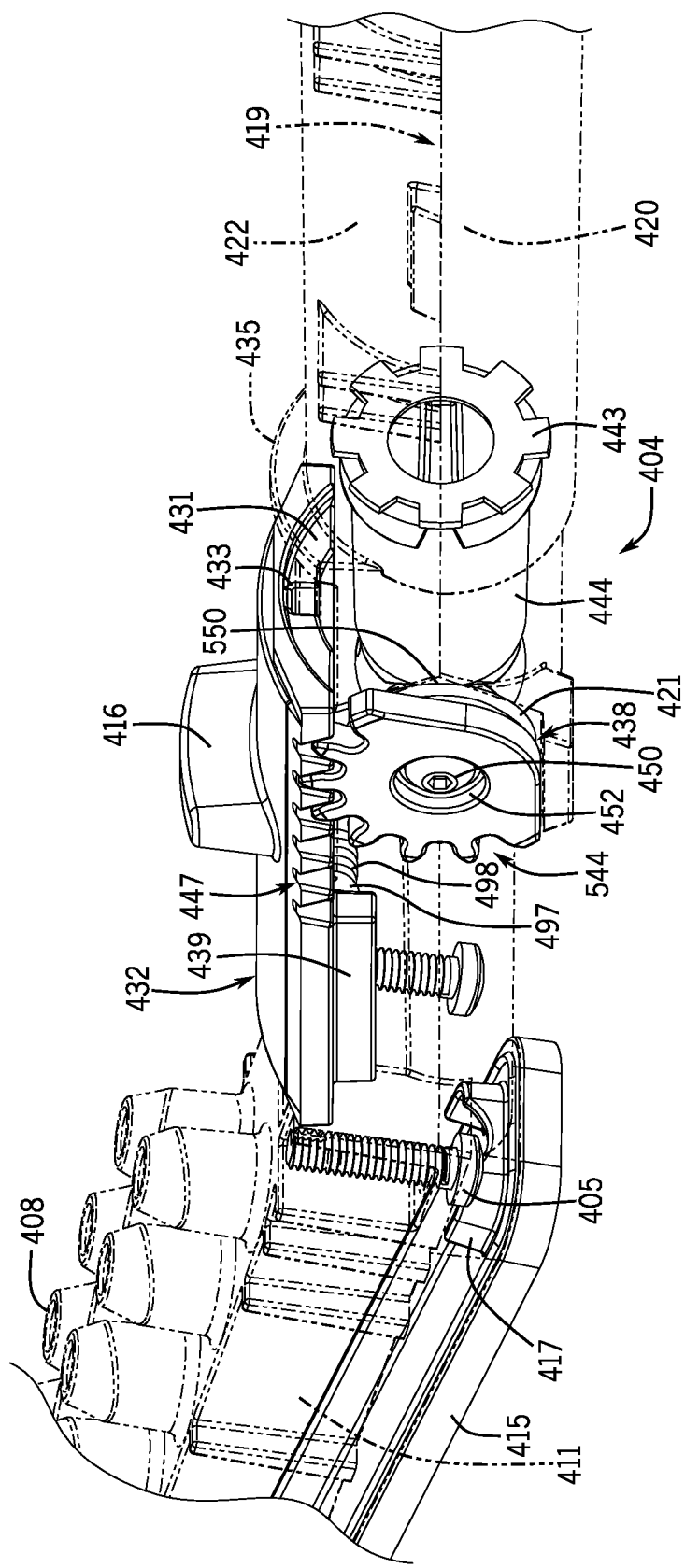
FIG. 16D is a side isometric view of the actuator of FIG. 16A engaged with the control assembly of FIG. 15A within the showerhead of FIG. 14A, with certain elements shown in transparency for clarity.

With reference to FIGS. 16A-16D, the actuator 432 of the pause assembly 404 will now be discussed in more detail. FIG. 16A illustrates a bottom isometric view of the actuator 432. FIG. 16B illustrates a top isometric view of the pause assembly 404. FIG. 16C is a partial cutaway view of the pause assembly. FIG. 16D illustrates a side isometric view of the actuator 432 in engagement with the pause assembly 404 within the core assembly 411 with certain elements shown in transparency for clarity.

The actuator 432 is used to translate a force applied by a user to control 416 into motion of the valve driver 438. As shown in FIG. 16B, the actuator 432 may be defined generally as a plate or apron that has a curvature and features substantially matching a curvature and features of the core assembly 411. The actuator 432 includes a control 416 that the user can manipulate to change the state of the pause assembly 404. For example, the control 416 may be a slider, button, knob, or the like. The control 416 juts out from a first side of the handle 402, such that it allows a user to easily and quickly activate the control 416 when holding the handle 402. In some embodiments, the control 416 may be a separate component connected to the top end of actuator 432 or as shown in FIG. 16B may be formed as a part of the actuator 432.

With reference to FIG. 16A, the actuator 432 may define a guide slot 433 and a feedback cavity 455. A detent wall 439 may be defined on one sidewall defining the feedback cavity 455. The detent wall 439 includes a plurality of detents 441, such as grooves or slots. The actuator 432 may also include a plurality of engagement features 447. The engagement features 447 of the actuator 432 are configured to substantially receive the engagement features 544 of the valve driver 438 in order to actuate movement of the valve driver 438. In one embodiment, the engagement features 447 may be defined by a plurality of teeth 449 and a plurality of grooves 451, as shown in FIG. 16A. However, the engagement features 447 may be any features capable of allowing actuator 432 to engage valve driver 438, i.e. ribs, a friction surface, or the like.

The showerhead 400 may also include a feedback assembly 499 to provide the user with feedback regarding the mode and position of the pause assembly 404. The feedback assembly may include a biasing element 498, such as a coil spring, and a biased member 497, such as a ball bearing. The biasing element 498 may be positioned within the spring cavity 437 of core assembly 411. In some embodiments, the biasing element 498 may be a coil spring and may extend slightly beyond the spring cavity 437. However, in other embodiments, the biasing element 498 may be otherwise configured and may be substantially any other type of element capable of providing a biasing force. The biasing element 497 is typically selected so as to exert a sufficient biasing force to hold the position of the actuator 432. In other words, the biasing element 498 exerts a biasing force sufficient to prevent movement of the actuator 432 and rotation of the valve 448, this includes a force sufficient to resist rotation of the valve 448 due to the flow of fluid along flow path 420 when the valve 448 is in any possible position.

A biased member 497, of a shape that may be substantially received within a detent 441, is placed between the biasing element 498 and the detent 441. In some embodiments, the biased member 497 may be a separate component connected (e.g. through fasteners, clips, adhesives, welding, or the like) to the biasing element 498. In other embodiments, the biased member 497 may be held in place by the biasing force of biasing element 498 or may be otherwise configured and may be formed as a part of the biasing element 498.

Assembly of the pause assembly 404 will now be discussed. It should be noted that the below discussion is meant as illustrative only and many of the operations can be performed in a different order or manner. In some embodiments, the pause assembly 404 is connected within the handle cavity 419 of core assembly 411. With reference to FIGS. 14C, 14D, 15B and 16D, the valve 448 is inserted into the handle cavity 419 and positioned against the head inlet 426. The valve 448 is aligned such that the keyed structure 202 is oriented with and extends partially through the driver aperture 421 of core assembly 411. The valve retainer 444 may then be inserted into the handle cavity 419 with the cutout 550 of the valve retainer 444 facing the driver aperture 421 of core assembly 411. The retention element 443 may then be inserted into the handle cavity 419 and placed against valve retainer 444. The retention element 443 engages the interior surface 422 of handle cavity 419 and helps to secure the valve retainer 444 in the desired location within the handle cavity 419. In this manner, the valve retainer 444 is prevented from movement relative to handle cavity 419 and the valve 448 is clamped against the valve retainer 444 and the head inlet 426, defining a fluid connection between the three components. The fluid pressure of fluid flowing along flow path 420 assists in preventing movement of retention element 443 relative to handle cavity 419, and thus assists in maintaining a fluid connection between head inlet 426 and valve 448 and valve retainer 444.

With reference to FIGS. 15B and 16D, the valve driver 438 may then be secured to the valve 448 (alternatively, the valve driver 438 may be secured to the valve 448 before the valve retainer 444 is inserted into the handle cavity 419). In particular, the seal 436 is positioned on the valve 448 such that seal 436 sits within driver aperture 421 and the keyed structure 202 of valve 448 extends through driver aperture 421 and seal 436. The valve driver 438 is then oriented with the keyed structure 202 such that the keying feature 522 of the valve driver 438 is aligned with and received around the keyed structure 202 of the valve 144. In particular, the nub 206 may be positioned within the nub cutout 524 and the fastening aperture 514 of the valve driver 438 may be aligned with the fastening cavity 210 of the valve 448. The valve driver 438 is then press fit onto the valve 448, clamping the seal 436 between the valve housing 434 and the main body 512 of the valve driver 438. To secure the valve driver 438 to the valve 448, a seal 452 is positioned on the seal ledge 516 of the valve driver 438 and a fastener 450 is inserted through the fastening aperture 514 of the valve driver 438 and into the fastening cavity 210 of the valve 448. The fastener is then secured in place, e.g., through a friction fit, adhesive, and/or threading. The securement of valve driver 438 to valve 448 assists in retaining the valve driver 438 and valve 448 in correct position. It should be noted that in some embodiments, the seals 436, 452 may be omitted or differently configured. However, in one embodiment the seal 436 is a U-cup and the seal 452 is an O-ring but many other implementations are envisioned. With reference to FIG. 14C, once the pause assembly 404 is connected within the core assembly 411, the attachment assembly 412 (if included) is inserted into the open bottom end of core assembly 411 and connected thereto.

Connecting the actuator 432 to the core assembly 411 and in engagement with the valve driver 438 will now be discussed. With reference to FIGS. 14C, 14D, and 16B-16D, the biasing element 498 is inserted into the spring cavity 437 of core assembly 411 and the biased member 497 is then positioned over the end of biasing element 498. The actuator 432 is then placed between the stops 435 of core assembly 411 in such a manner that the actuator track 431 of core assembly 411 is received into the guide slot 433 of actuator 432, the biased element 497 is received within feedback cavity 455 of actuator 432 and into any detent 441 of detent wall 439, and the engagement features 447 of actuator 432 are placed in engagement with the engagement features 544 of valve driver 438. In these embodiments, the biasing element 498 may be compressed into the spring cavity 437 to permit placement of the biased member 497 into any detent 441 during placement of the actuator 432 between the stops 435 of core assembly 411.

With reference to FIG. 14C, the front cover 409 of housing 428 is then connected to the core assembly 411. The front cover 409 is aligned with the core assembly 411 such that the nozzle apertures 413 are positioned over the nozzles 408 and the control aperture 430 is positioned over control 416 of actuator 432 and the fastening recesses 425 are aligned over the fastening apertures 427. The nozzles 408 are then received into the nozzle apertures 413 and the control 416 is received into the control aperture 430. To secure the front cover 409 to the core assembly 411, fasteners 405 are then inserted through the fastening apertures 427 of core assembly 411 and into the fastening recesses 425 of the front cover 409. In this position, the top end of actuator 432 is enclosed by the front cover 409 and the end walls 453 of actuator 432 are enclosed by the stops 435 of core assembly 411, helping to secure the actuator 432 in position as the control 416 is trapped within the control aperture 430. The actuator 432 is thus allowed to traverse longitudinally along actuator track 431 of the core assembly 411 between stops 435, but is constrained from traversing across a radial surface of the core assembly 411. In other words, the actuator 432 is trapped in engagement with the valve driver 438 while being permitted to move along actuator track 431 between stops 435.

Final assembly of the showerhead 400 will now be discussed. With reference to FIGS. 14C and 14D, the nozzle cover 415 is connected to the head portion 410 of core assembly 411. The nozzle cover 415 is aligned with the core assembly 411 such that the contours of the top of nozzle cover 415 substantially align with the contours of the bottom of core assembly 411 and the sealing protrusions 417 of nozzle cover 415 are facing the interior of core assembly 411. The nozzle cover 415 is then press fit onto the bottom of core assembly 411. To secure the nozzle cover 415 to the core assembly 415, the rear cover 403 is then aligned with the front cover 409 and the core assembly 411 such that the contours of the rear cover 403 substantially align with the contours of front cover 409 and core assembly 411. The rear cover 403 is then press fit onto the bottom of core assembly 411. The rear cover 403 is then secured into place e.g. through engagement of connectors 407 (if included) to connector tangs 445 of front cover 409. In embodiments where connectors 409 are not included, the rear cover may be secured into place via fasteners, adhesives, welding, or the like. The attachment assembly 412 may then be fluidly connected to a water source, such as a hose or j-pipe.

Operation of the pause assembly 404 will now be discussed in more detail. With reference to FIGS. 14A and 16D, to change the amount of fluid flowing from the showerhead 400, a user moves the control 416. In one example, the user forces the control 416 to move linearly from a first end of handle 402 towards a second end of the handle 402. The control 416, which is connected to the actuator 432, causes the actuator 432 to move along actuator track 431 of the core assembly 411 correspondingly. As the actuator 432 moves, the valve driver 438 moves therewith due to the engagement of engagement features 544 of valve driver 438 with the engagement features 447 of actuator 432.

The movement of actuator 432 causes the valve driver 438 to rotate a predetermined number of degrees and due to the valve 448 being keyed to the valve driver 438, causes the valve 448 to rotate within the handle cavity 419. At the end of the valve driver 438 movement, the valve 448 is positioned within the handle cavity 419 such that the trickle apertures 204a, 204b are aligned with the flow lumen 540 of the valve retainer 444 and the head inlet 426 of handle cavity 419. Due to the seal defined by engagement of valve 448 with valve retainer 444, all of the fluid entering into the pause assembly 404 is directed through the second trickle aperture 204b, which causes the flow to essentially pause, except for a small "trickle" flow. The size of the trickle apertures 204a, 204b may be determined based on water pressure and help to avoid damage to the handle cavity 419 in instances where the pause assembly 404 is closed for long periods of time, by providing a release for some of the fluid within the handle cavity 419 through the head inlet 426. However, in some embodiments, the trickle apertures 204a, 204b may be omitted and the valve 448 may seal against valve retainer 444, preventing all flow from the handle inlet 414 from reaching the head inlet 426, i.e., fully pausing water flow.

To move the pause assembly 404 to the open position, the user forces the control 416 to the first side of the handle 402, causing the control 416 to move along a linear path constrained by the control aperture 430. The actuator 432 moves along actuator track 431 of the core assembly 411 correspondingly. As the actuator 432 moves, the valve driver 438 moves therewith due to the engagement of engagement features 544 of valve driver 438 with the engagement features 447 of actuator 432.

The movement of actuator 432 causes the valve driver 438 to rotate a predetermined number of degrees and due to the valve 448 being keyed to the valve driver 438, causes the valve 448 to rotate within the handle cavity 419. At the end of the valve driver 438 movement, the valve 448 is positioned within the handle cavity 419 such that the flow passage 208 is aligned and fluidly connected to the flow lumen 540 of the valve retainer 444 and the head inlet 426 of handle cavity 419. Due to the seal defined by engagement of valve 448 with valve retainer 444, all of the fluid entering into the pause assembly 404 is directed through the head inlet 426 where it can be expelled via one or more of the nozzles 408.

In some embodiments, the valve 448 may be rotatable to multiple configurations between the two orientations. This allows a slowly reduced or slowly increased flow volume as the user moves the control 416 between the first position and the second position. The user can keep the control 416 in a position between the two extremes in order to have a more preferable flow volume.

With reference to FIGS. 16C and 16D, in some embodiments, the feedback assembly 499 provides tactile feedback to a user to allow the user to more easily choose a desired position of valve 448 without "overshooting" or having to readjust the control 416 a number of times before a desired position is reached. In other words, as the actuator 432 moves along actuator track 431 due to a force exerted by the user on control 416, the amount of force required by the user to continue forcing the actuator 432 along actuator track 431 increases when biased element 497 is forced by biasing member 498 into engagement with a detent 441. To change the position of the actuator 432 when biased element 497 is engaged within a detent 498, the user must exert an additional force on the control 416 sufficient to overcome the biasing force exerted by the biasing member 498 on biased element 497. This additional force causes the biased element 497 to compress biasing member 498 an amount sufficient to permit biased element 497 to escape detent 441. The actuator 432 is then free to continue moving along actuator track 431 in the direction of the exerted force until the biased member 497 is either positioned in engagement with any detent 441, an end wall 453 of actuator 432 contacts a stop 435 of core assembly 411, or the user ceases to exert a force on the control 416. The number and location of detents 441 are typically selected so as to provide tactile feedback to a user when valve 448 has reached a desired orientation within handle cavity 419.

During movement of the actuator 432, the biased member 497 may introduce a drag and resists the force exerted by a user on the control 416 by virtue of its engagement with the detent wall 441 of actuator 432. This slows down the movement of the actuator 432, to allow a user to more easily choose a desired position of valve 448 without "overshooting" or having to readjust the actuator 432 a number of times before a desired position is reached. The material of biased member 497, in combination with the force exerted on biased member 497 by biasing element 498, is typically selected so as to exert a sufficient drag to allow a user to more easily choose a desired position of valve 448 without making it too difficult for a user to move the actuator 432.

Using the pause assembly 404 of the present embodiment, a user can easily move the control 416 while holding the handle 402 since the control 416 is accessible within the handle 402. This allows a user to control the water flow of the showerhead 400 from various locations within a shower enclosure, even when the user is far away from the main controls.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present disclosure, do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

We claim:

1. A showerhead comprising:
   a head portion including a plurality of nozzles;
   a handle extending from the head portion and including an inlet; and
   a pause assembly positioned within the handle to control water flow from the inlet to the plurality of nozzles, the pause assembly comprising:
      a control extending outwardly from the handle for manipulation by a user to change a state of the pause assembly, the control including a body and first and second legs extending outwards from opposing sides of the body; and
      an actuator that translates motion of the control to change the state of the pause assembly, the actuator defining a first slot and a second slot each extending along a length of the actuator, the first slot and the second slot each having a first width to allow insertion of a corresponding one of the first and second legs of the control and the first slot and the second slot each having a second width to inhibit removal of the corresponding first and second legs of the control.

2. The showerhead of claim 1, wherein the actuator is defined as a curved plate.

3. The showerhead of claim 1, wherein the first slot and the second slot are formed as mirror images of one another.

4. The showerhead of claim 1, wherein the actuator further defines an actuator aperture positioned between the second slot and an edge of the actuator that extends along the length of the actuator.

5. The showerhead of claim 4, wherein the actuator aperture comprises an oval-shaped slot.

6. The showerhead of claim 1, wherein the body of the control includes a closed top end and an open bottom end that defines the first and second legs.

7. The showerhead of claim 1, wherein the first and second legs of the control are parallel to one another.

8. The showerhead of claim 1, wherein the pause assembly further comprises a valve housing formed as a cylindrical tube, wherein the actuator is slidable along an outer surface of the valve housing in response to movement of the control by the user.

9. The showerhead of claim 8, wherein the valve housing defines a housing inlet at a first end of the valve housing, a housing outlet at a second end of the valve housing, and a valve cavity in fluid communication with the housing inlet and the housing outlet.

10. The showerhead of claim 9, wherein the pause assembly further comprises a valve received in the valve cavity and operably coupled to the actuator, wherein the valve rotates from a first position allowing fluid flow from the inlet to reach the nozzles to a second position reducing fluid flow from the inlet to the nozzles.

11. The showerhead of claim 10, wherein the pause assembly further comprises a valve driver coupled to the actuator and the valve to transfer motion of the actuator to the valve.

12. The showerhead of claim 8, wherein a recessed surface is defined in the outer surface of the valve housing, and wherein a valve aperture is defined through the recessed surface.

13. The showerhead of claim 12, wherein the pause assembly further comprises a valve received within the valve housing and a valve driver coupled to the valve, wherein the valve driver is seated on an actuator surface defined in the recessed surface around a periphery of the valve aperture.

14. The showerhead of claim 8, wherein the valve housing includes a pair of ridge walls on each end of the valve housing extending annularly around the valve housing.

15. The showerhead of claim 14, wherein the valve housing further includes a seal positioned in a seal groove defined between each pair of ridge walls.

16. The showerhead of claim 8, wherein the valve housing further includes a prong extending from an end of the valve housing to help secure the valve housing within the handle.

17. A showerhead comprising:
a head portion including a plurality of nozzles;
a handle extending from the head portion and including an inlet; and
a pause assembly positioned within the handle to control water flow from the inlet to the plurality of nozzles, the pause assembly comprising:
a control extending outwardly from the handle for manipulation by a user to change a state of the pause assembly, the control including a body and one or more legs extending outwards from the body; and
an actuator that translates motion of the control to change the state of the pause assembly, the actuator defining one or more slots extending along a length of the actuator, the one or more slots having a first width to allow insertion of the one or more legs of the control into the one or more slots and a second width to inhibit removal of the one or more legs of the control from the one or more slots.

18. The showerhead of claim 17, wherein the actuator is defined as a curved apron.

19. The showerhead of claim 17, wherein the one or more legs comprise a first leg and a second leg extending from opposing sides of the body of the control, and wherein the one or more slots comprises a first slot and a second slot formed as mirror images of one another.

20. The showerhead of claim 17, wherein the actuator further defines an actuator aperture positioned between the one or more slots and an edge of the actuator that extends along the length of the actuator.

* * * * *